US012134022B2

(12) United States Patent
Tracy et al.

(10) Patent No.: US 12,134,022 B2
(45) Date of Patent: Nov. 5, 2024

(54) FREE-WEIGHT EXERCISE SYSTEM

(71) Applicant: Johnson Health Tech retail, Inc., Cottage Grove, WI (US)

(72) Inventors: Jeffrey A. Tracy, Troutdale, OR (US); Edana French, Portland, OR (US); Ryan J. Pohl, Camas, WA (US)

(73) Assignee: Johnson Health Tech Retail, Inc., Cottage Grove, WI (US)

( * ) Notice: Subject to any disclaimer, the term of this patent is extended or adjusted under 35 U.S.C. 154(b) by 126 days.

(21) Appl. No.: 17/814,289

(22) Filed: Jul. 22, 2022

(65) Prior Publication Data

US 2023/0025915 A1 Jan. 26, 2023

Related U.S. Application Data

(60) Provisional application No. 63/354,321, filed on Jun. 22, 2022, provisional application No. 63/308,422, (Continued)

(51) Int. Cl.
*A63B 71/00* (2006.01)
*A63B 21/072* (2006.01)
(Continued)

(52) U.S. Cl.
CPC ........ *A63B 71/0036* (2013.01); *A63B 21/072* (2013.01); *A63B 71/0622* (2013.01); *F16M 11/043* (2013.01); *A63B 2071/0658* (2013.01)

(58) Field of Classification Search
CPC .............. A63B 71/0036; A63B 21/072; A63B 71/0622; A63B 2071/0658;
(Continued)

(56) References Cited

U.S. PATENT DOCUMENTS 4,477,074 A * 10/1984 Bushnell .............. A63B 21/078
482/106
4,666,150 A * 5/1987 Segrist ................ A63B 21/078
211/85.7
(Continued)

FOREIGN PATENT DOCUMENTS

CN 207702089 U 8/2018
CN 212912220 U 4/2021
(Continued)

OTHER PUBLICATIONS

U.S. Appl. No. 63/308,422 titled "Exercise System With Translatable and Rotatable Display" filed Feb. 9, 2022.
(Continued)

*Primary Examiner* — Sundhara M Ganesan
(74) *Attorney, Agent, or Firm* — Dorsey & Whitney LLP

(57) ABSTRACT

Embodiments of a free-weight exercise system are disclosed. In one embodiment, the free-weight exercise system includes a base that supports the free-weight exercise system a support surface. A platform is disposed above the base. The platform is sufficiently strong to support one or more exercise weights. The platform is disposed above the base a sufficient height to position the one or more exercise weights at an ergonomic height for grasping by a user. In some embodiments, the platform is be positionable between a retracted configuration and a deployed configuration. The free-weight exercise system includes a mast coupled to and extending above the base. The mast supports a display subsystem. The display subsystem includes a display. The display is disposed at a height above the support surface above the height of the platform. In some embodiments, the display may be rotatable between a landscape orientation and a portrait orientation.

20 Claims, 36 Drawing Sheets

Related U.S. Application Data filed on Feb. 9, 2022, provisional application No. 63/245,727, filed on Sep. 17, 2021, provisional application No. 63/224,790, filed on Jul. 22, 2021.

(51) Int. Cl.
*A63B 71/06* (2006.01)
*F16M 11/04* (2006.01)

(58) Field of Classification Search
CPC .......... A63B 2210/50; A63B 2220/801; A63B 2220/805; A63B 2225/093; A63B 2225/20; A63B 2225/50; A63B 21/0726; A63B 21/075; A63B 21/4029; F16M 11/043; F16M 11/105
See application file for complete search history.

(56) References Cited

U.S. PATENT DOCUMENTS

| | | | | |
|---|---|---|---|---|
| 5,997,442 | A * | 12/1999 | Cordes | A63B 21/072 482/52 |
| 6,213,574 | B1 | 4/2001 | Pierce | |
| 6,273,846 | B1 * | 8/2001 | Savage | A63B 21/0728 482/106 |
| 6,454,683 | B1 * | 9/2002 | Kaye | A63B 71/0036 482/904 |
| 7,241,250 | B1 * | 7/2007 | French | A63B 22/0235 482/54 |
| 7,578,771 | B1 * | 8/2009 | Towley, III | A63B 21/0728 482/106 |
| 7,614,988 | B1 * | 11/2009 | Kiser | A47C 11/00 482/142 |
| 7,623,342 | B2 | 11/2009 | Ozolins et al. | |
| 7,963,488 | B2 | 6/2011 | Hasegawa et al. | |
| 8,061,723 | B1 * | 11/2011 | Carroll | B62B 1/12 414/490 |
| 8,715,142 | B1 * | 5/2014 | Leach | A63B 21/063 482/102 |
| 9,555,309 | B1 * | 1/2017 | LaBar | A63B 21/0724 |
| 10,843,041 | B1 * | 11/2020 | Cobb | A63B 23/03525 |
| 11,027,166 | B1 * | 6/2021 | Francis | A63B 21/0722 |
| 11,058,936 | B1 * | 7/2021 | Brasch | A63B 23/1218 |
| 11,202,951 | B1 * | 12/2021 | Augustin | G06F 3/011 |
| 11,420,086 | B1 * | 8/2022 | Nolan | A63B 17/04 |
| 11,612,781 | B1 * | 3/2023 | Eoff | A47C 1/022 482/130 |
| 11,648,437 | B1 * | 5/2023 | Cifuentes | A63B 23/0458 482/142 |
| 11,738,233 | B1 * | 8/2023 | Cohen | A63B 21/16 482/129 |
| 2003/0186786 | A1 * | 10/2003 | Hsu | A63B 23/0458 482/52 |
| 2004/0023765 | A1 * | 2/2004 | Krull | A63B 21/075 482/142 |
| 2004/0259697 | A1 * | 12/2004 | Whetstone | A63B 21/072 482/93 |
| 2005/0051445 | A1 * | 3/2005 | Meehan | A63B 71/0036 206/372 |
| 2006/0073938 | A1 * | 4/2006 | German | A63B 22/16 482/52 |
| 2010/0160120 | A1 * | 6/2010 | Duchovne | A63B 21/00178 482/52 |
| 2010/0179032 | A1 * | 7/2010 | Perry | A63B 71/0036 482/94 |
| 2010/0300906 | A1 * | 12/2010 | Moore | A45C 13/02 206/315.1 |
| 2012/0184401 | A1 * | 7/2012 | Shepherd | A63B 63/083 473/481 |
| 2016/0089559 | A1 * | 3/2016 | Smith | A63B 24/0062 482/5 |
| 2016/0107062 | A1 | 4/2016 | Zimmerman et al. | |
| 2016/0320797 | A1 | 11/2016 | Ram | |
| 2017/0007884 | A1 * | 1/2017 | Deutsch | A63B 71/0622 |
| 2017/0065845 | A1 * | 3/2017 | Pinkus | A63B 21/4035 |
| 2017/0100622 | A1 * | 4/2017 | Wall | A63B 21/4029 |
| 2017/0120131 | A1 * | 5/2017 | Hedberg | A63B 71/0036 |
| 2017/0266503 | A1 | 9/2017 | Watterson et al. | |
| 2018/0133538 | A1 * | 5/2018 | Jones | A63B 21/0603 |
| 2018/0140888 | A1 * | 5/2018 | Towley, III | A63B 21/0618 |
| 2018/0236298 | A1 * | 8/2018 | Donnelly | A63B 21/0726 |
| 2019/0126122 | A1 * | 5/2019 | Vester | A63B 71/0036 |
| 2019/0240528 | A1 * | 8/2019 | Donnelly | A63B 21/4029 |
| 2019/0388724 | A1 | 12/2019 | Polinsky | |
| 2020/0077787 | A1 * | 3/2020 | Bhattacharya | A47B 9/16 |
| 2020/0101346 | A1 * | 4/2020 | Chen | A63B 21/4029 |
| 2020/0269078 | A1 * | 8/2020 | Lilly | A63B 6/00 |
| 2020/0306575 | A1 * | 10/2020 | Knox | A63B 21/154 |
| 2021/0138332 | A1 | 5/2021 | Dalebout et al. | |
| 2021/0322815 | A1 * | 10/2021 | Chen | A63B 21/078 |
| 2022/0054891 | A1 * | 2/2022 | Owusu | A63B 24/0062 |
| 2022/0134165 | A1 * | 5/2022 | Fray | A63B 21/4033 482/129 |
| 2022/0288441 | A1 * | 9/2022 | Lanier | A63B 21/4029 |
| 2022/0288442 | A1 * | 9/2022 | Lanier | A63B 24/0087 |
| 2022/0387841 | A1 * | 12/2022 | Lê Minh | A63B 23/03508 |
| 2023/0016579 | A1 * | 1/2023 | Chen | A63B 21/0728 |
| 2023/0026251 | A1 | 1/2023 | Tracy et al. | |
| 2023/0027387 | A1 * | 1/2023 | Augustin | A63B 21/078 |

FOREIGN PATENT DOCUMENTS

| | | |
|---|---|---|
| KR | 20090075085 A | 7/2009 |
| WO | 2023004410 A2 | 1/2023 |
| WO | 2023004413 A2 | 1/2023 |

OTHER PUBLICATIONS

U.S. Appl. No. 63/354,321 titled "Exercise System With Translatable and Rotatable Display" filed Jun. 22, 2022.
Screen captures from YouTube video clip entitled "Inspired by Glass: Corning Fitness Mirror Prototype" 3 pages, uploaded on Feb. 15, 2017 by user "Corning Incorporated". Retrieved from Internet: <https://www.youtube.com/watch?v=iMPeDcRDv2g>., Feb. 15, 2017.
"ASUS ProArt Display PA328Q Professional Monitor—32" Datasheet [online]. ASUS Global, Apr. 18, 2019 [retrieved on Dec. 6, 2022]; Entire document. Retrieved from the internet: URL: https://www.asus.com/Commercial-Monitors/ProArt-PA328Q".
"International Search Report and Written Opinion for PCT/US2022/074042, mailed on Jan. 25, 2023".
"International Search Report and Written Opinion for PCT/US2022/074045, mailed on Jan. 20, 2023".

\* cited by examiner

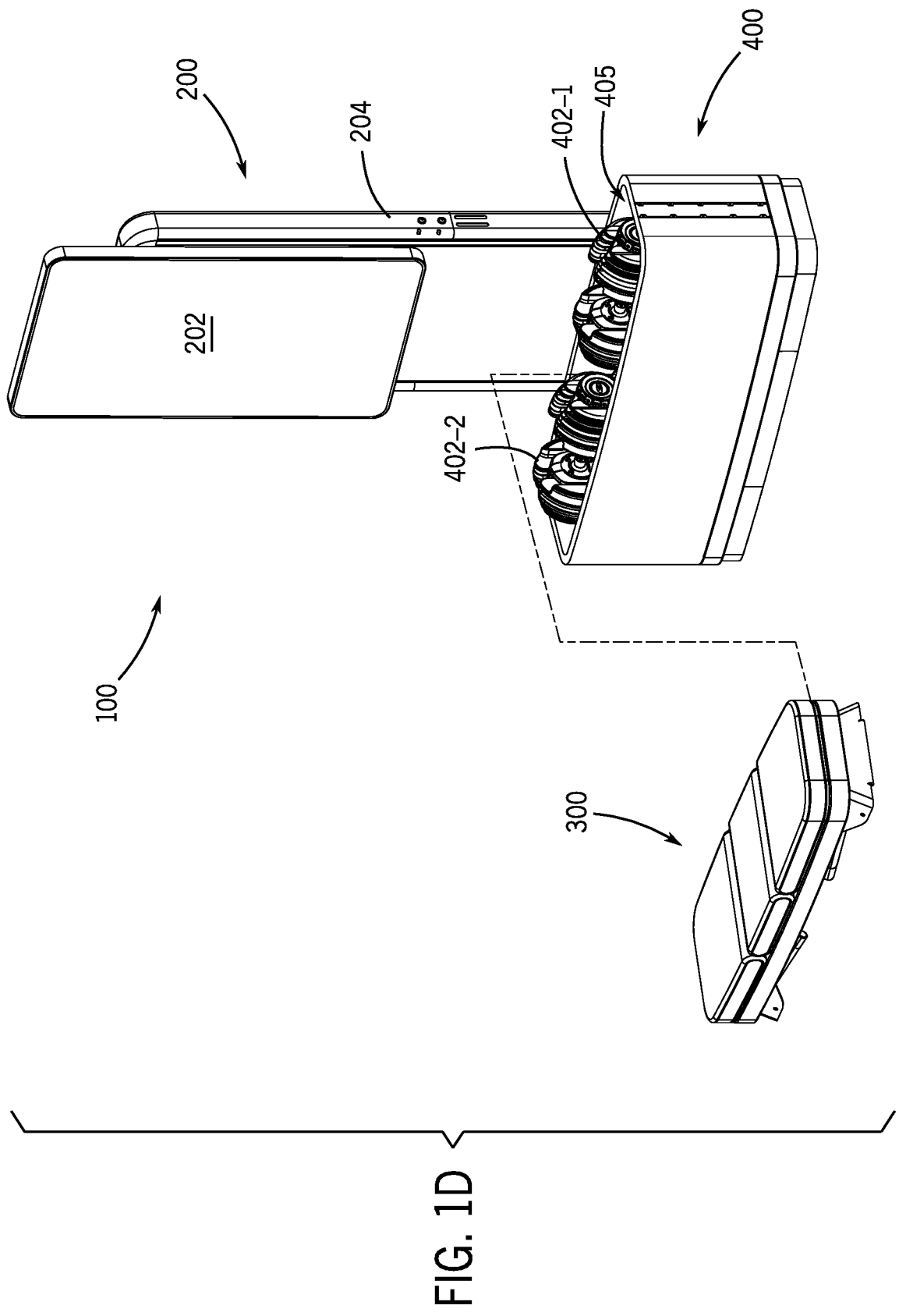

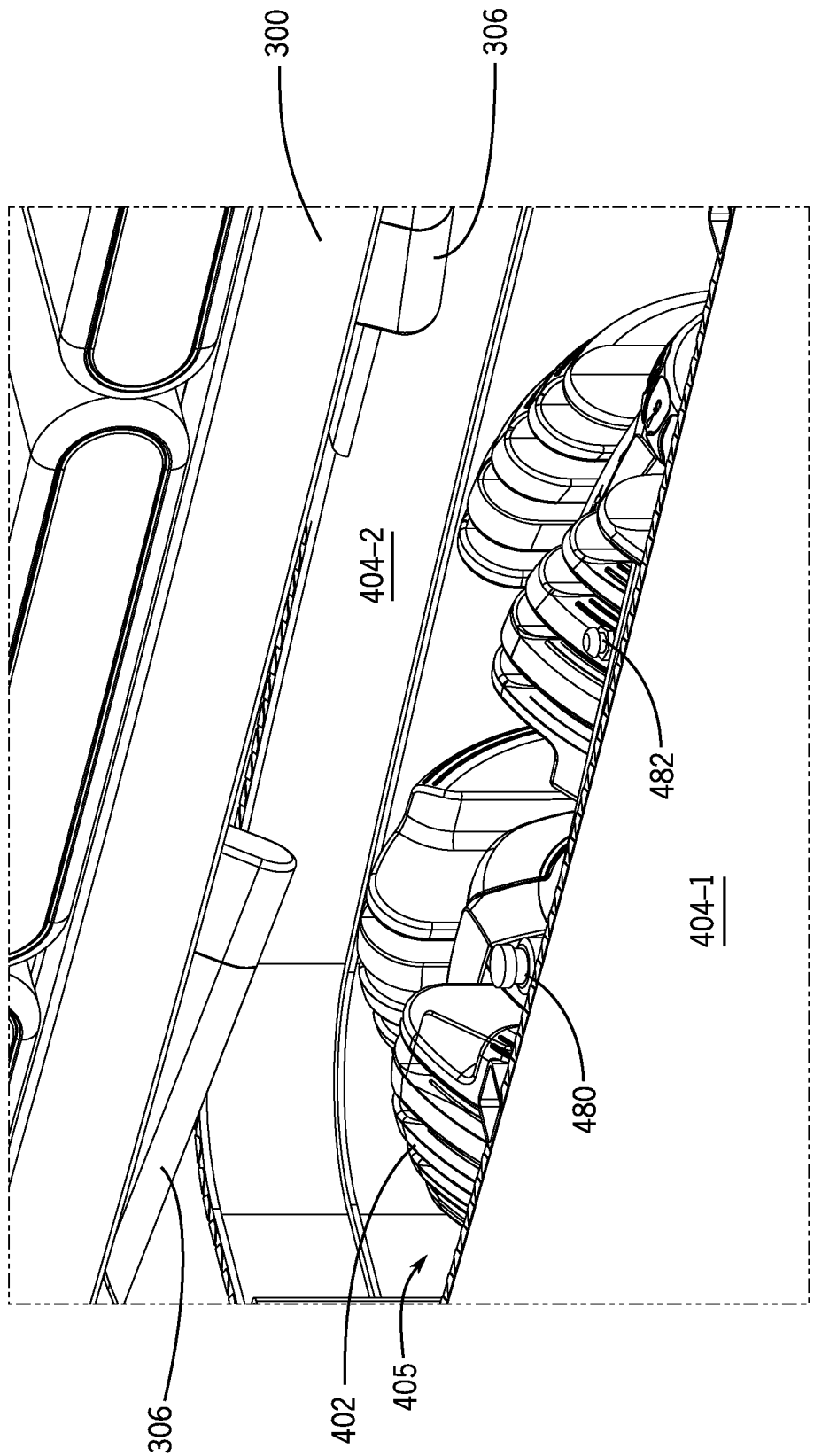

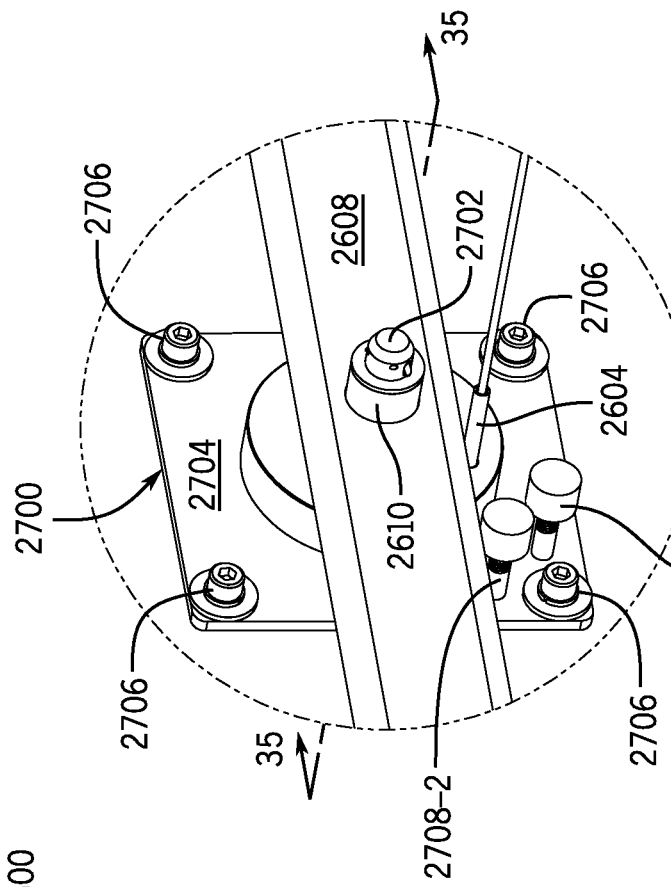
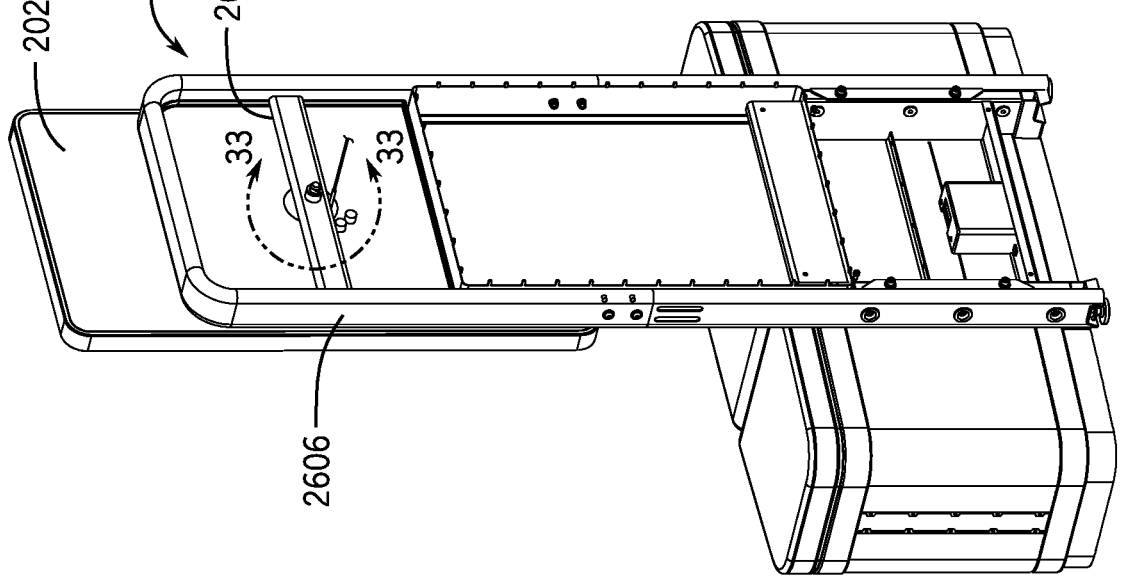
FIG. 33
FIG. 32

FREE-WEIGHT EXERCISE SYSTEM

CROSS REFERENCE TO RELATED APPLICATIONS

This application claims the benefit of priority pursuant to 35 U.S.C. § 119(e) of: U.S. provisional patent application No. 63/245,727, filed Sep. 17, 2021, entitled "Free-Weight Exercise System"; U.S. provisional patent application No. 63/224,790, filed Jul. 22, 2021, entitled "Fitness Coaching Platform"; U.S. provisional patent application No. 63/308,422, filed Feb. 9, 2022, entitled "Exercise System with Translatable and Rotatable Display"; U.S. provisional patent application No. 63/354,321, filed Jun. 22, 2022, entitled "Exercise System With Translatable and Rotatable Display"; U.S. provisional patent application No. 63/245,727, filed Sep. 17, 2021, entitled "Free-Weight Exercise System"; and U.S. utility application Ser. No. 17/814,311, filed Jul. 22, 2022, and entitled "Exercise System with Translatable and Rotatable Display" all of which are hereby incorporated by reference herein in the entirety.

FIELD

The present disclosure relates generally to a free-weight exercise system that includes at least one of a display subsystem and a weight elevation subsystem.

BACKGROUND

While many people use weights (e.g., dumbbells, barbells, kettlebells, other free weights, etc.) for exercise, for example in the home, a user may not have sufficient space in their home to have a dedicated exercise area and it may be desirable for them to combine their "exercise area" with their living space, such as their living room, bedroom, or other room in the home that may be used to receive or entertain guests. Exercise equipment such as weights and weight benches can be unsightly and contribute to a cluttered environment, making them less desirable for placement in a person's living space. Designers and manufacturers of exercise equipment, thus, continue to seek improvements thereto.

BRIEF SUMMARY

Embodiments of a free-weight exercise system are disclosed. In one embodiment, the free-weight exercise system includes a storage compartment configured to enclose free-weight exercise equipment. The storage compartment includes a platform configured to support the free-weight exercise equipment; a lift assembly configured to raise and lower the platform relative to a base of the storage compartment; and a display mast extending upward from the storage compartment. The display mast is configured to mount and accommodate at least a 12 inch display at a position above the storage compartment.

Optionally in some embodiments, the storage compartment fully encloses the free-weight exercise equipment such that the free-weight exercise equipment is concealed from view when the platform is in a lowered position.

Optionally in some embodiments, the free-weight exercise system further includes an exercise bench reconfigurable between a first configuration in which the exercise bench operatively engages an opening of the storage compartment to provide a removable cover for the storage compartment and a second configuration in which the exercise bench can support a user in a seated position.

Optionally in some embodiments, the free-weight exercise system further includes a display rotatably coupled to the display mast by a display mount.

Optionally in some embodiments, the display mount includes a shaft rotatably coupled to the display mast.

Optionally in some embodiments, the free-weight exercise system further includes a pawl slidably coupled to an end portion of the shaft and operative to be received in a receptacle coupled to the display mast.

Optionally in some embodiments, the free-weight exercise system further includes a ring coupled to the display mast. The ring includes a detent formed on an inner surface thereof; a retainer plate received in the ring; a cam received in a slot formed in the retainer plate. The cam is selectively biased by a biasing element into the detent.

Optionally in some embodiments, the cam disengages from the detent when the display is rotated between a landscape orientation and a portrait orientation.

Optionally in some embodiments, the display mount includes a sensor configured to detect a position of the display.

Optionally in some embodiments, the display mount includes a display plate coupled to the display; and a frame plate rotatably coupled to the mast.

Optionally in some embodiments, the frame plate includes an arcuate slot and a friction adjuster is received in the arcuate slot and adapted to adjust a level of force that causes the display to rotate.

Optionally in some embodiments, the display plate includes a plurality of hooks; the frame plate includes a plurality of slots adapted to receive the respective plurality of hooks to couple the display plate to the frame plate.

Optionally in some embodiments, the frame plate is coupled to a biased pawl that selectively engages the display plate to couple the display plate to the frame plate.

Optionally in some embodiments, the lift assembly includes a lift mechanism configured to remain fully enclosed within the storage compartment when the platform is in either the raised or lowered position.

Optionally in some embodiments, the lift assembly is positioned below the platform.

Optionally in some embodiments, the lift assembly includes scissor linkage and a lift mechanism operative to raise and lower the lift assembly.

Optionally in some embodiments, the scissor linkage includes: a first arm. A first end portion of the first arm is coupled to the lift mechanism, and a second end portion of the first arm opposite the first end portion is coupled to the platform; a second arm. A first end portion of the second arm is coupled to the base, and a second end portion of the first arm opposite the first end portion is coupled to a guide element; a track coupled to an underside of the platform. The guide element is movably received in the track.

Optionally in some embodiments, the lift assembly includes a lift mechanism partially disposed above the platform and partially disposed below the platform.

Optionally in some embodiments, the lift mechanism is supported by a column extending upwardly from the platform.

Optionally in some embodiments, the lift mechanism includes: a rotary actuator configured to rotate a linear actuator; a movable element rotatably coupled to the linear actuator. The movable element is coupled to a movable element mount that extend portions upward from the base.

Optionally in some embodiments, the mount conceals the linear actuator when the lift assembly is in a lowered position.

Optionally in some embodiments, the free-weight exercise system further includes a guide rigidly coupled to the base and configured to support the platform as the platform moves between raised and lowered positions.

Optionally in some embodiments, the guide includes a flange disposed at an upper end thereof, the flange configured to center the platform when the platform is in the raised position.

Optionally in some embodiments, the free-weight exercise system further includes a sensor operative to detect a removal of the exercise bench and automatically trigger a movement of the platform from the lowered to a raised position.

In one embodiment, a free-weight exercise system includes a storage compartment with a base configured to enclose a free-weight exercise equipment; a platform movably coupled to the storage compartment and configured to securely support the free-weight exercise equipment; and a lift assembly configured to lower and raise the platform relative to the base with the free-weight exercise equipment on the platform.

Optionally in some embodiments, the lift assembly includes a lift mechanism configured to remain fully enclosed within the storage compartment when the platform is in either the raised or lowered position.

Optionally in some embodiments, the lift assembly is positioned below the platform.

Optionally in some embodiments, the lift assembly includes scissor linkage and a lift mechanism operative to raise and lower the lift assembly.

Optionally in some embodiments, the scissor linkage includes: a first arm. A first end portion of the first arm is coupled to the lift mechanism, and a second end portion of the first arm opposite the first end portion is coupled to the platform; a second arm. A first end portion of the second arm is coupled to the base, and a second end portion of the first arm opposite the first end portion is coupled to a guide element; a track coupled to an underside of the platform. The guide element is movably received in the track.

Optionally in some embodiments, the lift assembly includes a lift mechanism partially disposed above the platform and partially disposed below the platform.

Optionally in some embodiments, the lift mechanism is supported by a column extending upwardly from the platform.

Optionally in some embodiments, the lift mechanism includes a rotary actuator configured to rotate a linear actuator; a movable element rotatably coupled to the linear actuator. The movable element is coupled to a mount that extend portions upward from the base.

Optionally in some embodiments, the mount conceals the linear actuator when the lift assembly is in a lowered position.

Optionally in some embodiments, the free-weight exercise system further includes a guide rigidly coupled to the base and configured to support the platform as the platform moves between raised and lowered positions.

Optionally in some embodiments, the guide includes a flange disposed at an upper end thereof, the flange configured to center the platform when the platform is in the raised position.

Optionally in some embodiments, the free-weight exercise system of further including a display mast extending upward from the storage compartment. The display mast is configured to mount and accommodate a display.

In one embodiment, a free-weight exercise system includes: a base; a display mast extending upward from the base; a platform coupled to the base and adapted to support a free-weight exercise equipment at a first height; a display mounted to the display mast by a display mount at a second height above the first height and rotatably coupled to the display mast.

Optionally in some embodiments, the free-weight exercise system further includes a display rotatably coupled to the display mast.

Optionally in some embodiments, the free-weight exercise system further includes a pawl slidably coupled to an end portion of the shaft and operative to be received in a receptacle coupled to the display mast.

Optionally in some embodiments, the free-weight exercise system further includes: a ring coupled to the display mast. The ring includes a detent formed on an inner surface thereof; a retainer plate received in the ring; a cam received in a slot formed in the retainer plate. The cam is selectively biased by a biasing element into the detent.

Optionally in some embodiments, the cam disengages from the detent when the display is rotated between a landscape orientation and a portrait orientation.

Optionally in some embodiments, the display mount includes a sensor configured to detect a position of the display.

Optionally in some embodiments, the display mount includes: a display plate coupled to the display; and a frame plate rotatably coupled to the mast.

Optionally in some embodiments, the frame plate includes an arcuate slot and a friction adjuster is received in the arcuate slot and adapted to adjust a level of force that causes the display to rotate.

Optionally in some embodiments the display plate includes a plurality of hooks; the frame plate includes a plurality of slots adapted to receive the respective plurality of hooks to couple the display plate to the frame plate.

Optionally in some embodiments, the frame plate is coupled to a biased pawl that selectively engages the display plate to couple the display plate to the frame plate.

Optionally in some embodiments, the free-weight exercise system further includes a lift assembly configured to raise and lower the platform and the free-weight exercise equipment relative to the base.

Optionally in some embodiments, the free-weight exercise system further includes a storage compartment configured to enclose the free-weight exercise equipment when the platform is in a lowered position.

BRIEF DESCRIPTION OF THE DRAWINGS

FIG. 1D is a partially exploded isometric view of the free-weight exercise system of FIG. 1A showing the removable exercise bench in a second configuration and the exercise weight platform in a second configuration.

FIG. 2 is a detail view of a portion of the free-weight exercise system of FIG. 1.

FIG. 32 is a rear isometric view of an embodiment of a display subsystem suitable for use with the free-weight exercise system of FIG. 1A.

FIG. 33 is a detail view of a portion of the display subsystem of FIG. 32.

Figure 1A:
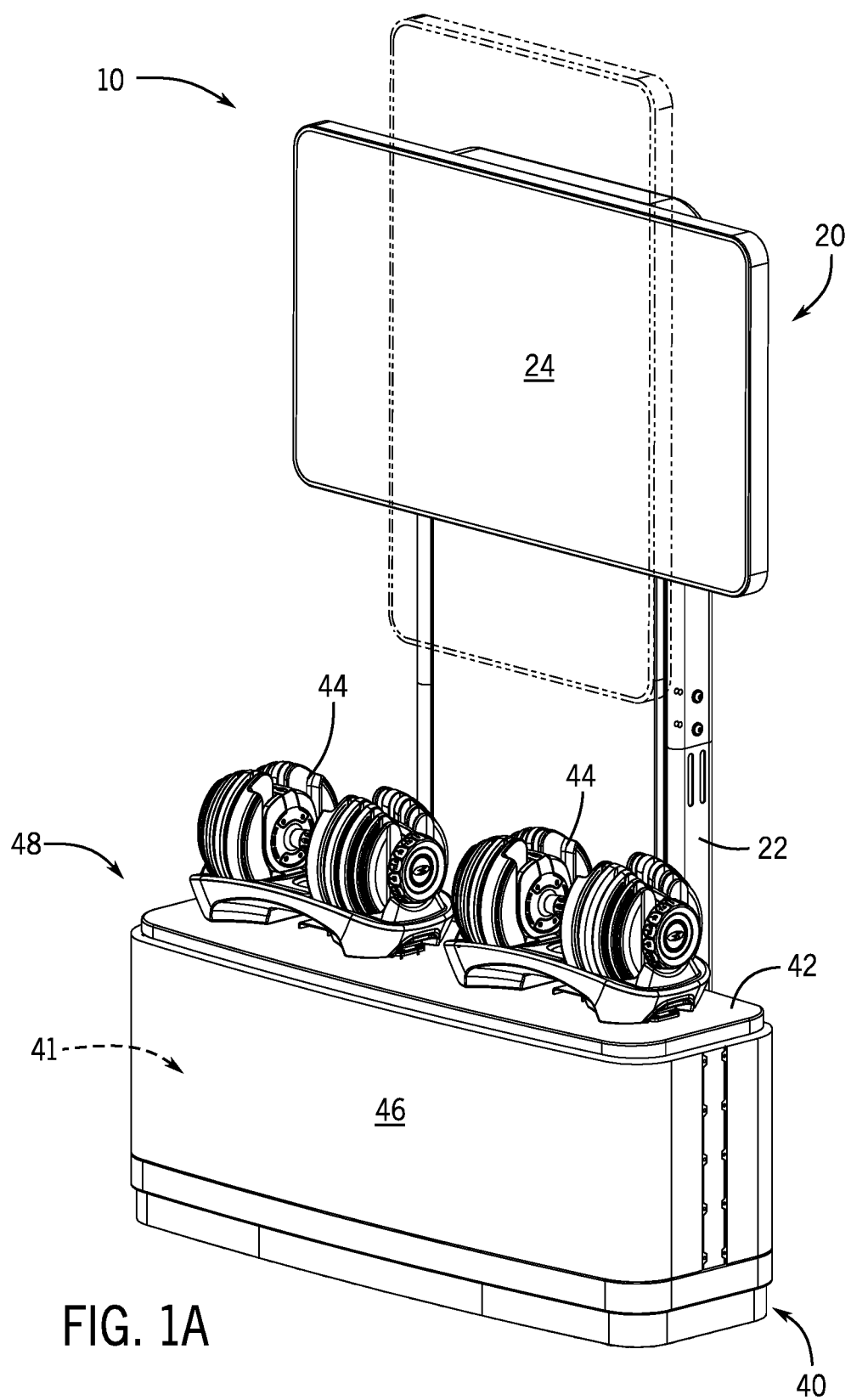
FIG. 1A is an isometric view of a free-weight exercise system.

The drawings are not necessarily to scale. In certain instances, details unnecessary for understanding the disclosure or rendering other details difficult to perceive may have been omitted. In the appended drawings, similar components and/or features may have the same reference label. Further, various components of the same type may be distinguished by following the reference label by a letter or number that distinguishes among the similar components. If only the first reference label is used in the specification, the description is applicable to any one of the similar components having the same first reference label irrespective of the second reference label. The claimed subject matter is not necessarily limited to the particular examples or arrangements illustrated herein.

DETAILED DESCRIPTION

The present disclosure pertains to an exercise system (also referred to as a coaching platform). In some embodiments, the exercise system is specifically configured to exercising with free-weights, and may be referred to as a free-weight exercise system. In some such embodiments, the free-weight exercise system is configured to support a set of free weights at a location providing convenient access to the user. For example, the free weights may be supported on an elevated platform which is placed, in some cases selectively through a motorized or other suitable lift system, at a height above the ground that is at least knee-level (or above), which may reduce the risk of injury to the user. In some embodiments, the weights-supporting platform may be configured to move up and down, via an actuation mechanism, for further lowering or raising the platform and/or for storage. In some embodiments, the weights-supporting platform is at least partially enclosed to at least partially conceal the weights when not in use providing a storage compartment. The storage compartment, or at least a portion thereof such as the weigh-supporting platform, may be adapted to be selectively lowered and raised, such as to selectively stow and provide, respectively, the set of free weights, such as dumbbells, barbells, kettle bells, weight plates, or other free weights, at the elevated location for use during exercise. The storage compartment, weights-supporting platform and/or actuation mechanism for lowering and raising the platform may form a weight elevation subsystem of the coaching platform. In some embodiments, the storage compartment may be further equipped with a lid that substantially covers any opening used for retrieval or stowing of the weights. The lid (or cover) may optionally be configured to also function as a seating platform (e.g., when positioned over the storage compartment) and/or an exercise bench (e.g., when removed and expanded into its use configuration. As such the cover of storage compartment may also double as a storable exercise bench, thereby further saving space and enhancing the aesthetics of the user's living space.

Users may wish to use video-based coaching or integrate audio-visual content in some other manner into their exercise routine. However, many users do not have a suitable viewing device in their exercise area, such as near their weights, making the incorporation of video-based coaching or other content into their exercise routine cumbersome. The exercise system (or coaching platform) according to the present disclosure may include a display, which may be mounted proximate the elevated platform. For example, the display may be movably (e.g., rotatably) mounted on a display mast which extends upward from the elevated platform forming a display subsystem. In some embodiments, the display is adapted to show an exercise routine such as a live coaching session, pre-recorded exercise video/audio media, exercising content which may be tailored for the user (e.g., a specific set of exercises selected for the user and/or exercise form guidance adapted to the user), user data such as biometric information, or the like, and any other audio-visual content that may facilitate the user's exercise. The display may be selectively positionable in different orientations. For example, the display may be movable between a portrait orientation (e.g., where a long dimension of the active area of the display is disposed substantially horizontally and a short dimension is disposed substantially vertically) and a landscape orientation (e.g., where a short dimension of the active area of the display is disposed substantially horizontally and a long dimension is disposed substantially vertically). The display may be configured for operation in a plurality of different orientations, such as landscape orientation and portrait orientation. In some embodiments, the display of the coaching platform may be sufficiently large to enable viewing of the content from a distance, such as from at least a foot or multiple feet away from the display, which can provide sufficient freedom of movement for the user while performing an exercise. As such, the display mast and selectively adjustable display mount may be configured for securely mounting and supporting, and for selectively repositioning (e.g., re-orienting) the display by the user with ease and convenience. In some embodiments, the display may have an active area (i.e., the area that displays images) sized at about 21 inches by about 37 inches. In some embodiments, the display may have an active area of about 12 inches by about 20 inches. In some embodiment, the display mast may extend from about 20 inches to about 37 inches or more above the height of the elevated platform. In yet further embodiments, the display subassembly may be configured to enable vertical repositioning of the display (e.g., along or via an adjustment of the height of the display mast).

FIG. 1A shows an embodiment of a free-weight exercise system 10. The free-weight exercise system 10 includes a base 40. The base 40 supports the free-weight exercise system 10 on a support surface such as a floor. A platform 42 is disposed above the base 40. The platform 42 is configured to stably support one or more weights 44 at a desired height above the ground. For example, platform 42 is sufficiently stable and strong to support the one or more exercise weights 44 at a sufficient distance (e.g., above the ground and/or base 40) to position the one or more exercise weights 44 at a desired height, such as an ergonomic height for grasping by a user. The weights 44 may be adjustable weights (e.g., a set of adjustable dumbbells, an adjustable barbell, etc.) in which case a set of weights or a barbell stably supported on the platform is configured to stably support a total additional weight ranging anywhere from about 50 lbs. to about 100 lbs. or more (e.g., the total weight of the free weights and any associated base that may be utilized for supporting unused weights and/or locking/unlocking the adjustable free-weight). While illustrated with an adjustable free-weight in FIG. 1A, it will be understood that the exercise system 100 may be used with free-weights of any other configuration (e.g., a set of conventional, non-adjustable or fixed-weight free weights). In some embodiments, the ergonomic height may be at a height above the knees of a typical adult user. In some embodiments, the desired height may be lower or higher. In some embodiments, the use height, which is the height of the platform 42 during exercise, may be selectively adjustable by a user, for example via an actuation mechanism. In some embodiments, the platform 42 is positionable between a lowered or retracted configuration, also referred to as the stowed configuration, and a raised or deployed configuration, also referred to as the use configuration. As will be discussed further below, the actuation mechanism for raising and lowering the bench may be configured to stably (e.g., while maintaining the platform level) actuate the platform along the range of motion.

In some embodiments, the platform 42 may be lowered (or stowed) into a shroud 46 which at least partially encloses the platform 42 and free weight(s) (e.g., the one or more weights 44) supported on the platform 42 to provide a storage compartment 41 of the exercise system 10. In some embodiments, the shroud 46 may substantially fully encircle the platform 42 and weight(s), when the platform 42 is in the stowed position, whereby the platform 42 and weight(s) 44 are positioned within the compartment 41 formed by the shroud 46, so as to conceal the one or more exercise weights 44 from view when not in use. In some embodiments, the shroud 46 may conceal the platform 42 when in the stowed position but may not fully conceal the weight(s) 44 from view. In some embodiments, the platform 42 may be configured to remain in a fixed vertical (e.g., the elevated) position and may not be concealed within the shroud 46. The shroud 46, if included, may in such embodiments conceal other components of the coaching platform, e.g., at least a portion of the frame supporting the platform 42 at the elevated position.

In some embodiments, the free-weight exercise system 10 includes a lift assembly 48 operative to move the platform 42, together with the one or more exercise weights 44 supported on the platform 42, between the retracted and deployed configurations. The free-weight exercise system 10 may include a cover 30 that is selectively removable from the base 40 and operative to cover the internal storage volume formed by the shroud 46. For example, when the exercise weights are not in use, and the lift assembly 48 is in a retracted position, the cover 30 may be placed above the shroud so as to enclose the storage compartment 41.

In some embodiments, the frame of the free-weight exercise system 10 includes a mast 22 mounted to extend above the base 40. The mast 22 is configured to support a display 24. In some embodiments, the mast 22 movably supports the display 24. The mast is configured to position the display 24 at a predetermined height above the height of the platform 42 and consequently above the support surface (e.g., the ground). In some embodiments, the display is repositionable (e.g., rotatable between a landscape orientation and a portrait orientation) while remaining mounted to the mast 22.

The free-weight exercise system 10 may be adapted to display any desired video content. For example, the exercise system 10 may display exercise content such as a live session with a trainer or a pre-recorded video where a trainer demonstrates an exercise. The demonstrated exercise may, or may not, make use of the one or more exercise weights 44. The display 24 may be rotatable to between different orientations (e.g., landscape and portrait, as shown in solid line and phantom line, respectively, in FIG. 1A), such as to accommodate the content being displayed. When not in use for exercise, the display 24 may be configured to display a screen saver (e.g., a digital display of a dial clock or clock of user-selected format, or a decorative image or other audio-visual content unrelated to functions of the system 10 as a fitness coaching platform. The free-weight exercise system 10 may thus provide the benefit of positioning the one or more exercise weights at a convenient location (e.g., proximate to the display which may provide coaching) for easy use by a user while also providing a suitable-size display 24 that a user can view while exercising.

Figure 1C:
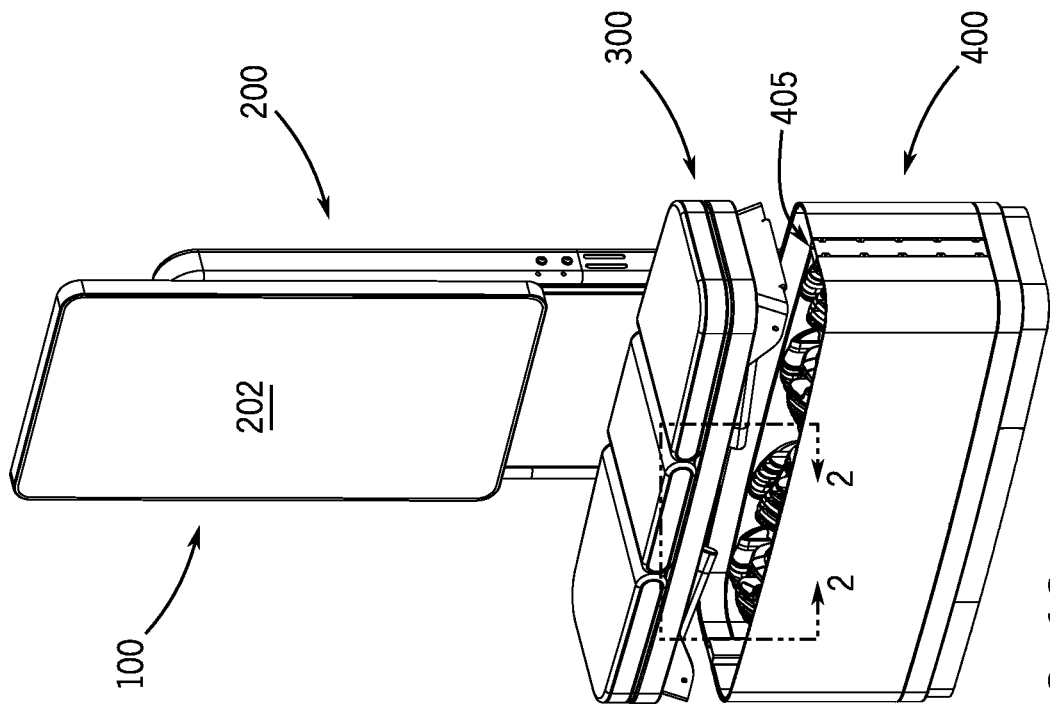
FIG. 1C is a partially exploded isometric view of the free-weight exercise system of FIG. 1A showing a removable exercise bench in a first configuration and an exercise weight platform in a first configuration.
Figure 1B:
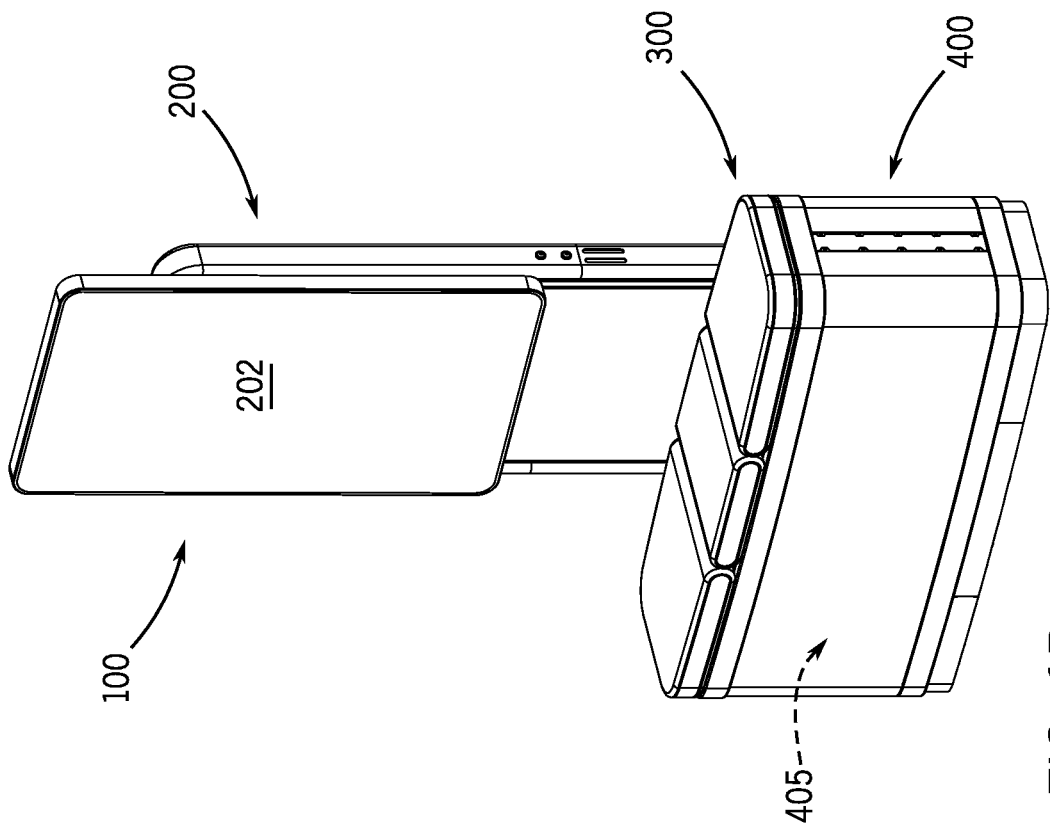
FIG. 1B is an isometric view of a free-weight exercise system.
Figure 1E:
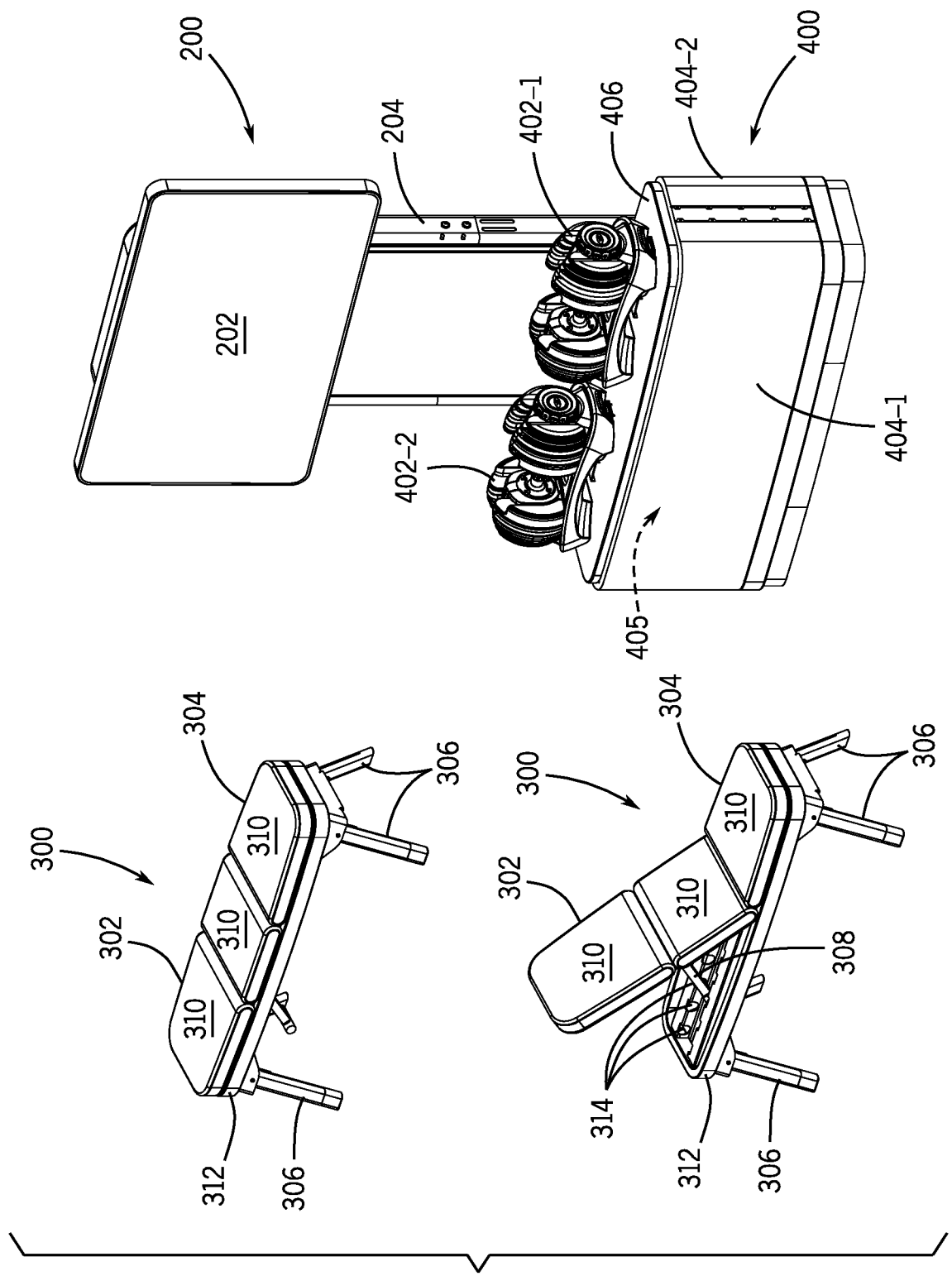
FIG. 1E is a partially exploded isometric view of the free-weight exercise system of FIG. 1A showing the removable exercise bench in a third and fourth configuration and the exercise weight platform in a third configuration.

FIGS. 1B-1E show further examples of an exercise system 100 according to the present disclosure, shown again as a free-weight exercise system. The free-weight exercise system 100 includes a display 202, a storage compartment 405 and a cover thereof, provided by the exercise bench 300. The display 202 may be mounted to the upwardly-extending frame (e.g., mast) of the exercise system 100 using any of the display mounts described herein or any other suitable display mount technology. The storage compartment 405 may include a selectively stowable platform 406 (see e.g., FIG. 1E) in accordance with any of the examples disclosed herein. The storage compartment 405 may be selectively enclosed by a cover, which in this example is also configured as a storable bench 300, shown in FIG. 1B in a folded (or storage) configuration, and shown in FIG. 1E in an unfolded (or use) configuration. As shown in FIG. 1E, the bench may have one or more adjustable components, such as a pivotally coupled backrest, to enable to user to configured the bench in a desired supported position provided by the bench (e.g., for use while seated or while laying prone or supine). The bench 300 is shown in a stowed orientation.

FIG. 1C shows the cover (e.g., bench 300) in the process of being removed from the free-weight exercise system 100. In FIG. 1C the weight supporting platform 406 is in a retracted or lowered position with the weights stored within an internal volume 405 (shown for example in FIG. 2) formed by a shroud 404. The storage compartment 405 may fully enclose the exercise weights. As shown in FIG. 1E, the shroud 404 may be provided by at least one shroud portions (e.g., first (or front) shroud portions 404-1 and second (or rear) shroud portion 404-2) operatively joined (e.g., fixed) to a frame of the exercise system 100. The exercise (i.e. free) weight(s) is shown as a pair of adjustable dumbbells 402-1 and 402-2, showed in the stowed (or lowered) position in FIGS. 1B and 1n the elevated position in FIG. 1E.

FIG. 1D shows an intermediate state of the exercise system 100 in which the cover (e.g., bench 300) has been removed from the storage compartment 405 and placed on a support surface such as a floor or the ground. FIG. 1D also shows the platform 406 supporting the weights 402-1 and 402-2 in an intermediate position between the fully retracted or lowered position and a fully deployed (or elevated) position. In some embodiments, the platform 406 is configured to begin to elevate automatically when the cover (e.g., bench 300) of the storage compartment 405 is removed. This can be achieved by a two-way switch 480 or sensor 482 that automatically changes from a first state to a second state upon removal of the cover. As shown for example in FIG. 1D, the display 202 may be supported on an upwardly extending frame (also referred to as display mast) 204 to provide a display subsystem or assembly 200. The upwardly extending frame 204 may be fixed to a base frame of the storage compartment and may thus extend above the storage compartment. The display mast 204 is configured to mount and accommodate a display at a position above the storage compartment 405.

In some examples the cover of the storage compartment is implemented by a storable bench 300, and example of which is shown and described further with reference to FIG. 1E. The bench 300 includes a plurality of legs 306 that support a bench frame 312. The bench frame 312 may support a first portion 302 which is inclinable to provide a backrest for exercising in a seated position and a second portion 304, which may be configured to remain fixed relative to the bench frame 312. The first portion 302 may be pivotally coupled to the second portion 304 and be selectively positionable into one of a plurality of inclined positions, such as to support a portion of a user's body (e.g., torso) in one or more seated or inclined positions while using the weights 402-1 and/or 402-2 of the free-weight exercise system 100. For example, a prop 308 may be coupled to the first portion 302 and the bench frame 312 may include one or more receptacles 314. The receptacles 314 may be adapted to receive an end portion of the prop 308 to selectively position the first portion 302 at different positions or angles relative to the second portion 304. As used herein, an end portion is any portion of a structure to one side of a midpoint of the structure, up to and including the midpoint. Either the first portion 302 or the second portion 304 may include a cushion 310 suitable to make the bench 300 more comfortable for a user to use. The bench 300 may be selectively storable to cover a storage compartment such as a storage compartment 405. The bench 300 may be selectively removable such as for use in exercise.

FIG. 1E shows the bench 300 in a first use configuration in which foldable legs 306 are extended but the first portion 302 is in a lowered position (e.g., providing a substantially flat seating/laying surface) and a second configuration where in which the first portion 302 is in an inclined position (e.g., providing a back rest). While a folding bench is shown in FIG. 1E, it will be understood that the bench may, in some embodiments, be a substantially flat bench without an inclining portion. Yet in other examples, the cover that encloses the storage compartment 405 may not be configured to function as an exercise bench. In some such examples, the exterior surface of the cover may simply provide an aesthetically pleasing surface and/or may be cushioned in some cases, such as to prove a bench seat when the cover is positioned over the storage compartment but may not otherwise have retractable legs and/or other moving parts. FIG. 1E shows the display 202 in a landscape orientation and the platform 406 in the fully deployed position in which the platform 406 supports the weights 402 at an elevated location suitable for easier/more convenient access by a user.

FIG. 2 shows an enlarged view of a portion of the free-weight exercise system 100 indicated by line 2-2 in FIG. 1C. In some embodiments, the exercise system 100 may include a sensor 482. The sensor 482 may be any device suitable to detect the presence of the cover (e.g., bench 300) over the opening of the storage compartment 405 of the free-weight exercise system 100. The sensor 482 may generate a sensor signal that triggers the raising of the platform 460 when the cover is not detected. The free-weight exercise system 100 may include a user input 480 (e.g., a manual switch). The user input 480 can be any device configured for manual actuation. When actuated, the user input may trigger lowering of the platform 460 of the free-weight exercise system 100 to stow the one or more exercise weights 402. The user input 480 and/or sensor 482 may be implemented by any of a switch, optical sensor, magnetic sensor, proximity sensor, or the like. The sensor 482 is configured to detect the removal and/or absence of the cover (e.g., bench 300) and to automatically generate a raising trigger that initiates raising of the platform 460 to raise. The user input 480 is configured to detect a user command (e.g., in the case of a manual switch, a manual actuation of the switch by a user) which generates a lowering trigger that initiates lowering of the platform 460. In some embodiments, the user input 480 and the sensor 482 may be combined in a single device.

FIGS. 3A-7 show a weight elevation subsystem 400 of an exercise system (e.g., 10, 100) according to embodiments of the present disclosure. The weight elevation subsystem 400 includes a base frame 410 that forms part of the frame of the exercise system (e.g., 10, 100). The base frame 410 supports the movable components of the weight elevation subsystem 400. The base frame 410 may form the base of the exercise system (e.g., 10 or 100) or it may be fixed to the base of the exercise system. The weight elevation subsystem 400 includes a lift assembly 403 coupled to the base frame 410 and adapted to move between a retracted and a deployed configuration. The lift assembly 403 is operatively associated with a lift mechanism 408 that moves the lift assembly 403 between the retracted and deployed configurations. The lift mechanism 408 may be implemented by any device that can apply sufficient force, e.g., to the lift assembly 403, to raise and lower a platform 406 with a certain amount of additional weight on the platform (e.g., the exercise weight(s)) between the retracted (or lowered) configuration and a deployed (or raised) configuration. In some embodiments of the weight elevation subsystem, a lift assembly may be driven (e.g., to lift or lower the platform) by a lift mechanism alone or in combination with manual force by the user. The lift assembly 403 may be coupled to a platform 406 adapted to support one or more exercise weights 402 via one or more joints 418 (shown for example in FIGS. 3B, 5, and 6). The lift assembly 403 may be implemented by at least one scissor link, in this example by a pair of scissor links, each coupled to an opposite side (e.g., a front side and rear side) of the platform 406. Each of the scissor links includes two crossed and pivotally connected links or bars. Upper ends of the links are operatively coupled to the platform 406, forming e.g., upper pivotal, slidable, rollable, translatable or other suitable joints. The lower ends of the links are coupled to the base frame 410, forming e.g., lower pivotal, slidable, rollable, translatable or other suitable joints. Thus a set of four bars form part of the lift assembly 403 of this example. In other examples, more or fewer number of links (or bars) may be used to implement the lift assembly of a weight elevation subsystem according to the present disclosure.

Figure 6:
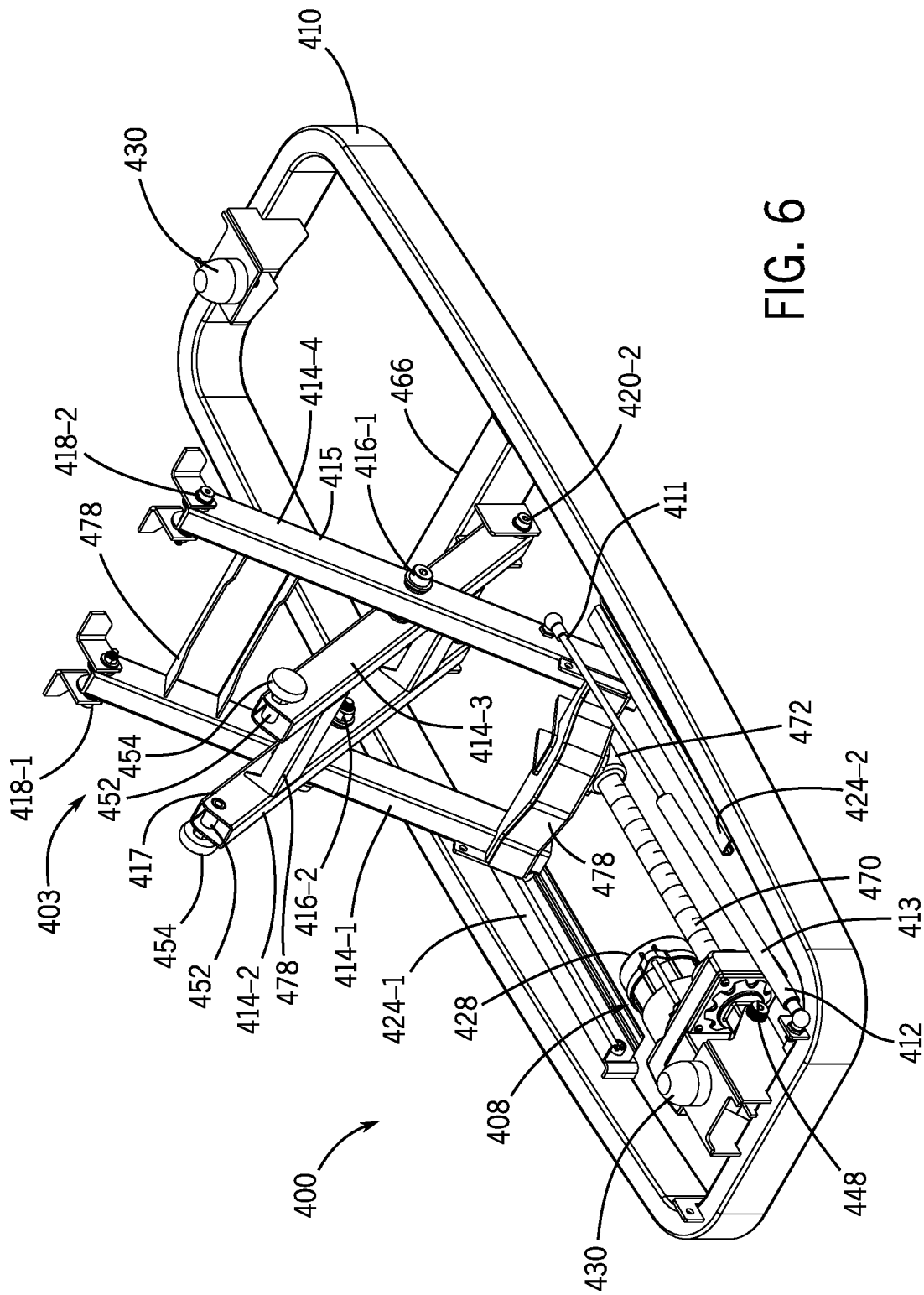
FIG. 6 is a top isometric view of a portion of the weight elevation subsystem of FIG. 3A with the platform removed for clarity.
Figure 7:
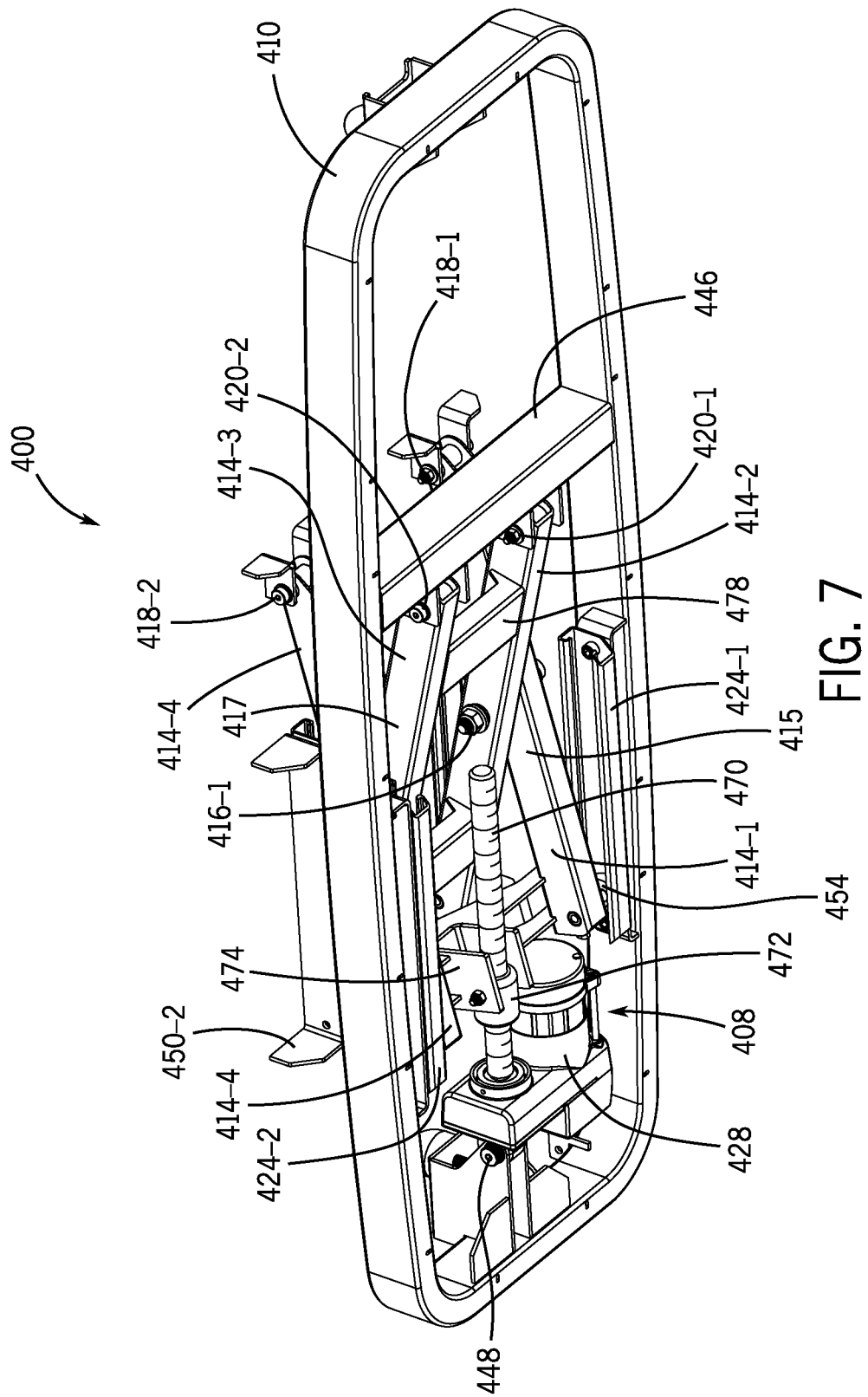
FIG. 7 is a bottom isometric view of a portion of the weight elevation subsystem of FIG. 3A with the platform removed for clarity.

As shown, for example, in FIGS. 6 and 7, the base frame 410 may form a closed base that provides mounting points for components of the weight elevation subsystem 400. In some embodiments (e.g., when the weight elevation is enclosed by a shroud), the mounting points are contained within a perimeter defined by the closed base. The base frame 410 may have a transverse support 466 provided, e.g., by a cross beam extending transversely, although not necessarily perpendicularly in all embodiments, to a longitudinal dimension of the base frame 410. The transverse support 466 may provide lateral stiffness to the weight elevation subsystem 400. The transverse support 466 may provide mounting points for the lower end of the lift assembly 403. For example, at least some of the links 414 of the lift assembly 403 may be pivotally mounted to the transverse support 466, forming pivotal joints 420 therewith. In the present example, the lift assembly 403 includes a first scissor link formed by links 414-1 and 414-2, which are pivotally coupled at the pivot joint 416-2. The lift assembly includes a second scissor link spaced apart from the first scissor link and formed by links 414-3 and 414-4, which are pivotally coupled at the pivot joint 416-1. The lower ends of the links 414-2 and 414-3 are pivotally coupled to the base frame 410 via respective lower pivot joints 420-1 (see FIG. 7) and 420-2. The pivot joints 420 and the joint 416 may include respective bushings, bearings, or other suitable rotatable components suitable to pivotably couple the links 414 to the transverse support 466 and/or one another, respectively.

The lower ends of the links 414-1 and 414-4 are translatably coupled to the base frame 410, e.g., via one or more guide elements 454 provided at the lower ends of the links 414-1 and 414-4. For example, the lower ends of the links 414-1 and 414-4 may be rollably coupled to the base frame 410, e.g., via one or more rollers or wheels supported on respective pins or shafts 452 at the lower ends of the links 414-1 and 414-4. A rollable guide element, or elements rollably coupled, may be an element (e.g., a wheel, roller, or caster) that rotates or pivots (e.g., moves substantially with dynamic friction such as via a bearing or bushing) with respect to one member and moves substantially with static friction with respect to a second member (e.g., a surface of the roller, wheel or caster does not substantially slide with respect to the second member). In some embodiments, a rollable element may be combined with a sliding element such that the element moves with respect to the second member with both dynamic and static friction. The guide elements 454 (e.g., roller or wheel) of each of the links 414-1 and 414-2 is received in a respective lower track 424 extending along the longitudinal direction of the base frame 410. In the present example, first lower track 424-1 and second lower track 424-2 extend along a portion of the length of the base frame 410, and are be disposed on the opposite sides (e.g., front and rear sides) of the base frame 410 within the interior thereof.

In some embodiments, the lower tracks 424 may have a C-shaped cross section, and may be oriented with the opening of the channel facing toward or away from a centerline of the base frame 410 so as to capture (or substantially restrict vertical movement of) the respective guide element 454. The guide elements may be implemented by rollers, sliders, casters, bearings, or the like, or any suitable combination thereof. In other embodiments, the lower tracks 424-1 and 424-2 may be oriented differently, for example with the opening of the channel facing towards the platform 406, so as to restrict the movement of the lower ends of the links 414-1 and 414-4 along a substantially linear path.

The first and second scissor links are held at a fixed distance from one another by transverse braces 478, each of which extends between and rigidly couples a pair of the links 414. In the present example, the links 414-2 and 414-3, which are pivotally mounted to the base frame 410, are positioned between the links 414-1 and 414-4, which are pivotally mounted to the platform 406, and may thus be referred to as the inner links. The links 414-1 and 414-4 may conversely be referred to as the outer links. At least one transverse brace 478 extends between and rigidly connects the inner links and at least one other transverse brace 478 extends between and rigidly connects the inner links such that the set of inner links move substantially in unison and the set of outer links move substantially in unison, when the lift assembly 403 is operated to raise or lower the platform 406. The assembly of the link 414-1, link 414-4 and the respective brace 478 connecting these two links may form a first arm 415 of the lift assembly 403. The assembly of the link 414-2, link 414-3, and the respective brace 478 that joins these two links may form a second arm 417 of the lift assembly 403. In the present example, the second arm 417 is driven (or actuated) by the lift mechanism 408, and may be referred to as the driven arm, while the first arm 415 may be referred to as a follower arm. However, in other examples, the lift mechanism may instead be operatively coupled with the first arm to drive the first arm instead.

Similar to the lower ends of the links 414 of the lift assembly 403, the upper ends thereof for a combination of pivotal and translatable joints with the underside of the platform 406. Guide elements 454 are coupled to the upper ends of the links 414-2 and 414-3, which in this example form the follower arm of the lift assembly, and are operatively received by upper tracks 422, while the upper ends of the links 414-1 and 414-4, which in this example form the driven arm of the lift assembly 403, are pivotally coupled to the platform 406 forming respective pivot joints 418-0 and 418-2. In other examples the locations of pivotal and translatable joints may be reversed, such as when the lift mechanism 408 is differently arranged, for example if arranged to drive the second arm 417 or positioned elsewhere in relation to the base frame 410.

Figure 3A:
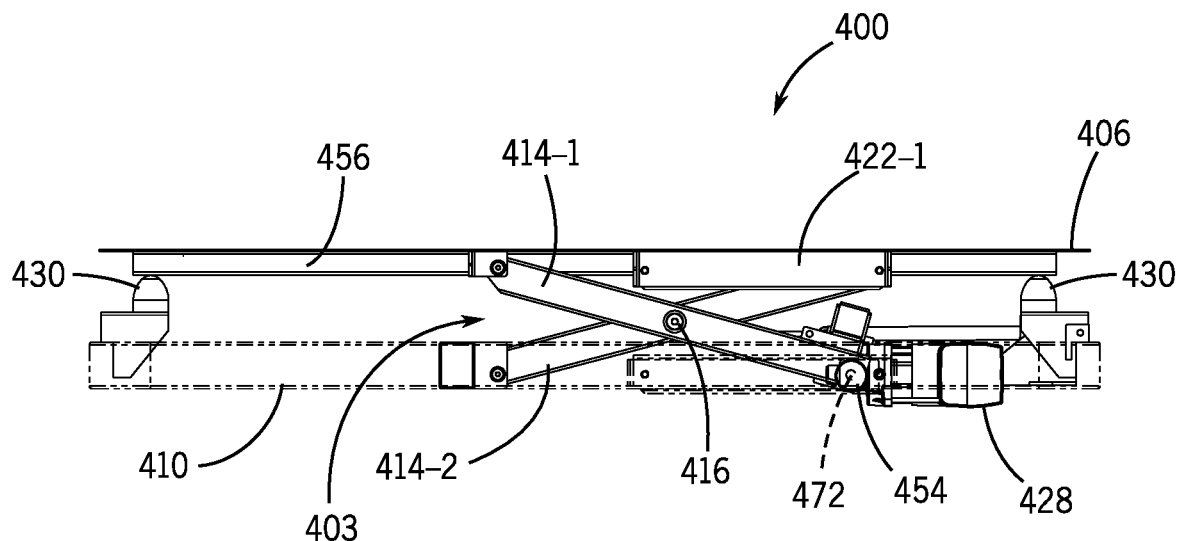
FIG. 3A is a partial front elevation view of an embodiment of a weight elevation subsystem suitable for use with the free-weight exercise system of FIG. 1A in a retracted configuration.
Figure 3B:
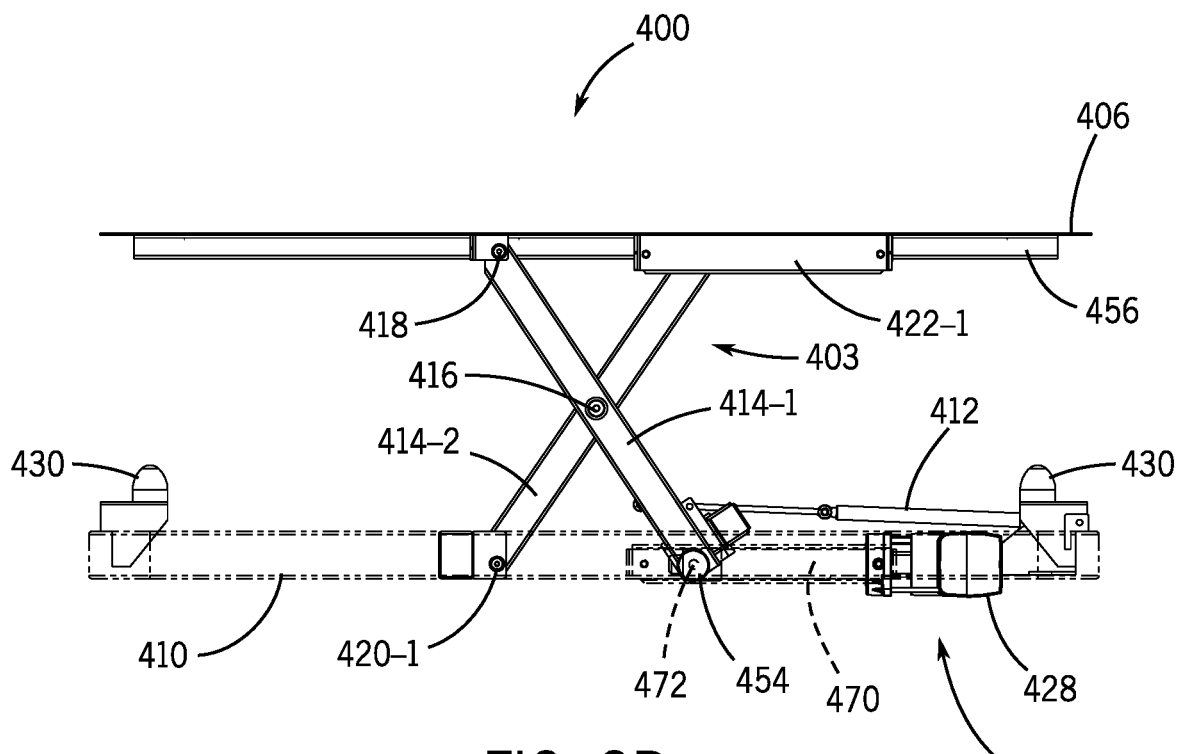
FIG. 3B is a partial front elevation view of the weight elevation subsystem of FIG. 3A in an extended configuration.

As shown in FIG. 6, the upper joints 418 previously described may pivotably couple the lift assembly 403 to the platform 406. For example, each of link 414-1 and link 414-4 may be pivotably coupled to the platform 406 via upper joint 418-1 and upper joint 418-2, respectively. Each of link 414-2 and link 414-3 may include a guide element 454, e.g., a roller or the like, which may be coupled to the respective link via a respective pin or shaft 452. One or more bumpers 430 (e.g., an elastomeric member, spring or any other suitable type of resilient member or combinations thereof) may be positioned between the base frame 410 and the underside of the platform 406. The one or more bumpers 430 may cushion the "landing" of the platform 406 on the base frame 410 so as to protect components of the weight elevation subsystem 400 from impacts and/or reduce noise when the weight elevation subsystem 400 moves into the retracted configuration. In some embodiments, the bumper(s) 430 is coupled to the base frame 410 as shown in FIG. 3A. In other embodiments, the bumper(s) 430 may be coupled elsewhere, such as to the underside of the platform 406.

Figure 4:
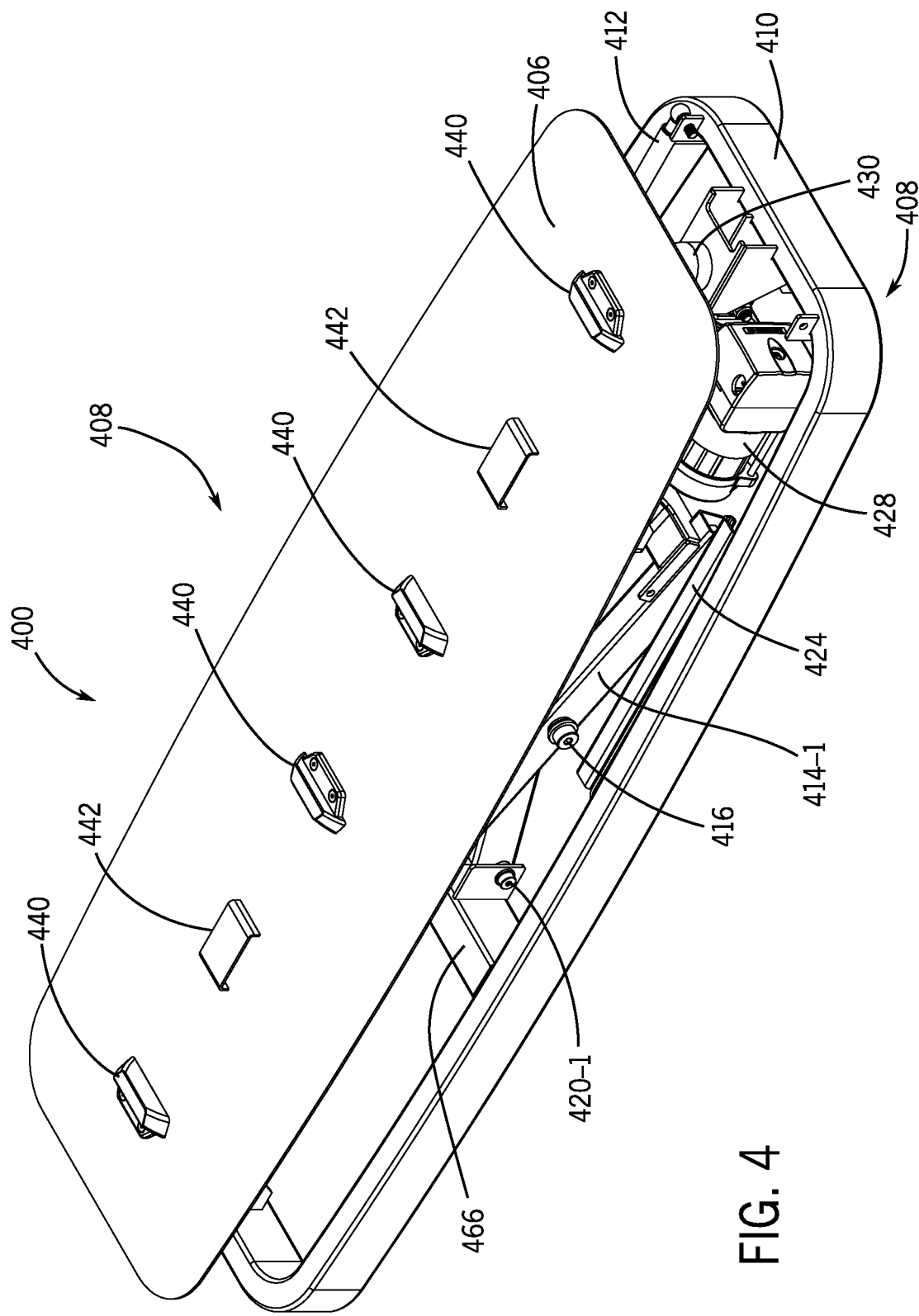
FIG. 4 is a top isometric view of the weight elevation subsystem of FIG. 3A in a retracted configuration.

The platform 406 is a substantially planar structure. The platform 406 may have other shapes as desired for example to stow in the retracted configuration in the weight elevation subsystem 400, or to accept different kinds of weights 402. The platform 406 may include, on its upper side, one or more fixing elements configured for securing one type or different types of exercise weights to the platform 406. In some embodiments, the fixing elements may be integrated into the platform 406 and not intended for removal by the end user. In other embodiments, the fixing elements may be removable and interchangeable, by the user, with a different type of fixing element for securing a different type of weight(s) thereto. The fixing elements may be implemented as one or more protrusions 440, brackets or clips 442, or the like, e.g., as shown in FIG. 4. The protrusion 440 and/or the clip 442 may be adapted to secure one or more weights (e.g., first weight 402-1 and second weight 402-2) to the platform. In some embodiments, the fixing elements (e.g., protrusions, clips or brackets) are configured to secure a base of an adjustable free-weight. In some embodiments, the same set of fixing elements are configured to secure two different types of adjustable free-weights (e.g., a set of adjustable dumbbells and an adjustable barbell), or the bases of two different types of free-weights. In some embodiments, the fixing elements may define a recess or channel above the platform that receives, at least partially therein, a portion of the free-weight or the base of the free-weight for securing the weight(s) to the platform 406.

Figure 5:
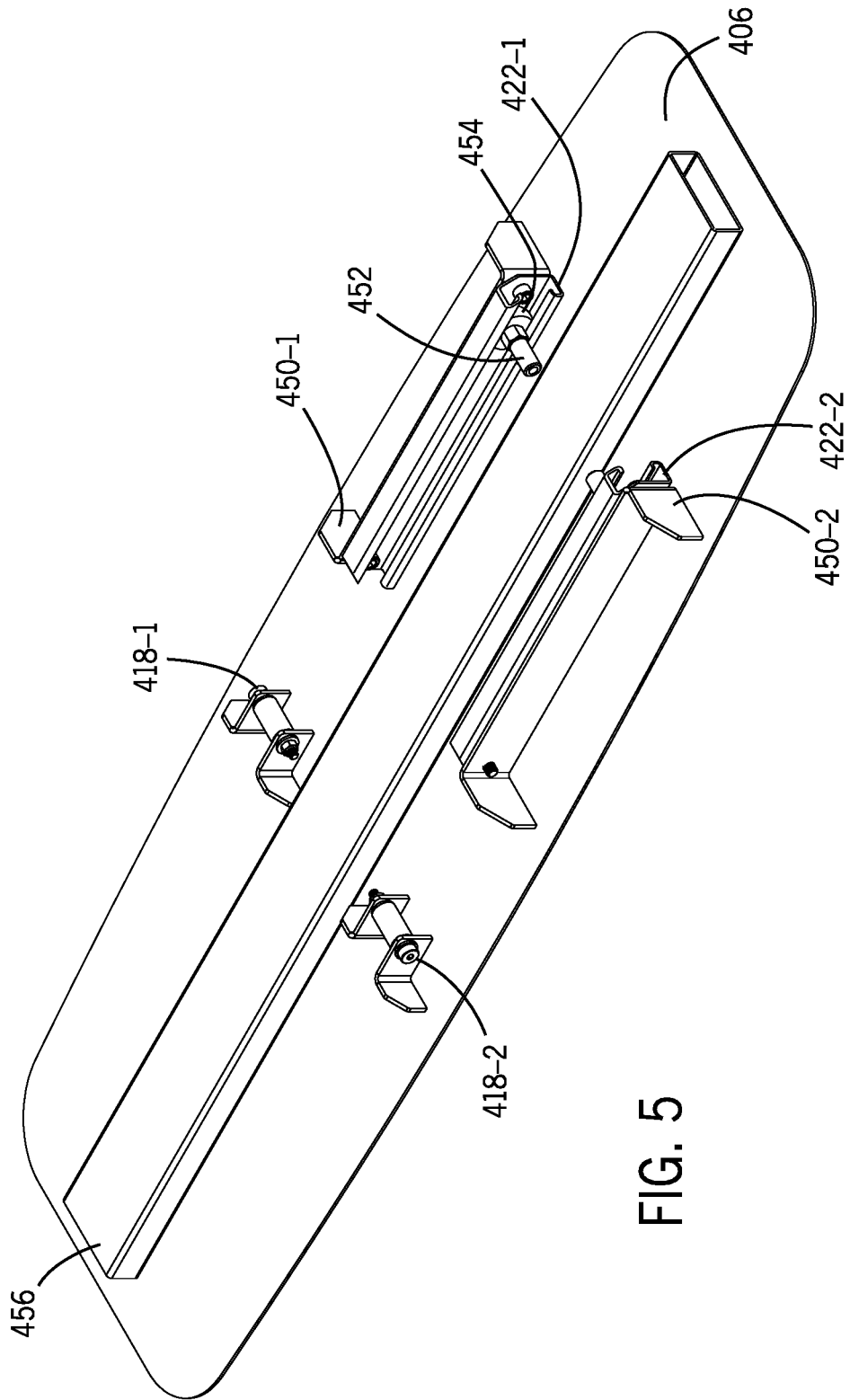
FIG. 5 is a bottom isometric view of a portion of the weight elevation subsystem of FIG. 3A.

The platform 406 may be reinforced by a longitudinal member (e.g., a beam 456) coupled to or integrally formed therewith, e.g., as shown in FIG. 5. In FIG. 5, the beam 456 is fixed to the underside of the platform 406 but in other embodiments, the reinforcing member may be configure differently and/or positioned elsewhere. For example, the beam 456 may be coupled to the upper face or other portion of the platform 406. The platform 406 includes one or more upper tracks 422, e.g., coupled to the lower face thereof. The upper tracks 422 are configured to movably receive an upper end of the lift assembly 403. For example, the upper tracks 422-1 and 422-2 may receive an upper end of the lift assembly 403 such the guide elements 454, which may be rotatably coupled to respective links via a respective pin or shaft 452. Respective upper track 422-1 and upper track 422-2 may be substantially aligned with the longitudinal dimension of the platform 406, extending along a portion of the length of the platform 406, and may be disposed on opposite sides of the reinforcing member (e.g., beam 456), such as near the front and rear edges of the platform 406. In some embodiments, the upper tracks 422 may have a C-shaped cross section, and may be oriented with the opening of the channel facing toward or away from a centerline of the platform 406 so as to capture the respective guide element 454 thereby substantially restricting vertical movement of the guide elements 454. Each of the guide elements 454 may be implemented by a roller, slider, caster, bearing, or the like. In other embodiments, the upper tracks 422-1 and 422-2 may be oriented differently, for example with the opening of the channel facing towards the base frame 410 so as to operatively (e.g., slidably, rollably or otherwise suitably movably) receive the upper end of the links 414-2 and 414-3.

A reinforcing structure 450, shown in FIG. 5 as a flange, may be coupled to each upper track 422 on the underside of the platform 406 to stiffen the track 422, e.g., in configurations in which the track 422 is oriented with its wider transverse dimension extending from the platform 406. In such embodiments, the reinforcing structure 450 (e.g., flange) may enhance the rigidity of the track 422 (e.g., reducing the risk of wobble, bending or deflection), which may provide for smoother motion of the guide elements 454 within the tracks 422. Additionally, a benefit may be reduced wear of the components of the lift assembly 403 and or reduced forces internally due to the upper tracks 422 being relatively straighter than without the reinforcing structures 450. In other embodiments, the flanges 450 may be other suitable shapes that support the upper tracks 422.

As also shown for example in FIG. 5, the one or more upper joints 418 may be coupled to the platform 406. For example, an upper joint 418-1 and an upper joint 418-2 may be disposed on respective portions of the platform 406. The upper joint 418-1 may be in line with the upper track 422-1. The upper joint 418-2 may be in line with the upper track 422-2. The upper joints 418 may be suitable to pivotably couple the platform 406 to the lift assembly 403. For example, the upper joints 418 may include respective bushings, bearings, or other suitable rotatable components suitable to pivotably couple the lift assembly 403 to the platform 406.

The weight elevation subsystem 400 includes a lift mechanism 408 suitable to move the lift assembly 403 between retracted and deployed configurations. The lift mechanism 408 is of suitable power and torque to deploy the lift assembly 403 with one or more exercise weights 402. The lift mechanism 408 is pivotably coupled to the frame 410 at a joint 448. The joint 448 may allow the lift mechanism 408 to pivot relative to the frame 410 as the lift assembly 403 moves between the retracted and deployed configurations. In one embodiment, the lift mechanism 408 includes a rotary actuator 428. The rotary actuator 428 may be a motor such as an electric, hydraulic, pneumatic, or other suitable motor. The rotary actuator 428 rotates a linear actuator 470. In some embodiments the linear actuator 470 is a threaded rod such as a lead screw or power screw. The linear actuator 470 is rotatably coupled to a movable element 472. In some embodiments, the movable element 472 is a ball screw or nut threadedly coupled to the linear actuator 470 such that as the linear actuator 470 rotates, the movable element 472 translates along the length of the linear actuator 470. The movable element 472 is coupled to the lift assembly 403, such as at a brace 478 of the first arm 415. The movable element 472 may be coupled to other portions of the lift assembly 403 as desired.

In one example of the operation of the lift assembly 403, the free-weight exercise system 100 receives a command to move the lift assembly 403 from a retracted to a deployed position. For example, such as when the bench 300 is removed from the free-weight exercise system 100 thereby actuating the sensor 482. A processor or other circuit associated with the free-weight exercise system 100 may supply power (e.g., electricity) to the lift mechanism 408. The lift mechanism 408 may cause the rotary actuator 428 to move in a first rotary direction. The movement of the rotary actuator 428 in the first rotary direction may cause the movable element 472 to move in a first translation direction, such as by the threaded engagement of the linear actuator 470 with the movable element 472. As the movable element 472 moves in the first translation direction, the movable element 472 imparts a force on the first arm 415. In this example, the first arm 415 is a driven arm and the second arm 417 is a following arm. The force imparted on the first arm 415 by the movable element 472 causes the first arm 415 and the second arm 417 to pivot relative to one another in a scissors action where the lift assembly 403 narrows and becomes taller. The guide elements 454 move in the respective upper tracks 422 or lower tracks 424 in which they are received. Thus, the lift assembly 403 moves between the retracted position and the deployed position to move the exercise weights 402 to a position suitable for access by a user.

The lift assembly 403 may return to the retracted position responsive to a command, such as a command received by the user input 480. For example, a user may actuate the user input 480. This actuation may be detected by a processor 4702 (see, e.g., FIG. 47 and accompanying description) or other circuit associated with the free-weight exercise system 100 that causes the rotary actuator 428 to move in a second rotary direction opposite the first rotary direction. Accordingly, the movable element 472 may move in a second translation direction opposite the first translation direction. The first arm 415 and the second arm 417 to pivot relative to one another in a scissors action where the lift assembly 403 becomes shorter and wider.

The weight elevation subsystem 400 has numerous advantages. For example, using a lift assembly like the lift assembly 403, the lift assembly 403 may be able to convert an input force (e.g., a force imparted by the movable element 472) to a higher output force to raise the platform 406 and the exercise weights 402, which may be advantageous when lifting heavy objects like the exercise weights 402. In some embodiments, the exercise weight 402 may weigh up to 200 pounds or more. Additionally, forming respective first arm 415 and second arm 417 form the respective links 414 may form a sturdy structure that can repeatedly and reliably lift the exercise weights 402 without undue flexure, wobble, or deflection.

In some embodiments the weight elevation subsystem 400 includes a biasing element 412. The biasing element 412 may be pivotably coupled at one end portion to the frame 410 and pivotably coupled at another end portion to the lift assembly 403. The biasing element 412 may include an energy storage portion 413 and an extendible element 411. The energy storage portion 413 may store mechanical energy when the lift assembly 403 is in one configuration and release the stored energy to help move the lift assembly 403 to another configuration. In one example, the biasing element 412 is a gas spring, where the energy storage portion 413 is a cylinder that stores a gas. When the lift assembly 403 is in the retracted configuration, a piston coupled to the energy storage portion 413 compresses the stored gas as the extendible element 411 moves into the energy storage portion 413, storing energy in the compressed gas. As the lift assembly 403 moves to the deployed configuration the energy stored in the compressed gas is released to help the lift mechanism 408 move the lift assembly 403 to the deployed configuration. In other embodiments, the biasing element 412 may be another type of biasing element such as a mechanical spring, or the like. An advantage of using a biasing element 412 may be the ability to use a smaller and/or less expensive lift mechanism 408.

FIGS. 8A-12B show a weight elevation subsystem 500 of a free-weight exercise system (e.g., 10, 100) according to further examples of the present disclosure. The weight elevation subsystem 500 includes a lift assembly 503, which may be implemented similarly to the lift assembly 403 of the weight elevation subsystem 400. The weight elevation subsystem 500 includes a frame 510 and a platform 506. The frame 510 may form a base of the system 100. The platform 506 is suitable to support one or more exercise weights 502, such as dumbbells 502-1 and 502-2. The platform 506 may have one or more protrusions 540 and/or clips 542 coupled thereto, as discussed with respect to the protrusions and clips 440 and/or 442. The platform 506 may have flanges 550-1 and 550-2 coupled thereto as discussed with respect to the flanges 450. The platform 506 may have tracks 522-1 and 522-2 coupled thereto as discussed with respect to the tracks 422. The platform 506 may have a longitudinal member 556 as discussed with respect to the longitudinal member 456, previously. The platform may have one or more joints 518 coupled thereto as previously discussed with respect to the joints 418.

Figure 9:
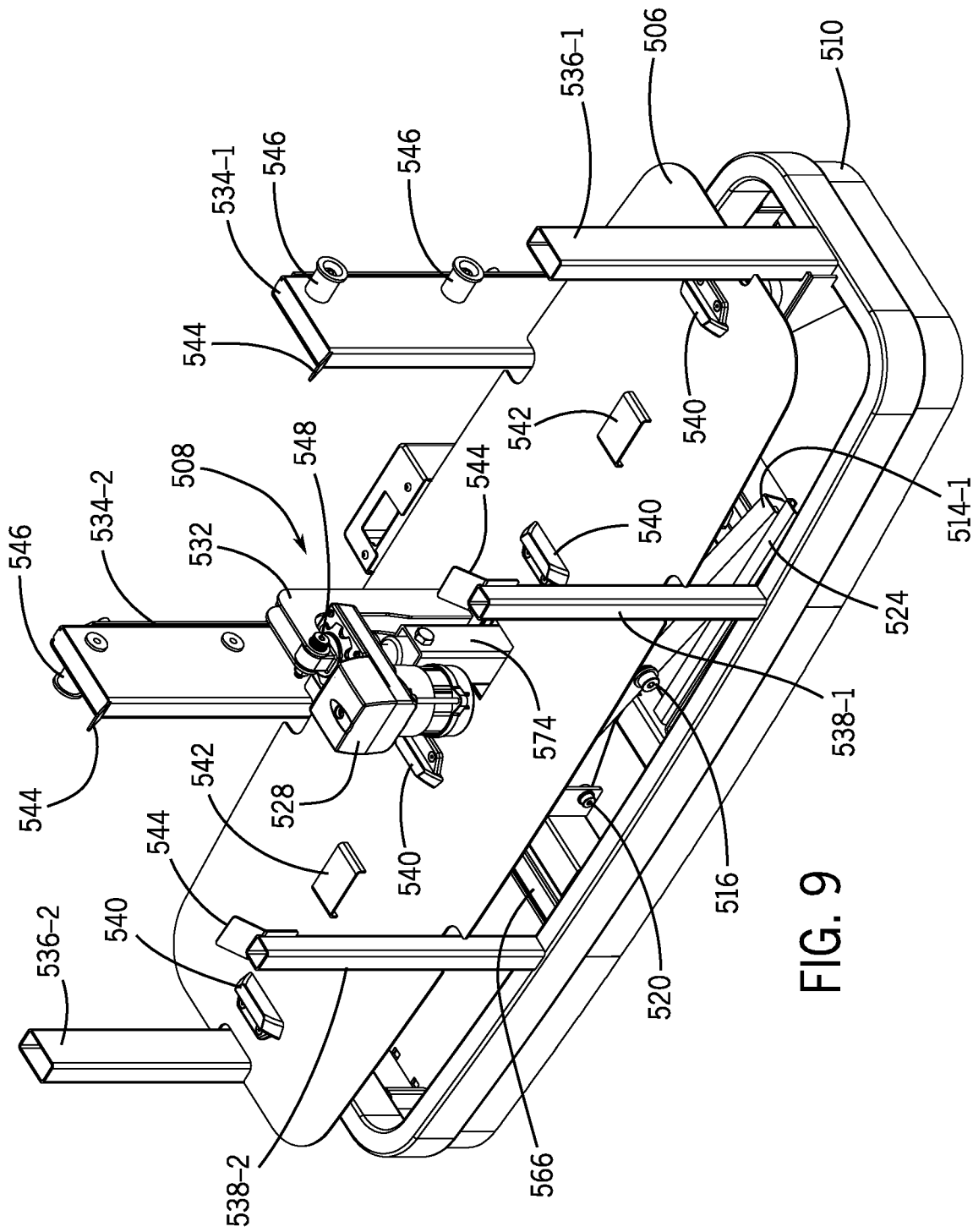
FIG. 9 is a partial front elevation view of the weight elevation subsystem of FIG. 8A in a retracted configuration.
Figure 10:
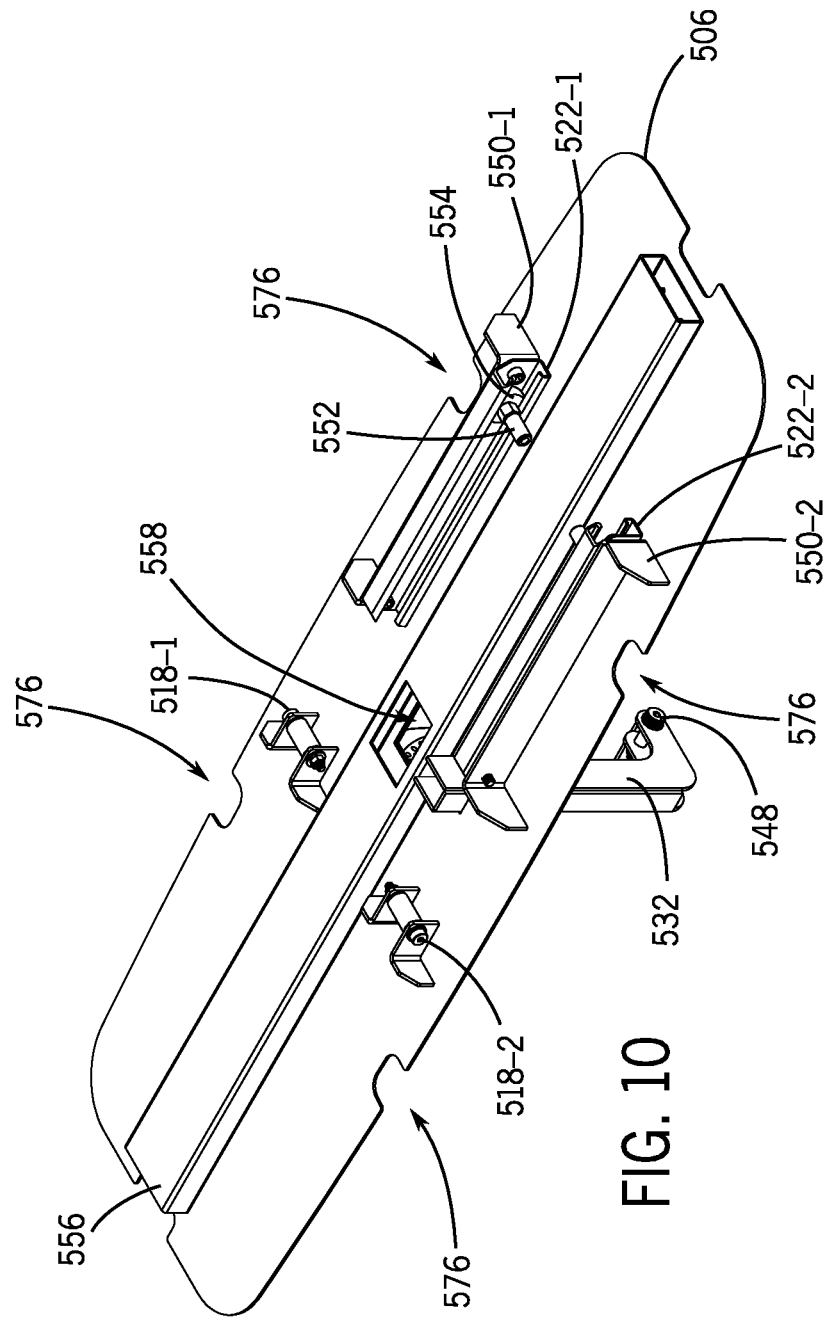
FIG. 10 is a bottom isometric view of a portion of the weight elevation subsystem of FIG. 8A.

As shown for example in FIG. 9, the frame 510 may include one or more guides rigidly coupled thereto to help support the platform 506 as it moves between the retracted and deployed configurations. The platform 506 may include one or more suitable recesses 576 to receive or provide clearance for the respective guides. For example, the frame 510 may include first and second rear guides 534-1 and 534-2, respectively, disposed at a rear portion of the frame 510. The rear guides 534-1 and 534-2 may include flanges 544 at respective upper end portions thereof. The upper portion of the exercise system's frame, such as the mast 22 or mast 204, may be joined to the lower or base portion of the frame e.g., via the rear guides 534-1 and 534-2 such as via one or more connectors 546. Any suitable structure, such as a connector rod, plug or fastener may be used to implement the connectors 546 so as to couple the display subsystem 200 of the exercise system to the weight elevation subsystem 500. The frame 510 may include a first and second lateral guide 536-1 and 536-2 disposed at respective left and right portions of the frame 510. The frame 510 may include a first and second front guides 538-1 and 538-2 disposed at a front portion of the frame 510. The guides 538 may include flanges 544 at respective upper end portions thereof. The flanges 544 may act as upper stops for the platform 506 when the lift assembly 503 is at the deployed configuration. The flanges 544 may be angled toward the middle of the weight storage subassembly 500. This type of flange may be beneficial as the flanges coupled to the front guides 538 may be angled toward the flanges 544 coupled to the rear guides. This arrangement may form a wedge structure that centers the platform 506 and/or secures the platform 506 with the front guides 538 and the rear guides 534 to stiffen the lift assembly 503 when at the deployed configuration. It should be understood that the vertical guides (e.g., rear guides 534-1 and 534-2, lateral guides 536-1 and 536-2, and front guides 538-1 and 538-1) may be used in any suitable combination in any of the other embodiments of weight elevation subsystems described herein. For example the platform 406 of weight elevation subsystem 400 may similarly include recesses to receive one or more front, rear, and lateral guides similar to the ones described with reference to the subsystem 500.

Figure 11:
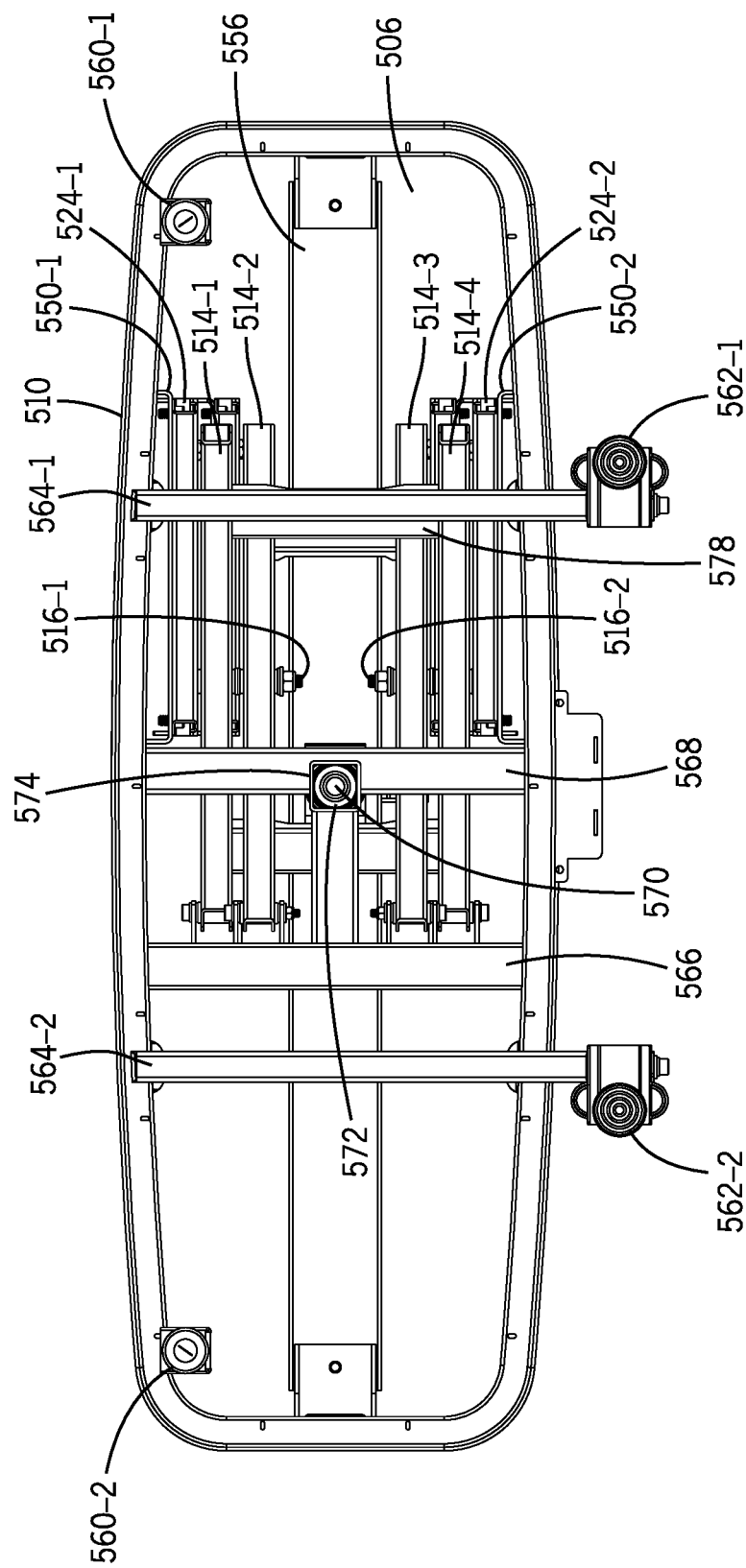
FIG. 11 is a bottom plan view of the weight elevation subsystem of FIG. 8A.
Figure 12:
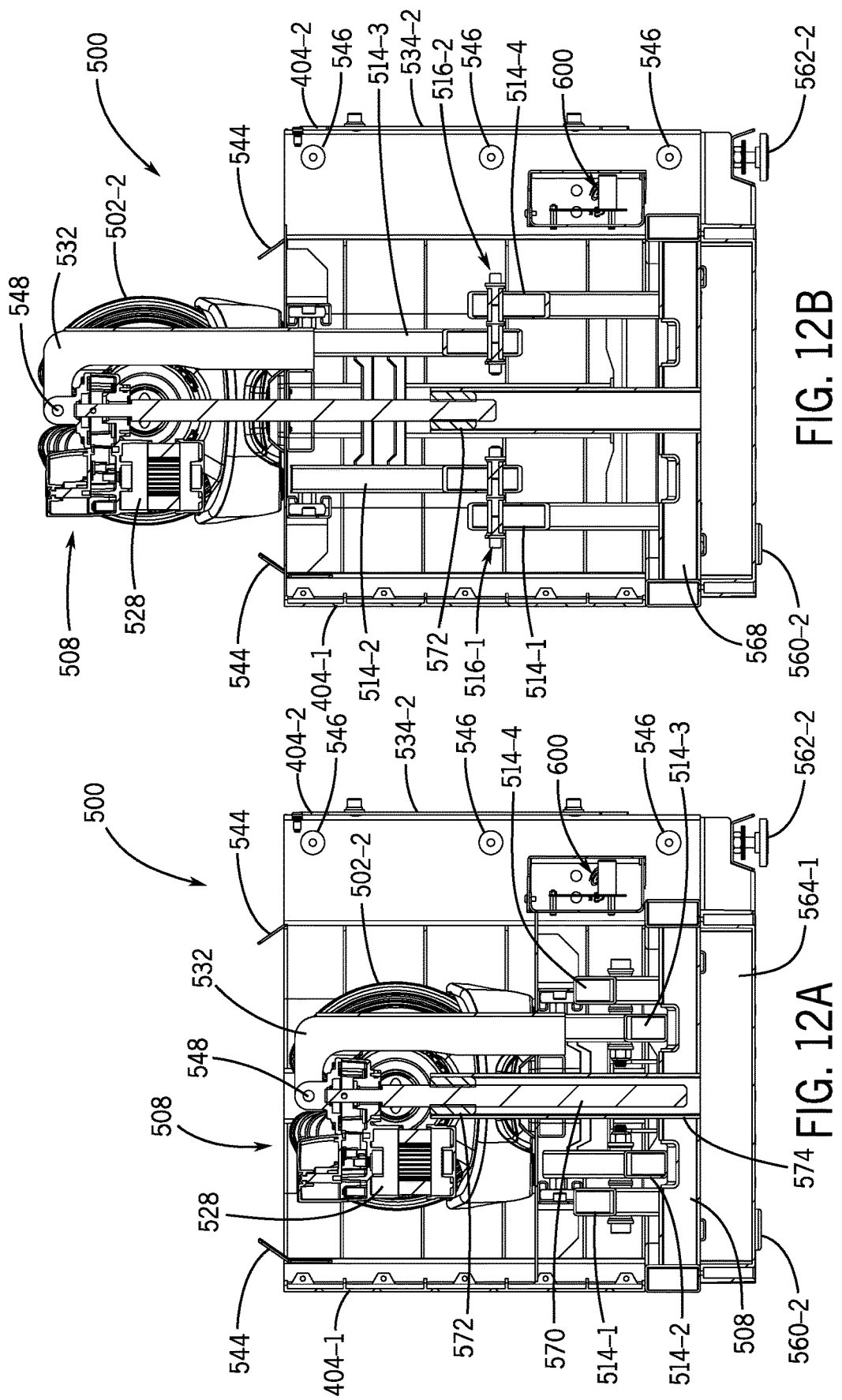
FIG. 12A is a section view of the weight elevation subsystem of FIG. 8A taken along line 12A-12A of FIG. 8A.
FIG. 12B is a section view of the weight elevation subsystem of FIG. 8A taken along line 12B-12B of FIG. 8B.

As shown in FIG. 11, the frame 510 may include one or more upper support frame mounts 564-1, 564-2 operative to couple the upper frame or display mast 204 of the display subsystem 200 to the weight elevation subsystem 500. The frame 510 may include one or more feet 562-1, 562-2 and/or feet 560-1, 560-2. Any of the feet 560 and/or 562 may be static feet, or may include a leveler element suitable to level the free-weight exercise system 100.

The lift assembly 503 includes a plurality of links 514 including a link 514-1, a link 514-2, a link 514-3, and a link 514-4. The links 514 may form a first arm 515 and a second arm 517 as previously discussed with respect to the arms 415 and 417. The first arm 515 and the second arm 517 may be pivotally coupled at a joint 516. Either or both of the arms 515 or 517 may have respective guide elements 454 pivotally coupled to one end portion thereof, as previously discussed. The guide elements 454 may be received in respective tracks 522 and 524. An end portion of the respective arms 515 and 517 opposite the guide elements 454 may be pivotally coupled to the frame 510 and/or the platform 506. For example the arm 515 may be pivotally coupled to the platform 506 at a joint 518. The arm 517 may be pivotally coupled to the frame 510 at a joint 520. A biasing element 512 may be coupled to the frame 510 and the lift assembly 503 as previously discussed with respect to the biasing element 412.

Figure 8A:
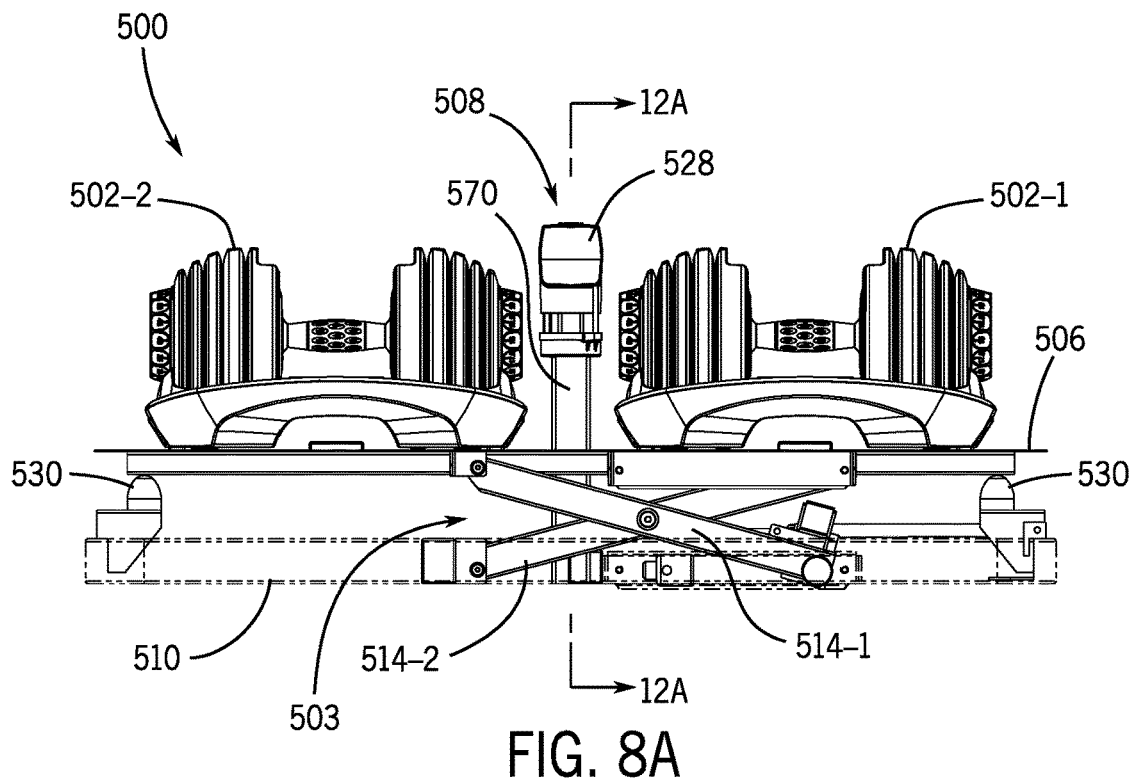
FIG. 8A is a partial front elevation view of an embodiment of a weight elevation subsystem suitable for use with the free-weight exercise system of FIG. 1A in a retracted configuration.
Figure 8B:
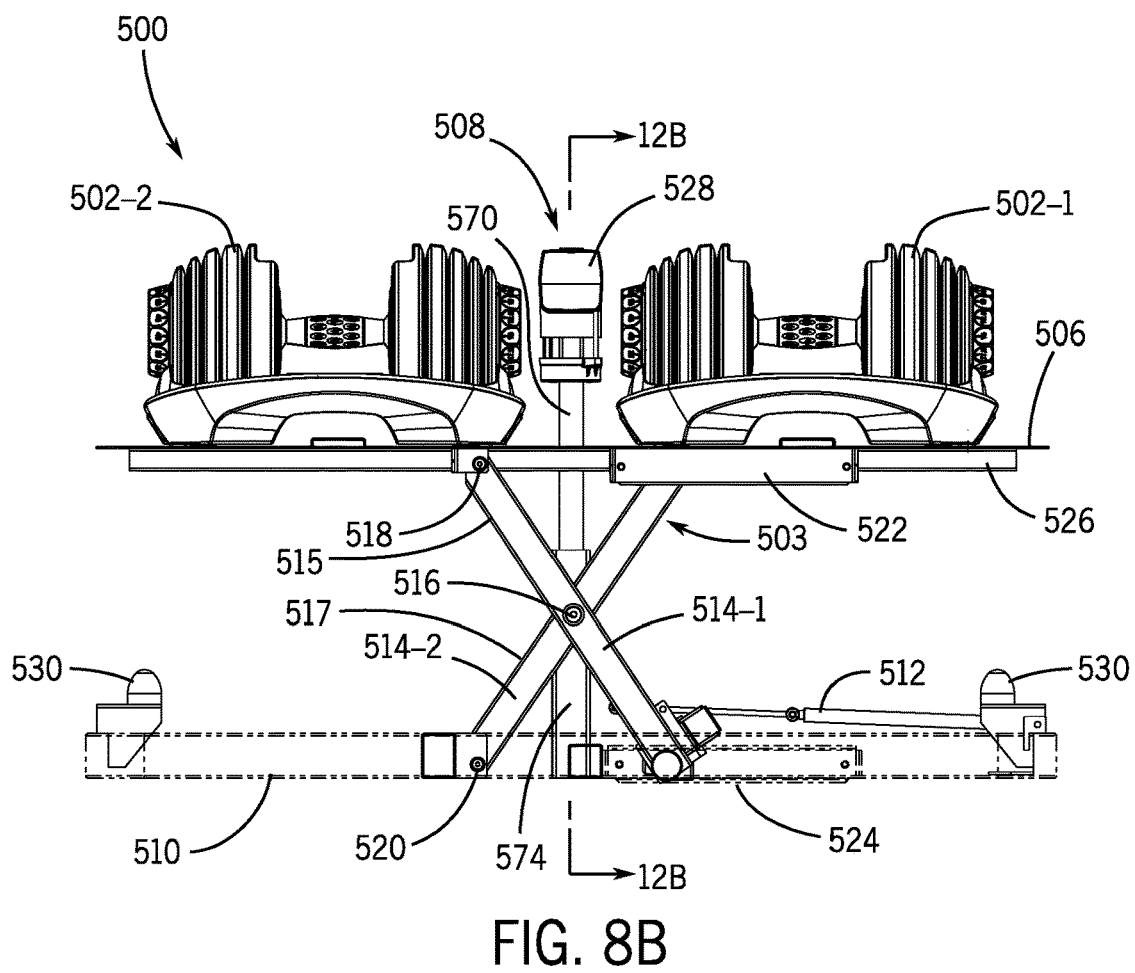
FIG. 8B is a partial front elevation view of the weight elevation subsystem of FIG. 8A in an extended configuration.

The weight elevation subsystem 500 includes a lift mechanism 508 adapted to move the lift assembly 503 between the retracted position (see, e.g., FIG. 8A) and the deployed position (see, e.g., FIG. 8B). The lift mechanism 508 includes a rotary actuator 528, a linear actuator 570, and a movable element 572 as previously discussed with respect to the lift mechanism 408.

With reference to FIGS. 11, 12A, and 12B, the frame 510 includes a center support 568 and cross support 566 that extend portions between front and rear edges of the frame 510. The center support 568 and/or the cross support 566 may help stiffen and/or stabilize the frame 510. A movable element mount 574 may be coupled to, and extend upward from, the frame 510. For example, the movable element mount 574 may be coupled to the center support 568. The movable element mount 574 may extend upwardly from the center support 568. The movable element mount 574 may conceal the linear actuator 570 when the lift assembly 503 is in a lowered position. A column 532 may be coupled to the platform 506. The column 532 may extend upwardly from the platform 506. In some embodiments, the column 532 may extend through the platform (see, e.g., FIG. 10). The lift mechanism 508 may be coupled to the column 532. For example, the lift mechanism 508 may be pivotally coupled to the column 532 at a joint 548. The movable element 572 of the lift mechanism 508 may be coupled to the movable element mount 574. The linear actuator 570 may be selectively received in the movable element mount 574.

As shown for example in FIGS. 12A and 12B in the retracted configuration, a substantial portion of the linear actuator 570 is received in the movable element mount 574 and threadedly engaged with the movable element 572. Responsive to a command to move from the retracted configuration to the deployed configuration, the rotary actuator 528 may cause the linear actuator 570 to rotate relative to the movable element 572. The rotary motion of the linear actuator 570 relative to the movable element 572 may induce a force in the linear actuator 570 that causes the lift mechanism 508, and the platform 506 to move the lift assembly 503 from the retracted configuration to the extended configuration.

Figure 13:
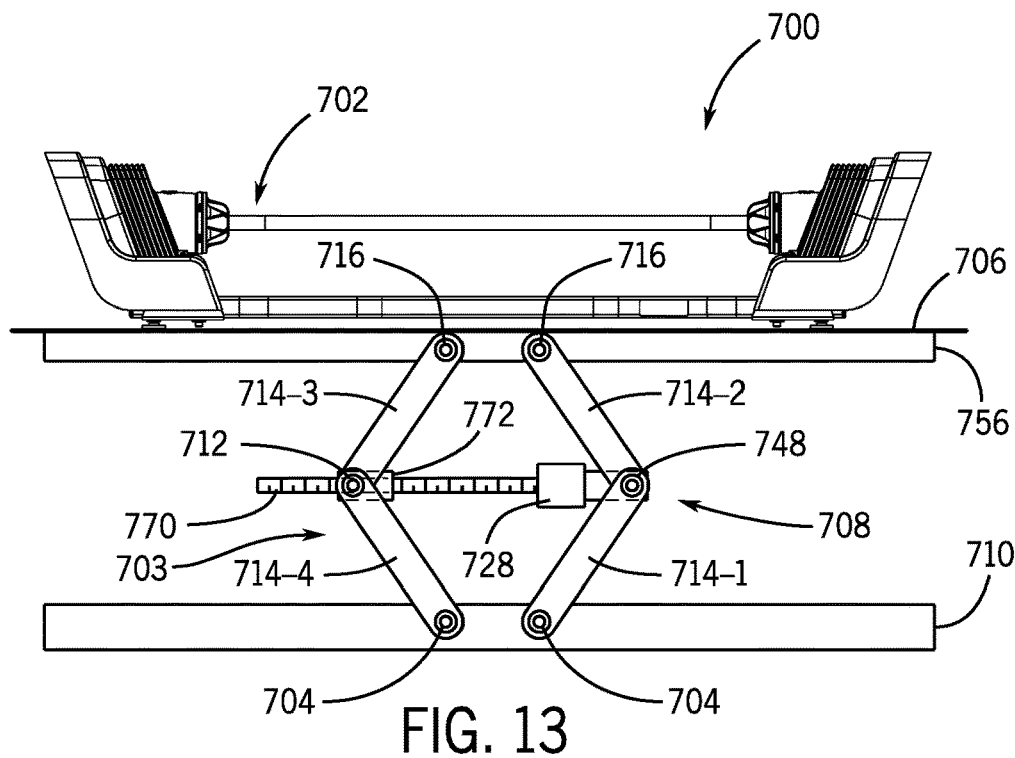
FIG. 13 is a schematic view of an embodiment of a weight elevation subsystem suitable for use with the free-weight exercise system of FIG. 1A.

With reference to FIG. 13, an embodiment of a weight elevation subsystem 700 suitable for use with the free-weight exercise system of FIG. 1A is disclosed. The weight elevation subsystem 700 includes a lift assembly 703. The lift assembly 703 includes four links 714-1, 714-2, 714-3, and 714-4. The weight elevation subsystem 700 includes a frame 710. The lower end portions of the links 714-1 and 714-4 are pivotally coupled to the frame 710 at respective joints 704. The upper end portions of the links 714-4 and 714-1 are pivotally coupled to the lower end portions of the links 714-3 and 714-2, respectively. The upper end portions of the links 714-4 and 714-1 and the lower end portions of the links 714-3 and 714-2 are coupled to respective end portions of a lift mechanism 708 at respective joints 712 and 748. The lift mechanism 708 includes a rotary actuator 728 that rotates a linear actuator 770. The linear actuator 770 is threadedly coupled to a movable element 772. The upper end portions of the links 714-3 and 714-2 are pivotally coupled to a platform 706 by respective joints 716. The platform 706 may include a longitudinal member 756 such as to stiffen the platform 706. The platform 706 may be suitable to support one or more exercise weights such as the dumbbells 402 and or a barbell 702. As the rotary actuator 728 rotates the linear actuator 770 relative to the movable element 772, the movable element 772 may cause the joints 712 and 748 to move relative to one another. For example, the joints 712 and 748 may move away from one another as the lift assembly 703 moves to a retracted configuration. The joints 712 and 748 may move toward one another as the lift assembly 703 moves to a deployed configuration.

Figure 14:
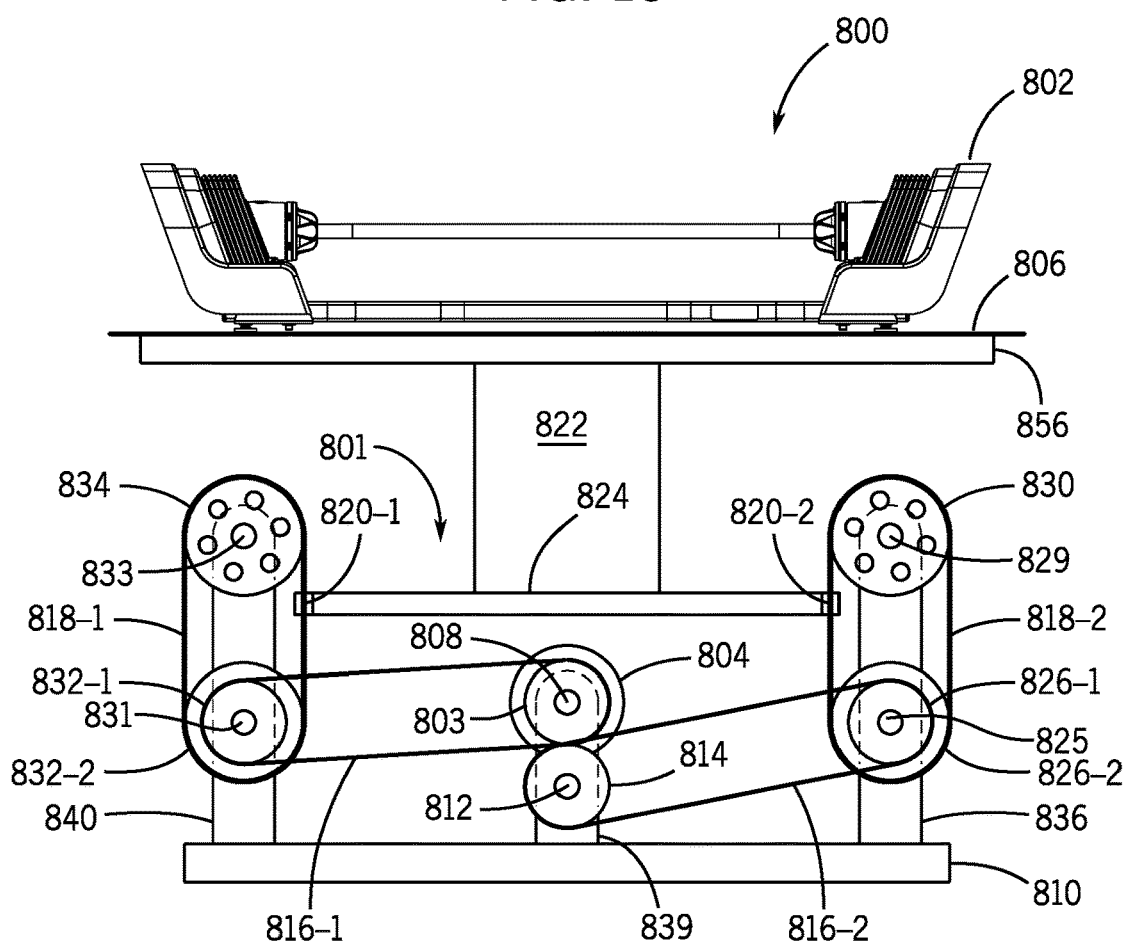
FIG. 14 is a schematic view of an embodiment of a weight elevation subsystem suitable for use with the free-weight exercise system of FIG. 1A.

With reference to FIG. 14, an embodiment of a weight elevation subsystem 800 suitable for use with the free-weight exercise system of FIG. 1A is disclosed. The weight elevation subsystem 800 includes a frame 810. The frame 810 may have one or more supports 836, 839 and/or 840 that extend upwardly from the frame 810. The weight elevation subsystem 800 includes a platform 806 suitable to support one or more exercise weights 802 as previously described. The platform 806 may include a longitudinal member 856, such as to stiffen the platform 806. The platform 806 may include a connector element 822 extending therefrom, e.g., extending below the platform 806. The connector element 822 may be coupled to a flange 824. The flange 824 may include respective couplings or joints 820-1, 820-2 at respective lateral end portions thereof that couple the flange 824 to respective flexible elements 818-1 and 818-2. The flange 824 may extend laterally between the supports 836 and 840.

The platform 806 may be movable between the retracted and deployed configurations by a lift assembly 801. A rotary actuator 804 may be coupled to the support 839. A driving disc 803 may be coupled to a rotary axis 808 of the rotary actuator 804 such that the rotary actuator 804 is operable to rotate the driving disc 803. Any of the discs of any weight storage subassembly disclosed herein may be pulleys, gears, sprockets, or the like. A driven disc 814 may be pivotally coupled to the support 839 at a joint 812 above or below the rotary actuator 804. A driven disc 826 may be pivotally coupled to the support 836 at a joint 825. A driven disc 832 may be pivotally coupled to the support 840 at a joint 831. A driven disc 830 may be pivotally coupled to the support 836 at a joint 829. A driven disc 834 may be pivotally coupled to the support 840 at a joint 833. The driven disc 829 may be disposed above the driven disc 826. The driven disc 834 may be disposed above the driven disc 832. The driven disc 826 and/or the driven disc 832 may include respective first disc elements 826-1 and 832-1. The driven disc 826 and/or the driven disc 832 may include respective second disc elements 826-2 and 832-2. The diameters of the first disc elements 826-1, 832-1 may be different than the diameters of the second disc elements 826-2, 832-2. Thus, the driven discs 826, 832 may thus be operative to change the rotary speed and/or torque of respective inputs and outputs thereof. For example, the second disc elements 826-2 and 832-2 may have larger diameters than the respective disc elements 826-1 and 832-1. Any disc in the present disclosure may include two or more disc elements of different sizes such as the first and second disc elements 826-1, 826-2, 832-1, and 832-2. One or more flexible elements may couple the discs of the weight elevation subsystem 800. Any flexible element of the present disclosure may be a belt (e.g., gear belt, v-belt, or the like), chain, strap, or other suitable flexible element that can transmit rotary motion between the discs. For example, a flexible element 816-1 may couple the disc 803 with the first disc element 832-1. For example, a flexible element 816-2 may couple the disc 814 with the first disc element 826-1. A flexible element 818-2 may couple the second disc element 826-2 to the disc 830. A flexible element 818-1 may couple the second disc element 832-2 to the disc 834. The flexible elements 818-1 and/or 818-2 may be coupled to the flange 824 at the respective joints 820-1, 820-2.

As the rotary actuator 804 rotates, the lift assembly 801 may cause the platform 806 to move between the retracted and deployed configurations. For example, the driving disc 803 may, via the flexible element 816-1, rotate the disc 832 via the first disc element 832-1. The driving disc 803 may also rotate the disc 814. The disc 814 may, via the flexible element 816-2, rotate the disc 826 via the first disc element 826-1. The disc 832 may, via the flexible element 818-1 and the second disc element 832-2, rotate the disc 834. Similarly, the disc 826 may, via the flexible element 818-2 and the second disc element 832-2, rotate the disc 830. As the discs 830 and 834 rotate, the flexible elements 818-1, 818-2 translate, e.g., move vertically. Thus, as the rotary actuator 804 rotates, the rotary motion thereof may be transmitted through the lift assembly 801 to cause the joints 820-1, 820-2 to raise or lower, thereby causing the platform 806 to raise or lower between the retracted and deployed configurations.

Figure 15:
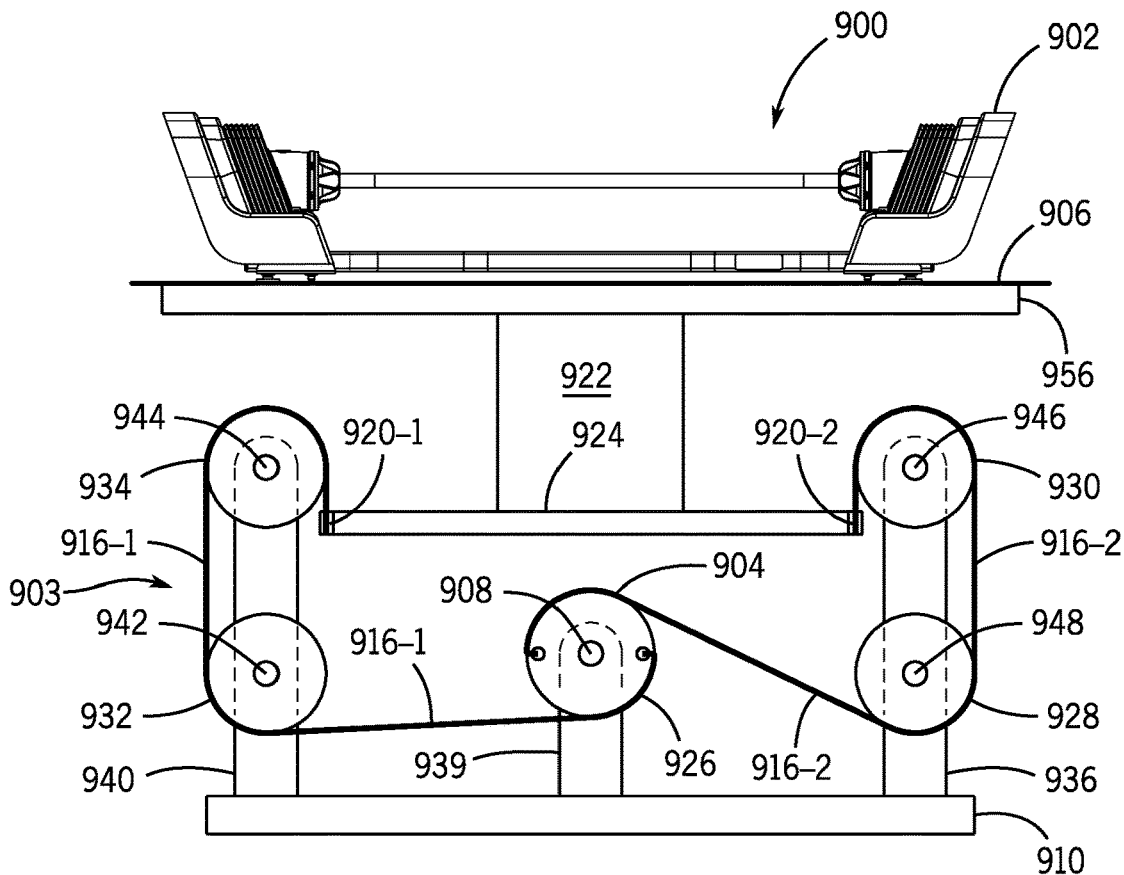
FIG. 15 is a schematic view of an embodiment of a weight elevation subsystem suitable for use with the free-weight exercise system of FIG. 1A.

With reference to FIG. 15, an embodiment of a weight elevation subsystem 900 suitable for use with the free-weight exercise system of FIG. 1A is disclosed. The weight elevation subsystem 900 includes a frame 910. The frame 910 may have one or more supports 936, 939 and/or 940 that extend upwardly from the frame 910. The weight elevation subsystem 900 includes a platform 906 suitable to support one or more exercise weights 902 as previously described. The platform 906 may include a longitudinal member 956, such as to stiffen the platform 906. The platform 906 may include a connector element 922 extending therefrom, e.g., extending below the platform 906. The connector element 922 may be coupled to a flange 924. The flange 924 may include respective couplings or joints 920-1, 920-2 at respective lateral end portions thereof that couple the flange 924 to respective flexible elements 916-1 and 916-2. The flange 924 may extend laterally between the supports 936 and 940.

The platform 906 may be movable between the retracted and deployed configurations by a lift assembly 903. A rotary actuator 904 may be coupled to the support 939. A driving disc 926 may be coupled to a rotary axis 908 of the rotary actuator 904 such that the rotary actuator 904 is operable to rotate the driving disc 926. A driven disc 928 may be pivotally coupled to the support 936 at a joint 948. A driven disc 932 may be pivotally coupled to the support 940 at a joint 942. A driven disc 930 may be pivotally coupled to the support 936 at a joint 946. A driven disc 934 may be pivotally coupled to the support 940 at a joint 944. The driven disc 930 may be disposed above the driven disc 928. The driven disc 934 may be disposed above the driven disc 932.

One or more flexible elements may couple the discs of the weight elevation subsystem 900. For example, a flexible element 916-1 may couple the disc 926 with the disc 932 and the disc 934. Similarly, a flexible element 916-2 may couple the disc 926 with the disc 928 and the disc 930. The flexible elements 916-1 and/or 916-2 may be coupled to the flange 924 at the respective joints 920-1, 920-2.

As the rotary actuator 904 rotates, the lift assembly 903 may cause the platform 906 to move between the retracted and deployed configurations. For example, the driving disc 926 may, via the flexible element 916-1, rotate the disc 932 and the disc 934. Similarly, the disc 926 may, via the flexible element 916-2, rotate the disc 928 and the disc 930. As the discs 930 and 934 rotate, the flexible elements 916-1, 916-2 translate, e.g., move vertically. Thus, as the rotary actuator 904 rotates, the rotary motion thereof may be transmitted through the lift assembly 903 to cause the joints 920-1, 920-2 to raise or lower, thereby causing the platform 906 to raise or lower between the retracted and deployed configurations.

Figure 16:
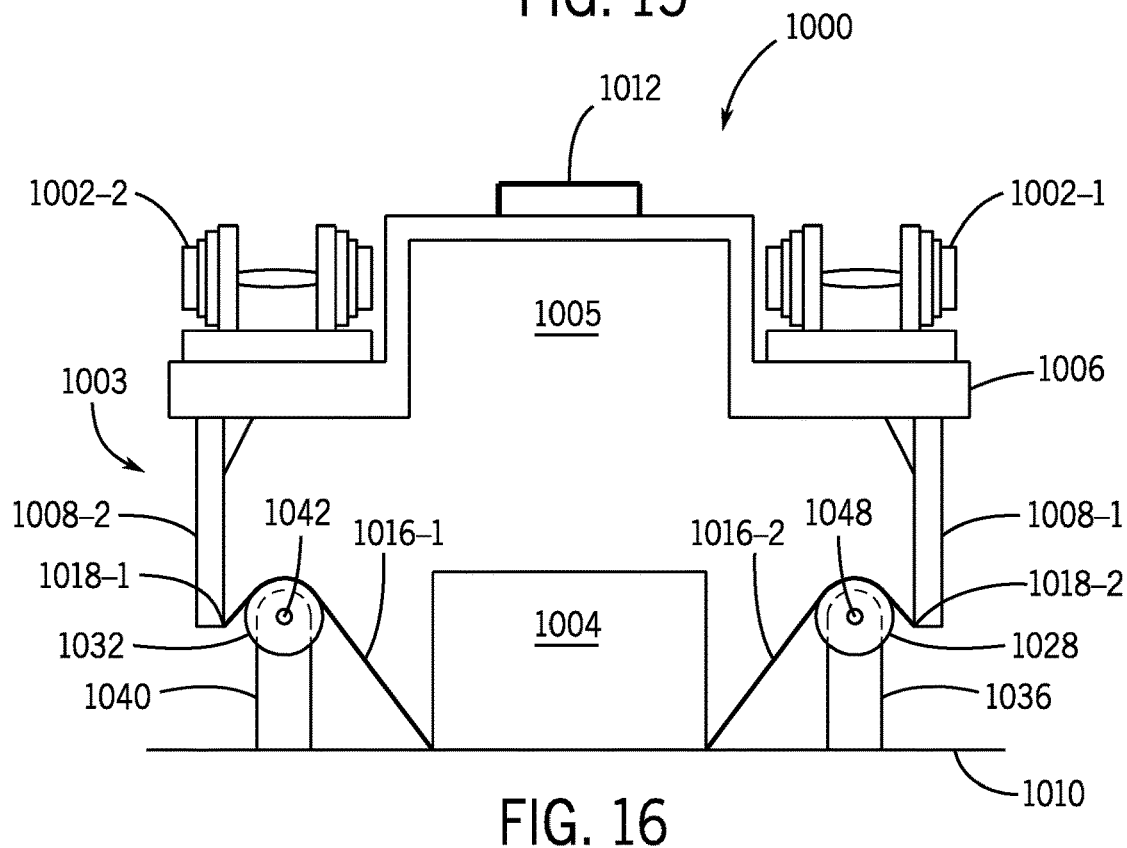
FIG. 16 is a schematic view of an embodiment of a weight elevation subsystem suitable for use with the free-weight exercise system of FIG. 1A.

With reference to FIG. 16, an embodiment of a weight elevation subsystem 1000 suitable for use with the free-weight exercise system of FIG. 1A is disclosed. The weight elevation subsystem 1000 includes a frame 1010. The frame 1010 may have one or more supports 1036 and/or 1040 that extend upwardly from the frame 1010. The weight elevation subsystem 1000 includes a platform 1006 suitable to support one or more exercise weights 1002-1, 1002-2 as previously described. The platform 1006 may include one or more handles 1012 coupled thereto and suitable to be gripped by a hand of a user, such as to move the weight elevation subsystem 1000 between the retracted and deployed configurations. The platform 1006 may include one or more connector elements 1008-1, 1008-2 extending therefrom, e.g., extending below the platform 1006. The connector elements 1008-1, 1008-2 may include respective couplings or joints 1018-1, 1018-2 that couple the respective connector elements 1008-1 and 1008-2 to respective flexible elements 1016-1 and 1016-2.

The platform 1006 may be movable between the retracted and deployed configurations by a lift assembly 1003. A disc 1028 may be pivotally coupled to the support 1036 at a joint 1048. A disc 1032 may be pivotally coupled to the support 1040 at a joint 1042.

The one or more flexible elements 1016-1, 1016-2 may couple the platform 1006 to a counterweight 1004. The counterweight 1004 may be selectively receivable in a recess 1005 formed in the platform 1006. For example, a flexible element 1016-1 may couple the joint 1018-1 to the counterweight 1004 and the flexible element 1016-2 may couple the joint 1018-2 to the counterweight 1004. The flexible elements 1016-1 and 1016-2 may be guided by the respective discs 1042 and 1028.

The counterweight 1004 may be of a suitable mass to counteract or balance the weight of the exercise weights 1002-1 and 1002-2. Absent a force imparted to the platform 1006, such as via the user by the handle 1012, the platform may be stationary. When a force is imparted to the platform 1006 such as buy the user via the handle, the platform 1006 may move between the retracted and deployed configurations. For example, when the lift assembly 1003 is retracted, the user may pull up on the handle 1012 causing the lift assembly 1003 to expand as the platform 1006 moves up and the counterweight 1004 moves down. Likewise, the user may stow the platform 1006 by pushing on the platform thereby causing the counterweight 1004 to rise and the platform 1006 to fall. An advantage of the lift assembly 1003 may be the ability to deploy and/or stow exercise weights without the use of a powered actuator such as a motor or lift mechanism.

Figure 17:
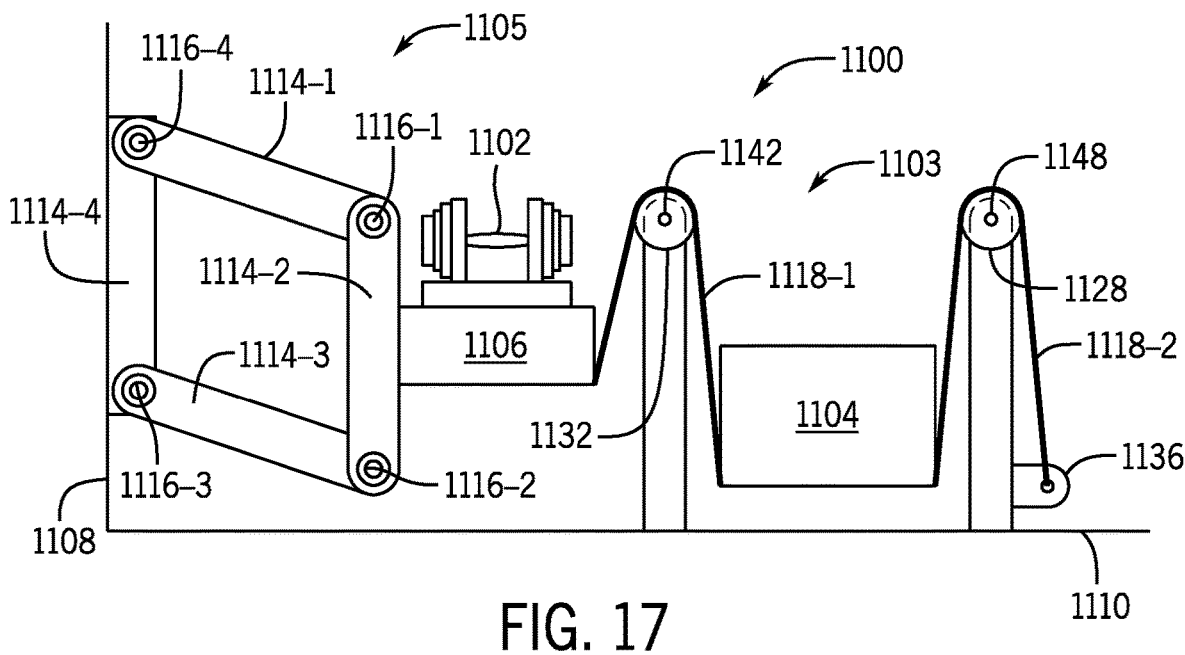
FIG. 17 is a schematic view of an embodiment of a weight elevation subsystem suitable for use with the free-weight exercise system of FIG. 1A.

With reference to FIG. 17, an embodiment of a weight elevation subsystem 1100 suitable for use with the free-weight exercise system of FIG. 1A is disclosed. The weight elevation subsystem 1100 is similar in certain aspects to the weight elevation subsystem 1000 including the use of a counterweight 1104, flexible elements 1118-1, 1118-2, and discs 1142 and 1148 which are analogous to similar elements of the weight elevation subsystem 1000. In the weight elevation subsystem 1100, the platform 1106 may be coupled to a lift assembly 1105. The lift assembly 1105 may include to one of the flexible elements 1118-1 or 1118-2. The other of the flexible elements 1118-1 or 1118-2 not coupled to the platform 1106 may be coupled to an anchor 1136 coupled to the frame 1110.

The frame 1110 may have a wall 1108 coupled thereto and an extending vertically therefrom. The lift assembly 1105 may include a four bar lift assembly. For example, the lift assembly 1105 may include links 1114-1, 1114-2, 1114-3, and 1114-4. The link 1114-2 may be coupled (e.g., rigidly coupled) to the platform 1106. The link 1114-2 may be pivotally coupled to the links 1114-1 and 1114-3 at respective joints 1116-1 and 1116-2. The links 1114-1 and 1114-3 may be pivotally coupled to the link 1114-4 at respective joints 1116-3, 1116-4. The respective joints 1116-1 and 1116-2 may be at opposite end portions of the respective links 1114-1 and 1114-3 from the respective joints 1116-3 and 1116-4. The link 1114-4 may be coupled (e.g., rigidly coupled) to the wall 1108, may be formed therewith, or may be an integral part of the wall 1108.

Operation of the weight elevation subsystem 1100 may be similar to that of the weight elevation subsystem 1000, i.e., through use of a force imparted by a user. As the user pulls up on the platform 1106 such as by a handle, the counterweight 1104 may sink and the platform 1106 may rise, and vice versa when stowing. The lift assembly 1105 may provide certain advantages such as providing more leverage for the user relative to the weight elevation subsystem 1000 to enable the easier deployment of the weights 1102.

Figure 18:
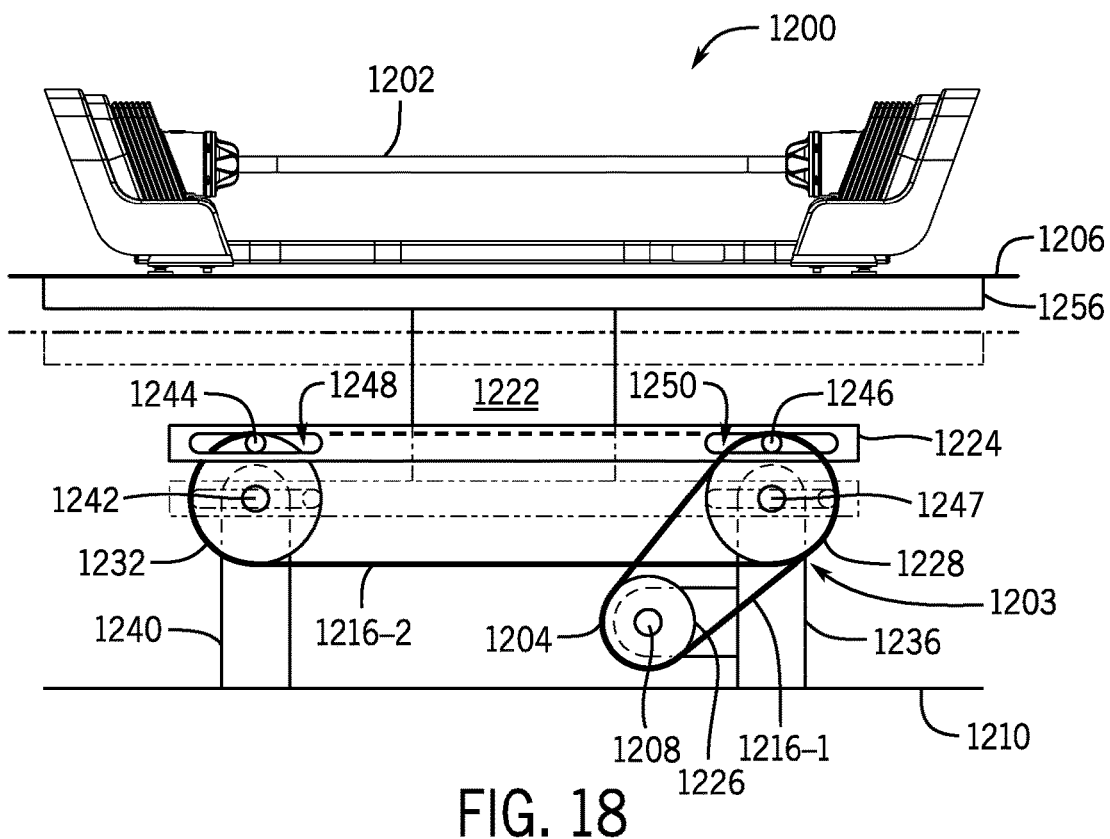
FIG. 18 is a schematic view of an embodiment of a weight elevation subsystem suitable for use with the free-weight exercise system of FIG. 1A.

With reference to FIG. 18, an embodiment of a weight elevation subsystem 1200 suitable for use with the free-weight exercise system of FIG. 1A is disclosed. The weight elevation subsystem 1200 includes a frame 1210. The frame 1210 may have one or more supports 1236 and/or 1240 that extend upwardly from the frame 1210. The weight elevation subsystem 1200 includes a platform 1206 suitable to support one or more exercise weights 1202 as previously described. The platform 1206 may include a longitudinal member 1256, such as to stiffen the platform 1206. The platform 1206 may include a connector element 1222 extending therefrom, e.g., extending below the platform 1206. The connector element 1222 may be coupled to a flange 1224. The flange 1224 may include one or more slots 1248, 1250 formed therein.

The platform 1206 may be movable between the retracted and deployed configurations by a lift assembly 1203. The lift assembly 1203 may include a rotary actuator 1204 that may be coupled to the support 1236. A driving disc 1226 may be coupled to a rotary axis 1208 of the rotary actuator 1204 such that the rotary actuator 1204 is operable to rotate the driving disc 1226. A driven disc 1228 may be pivotally coupled to the support 1236 at a joint 1247. A driven disc 1232 may be pivotally coupled to the support 1240 at a joint 1242. The driven discs 1228 and 1232 may have respective guides 1246 and 1244 coupled thereto. The guides 1246, 1244 may be suitable to be received in the respective slots 1250 and 1248.

One or more flexible elements may couple the discs of the weight elevation subsystem 1200. For example, a flexible element 1216-1 may couple the disc 1226 with the disc 1228. Similarly, a flexible element 1216-2 may couple the disc 1228 with the disc 1232. Thus, the flexible elements 1216-1 and 1216-2 may transmit rotary motion of the rotary actuator 1204 from the disc 1226 to the disc 1228 and the disc 1232. As the rotary actuator 1204 rotates, the guides 1244 and 1246 may move within the respective slots 1248 and 1250 and cause the flange 1224 and thus the platform 1206 to move between the retracted configuration (shown for example in phantom lines in FIG. 18) and the deployed position (shown for example, in solid lines in FIG. 18).

Figure 19:
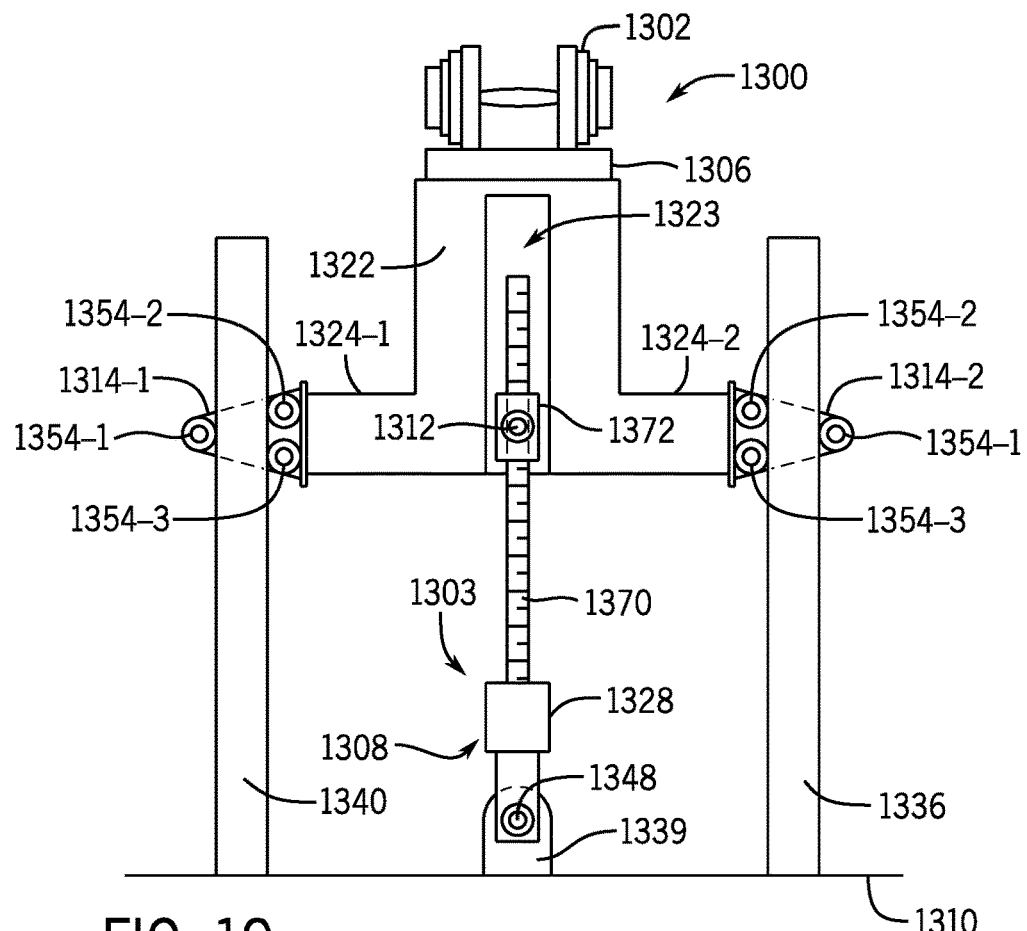
FIG. 19 is a schematic view of an embodiment of a weight elevation subsystem suitable for use with the free-weight exercise system of FIG. 1A.

With reference to FIG. 19, an embodiment of a weight elevation subsystem 1300 suitable for use with the free-weight exercise system of FIG. 1A is disclosed. The weight elevation subsystem 1300 includes a frame 1310. The frame 1310 may have one or more supports 1336, 1339, and/or 1340 that extend upwardly from the frame 1310. The support 1339 may be disposed between the supports 1340 and 1336. The weight elevation subsystem 1300 includes a platform 1306 suitable to support one or more exercise weights 1302 as previously described. The platform 1306 may include a longitudinal member, such as to stiffen the platform 1306. The platform 1306 may be movable between the retracted and deployed configurations by a lift assembly 1303. The platform 1306 may include a connector element 1322 extending therefrom, e.g., extending below the platform 1306. The connector element 1322 may be coupled to, or formed with, one or more flanges 1324-1 and 1324-2. The connector element 1322 may have a recess 1323 formed therein. A lift mechanism 1308 is pivotally coupled to the support 1339 at a joint 1348. The lift mechanism 1308 includes a rotary actuator 1328 that rotates a linear actuator 1370. The linear actuator 1370 is threadedly coupled to a movable element 1372. The linear actuator 1370 may be at least partially received in the recess 1323, so as to provide clearance for the linear actuator 1370 when the lift assembly 1303 is in the retracted position. The movable element 1372 is coupled to the flanges 1324, such as pivotally coupled at a joint 1312. The end portions of the flanges 1324-1 and 1324-2 are coupled to respective couplings 1314-1 and 1314-2. The couplings include one or more guide elements 1354 that translationally couple the couplings to the supports 1336 and/or 1340. For example, the coupling 1314-1 may include a guide element 1354-1 disposed on an outer portion of the support 1340 and two or more guide elements 1354-2, 1354-3 disposed on an inner portion of the support 1340. Similarly, the coupling 1314-2 may be substantially similar to the coupling 1314-1. The guide elements associated with a particular coupling may be arranged in a triangular fashion with respect to one another. Such an arrangement may have the benefit of stabilizing the respective coupling relative to the respective support. As the rotary actuator 1328 rotates the linear actuator 1370, the movable element 1372 may move along the linear actuator 1370 and cause the flanges 1324, the connector element 1322 and the platform 1306 to move between the retracted and deployed positions. As the flanges 1324 move, the couplings 1314 move along the respective supports 1336 and 1340 thereby providing support and smooth motion to the lift assembly 1303.

Figure 20:
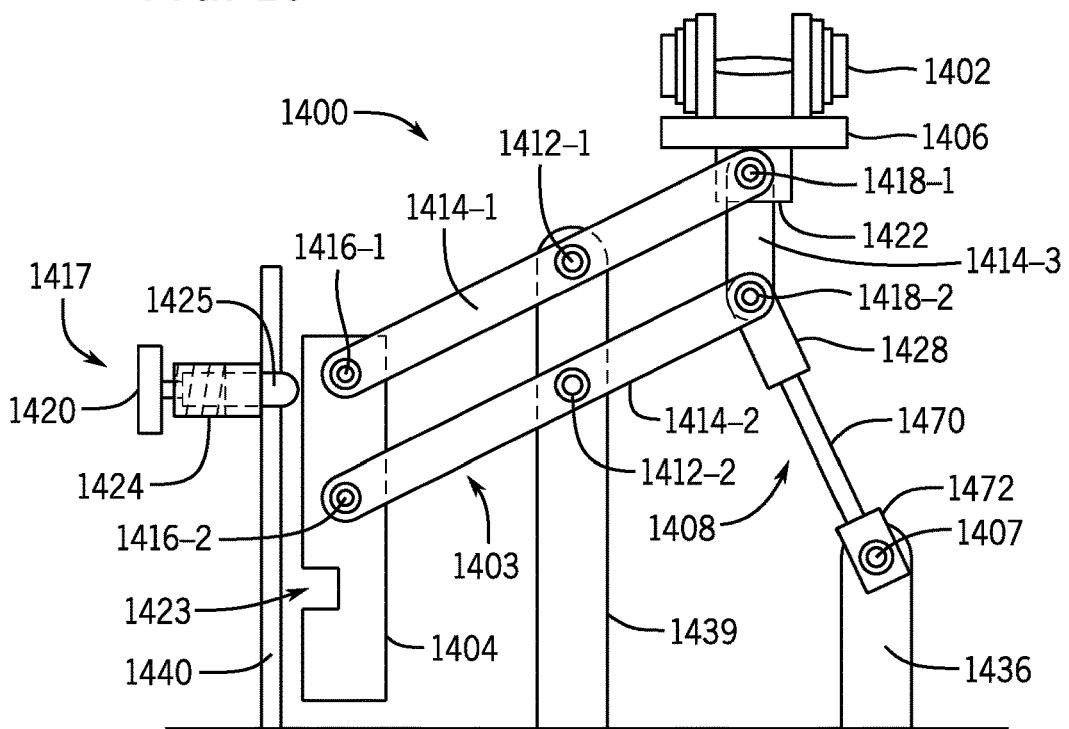
FIG. 20 is a schematic view of an embodiment of a weight elevation subsystem suitable for use with the free-weight exercise system of FIG. 1A.

With reference to FIG. 20, an embodiment of a weight elevation subsystem 1400 suitable for use with the free-weight exercise system of FIG. 1A is disclosed. The weight elevation subsystem 1400 includes a frame 1410. The frame 1410 may have one or more supports 1436, 1439 and/or 1440 that extend upwardly from the frame 1410. The support 1439 may be disposed between the supports 1440 and 1436. The weight elevation subsystem 1400 includes a platform 1406 suitable to support one or more exercise weights 1402 as previously described and coupled to a lift assembly 1403. The platform 1406 may include a longitudinal member, such as to stiffen the platform 1406. The platform 1406 may include a connector element 1422 extending therefrom, e.g., extending below the platform 1406. The connector element 1422 may be coupled to a lift assembly 1403. The lift assembly 1403 may be suitable to move the platform 1406 between the retracted and deployed positions. The lift assembly 1403 may include four-bar linkage. For example, the lift assembly 1403 may include links 1414-1, 1414-2, and/or 1414-3. A counterweight 1404 may form a fourth link of the lift assembly 1403. The counterweight 1404 may be of a suitable mass to counteract or balance the weight of the one or more exercise weights 1402. A benefit of using a counterweight may be the ability to use a smaller, less expensive, or lower power lift mechanism 1408. The counterweight 1404 may have a recess 1423 formed therein. The links 1414-1 and 1414-2 may be pivotally coupled to the support 1439 such as at respective joints 1412-1 and 1412-2. The link 1414-1 may be disposed above the link 1414-2. Respective end portions of the links 1414-1 and 1414-2 may be pivotally coupled to respective end portions of the link 1414-3, such as at respective joints 1418-1 and 1418-2. The end portions of the links 1414-1 and 1414-2 opposite the end portions coupled to the link 1414-3 may be pivotally coupled to the counterweight 1404 at respective joints 1416-1 and 1416-2. In some embodiments, the links 1414-1 and 1414-2 may be substantially parallel to one another.

In one embodiment, a lift mechanism 1408 is pivotally coupled to the support 1436 at a joint 1407. In some embodiments, the lift mechanism 1408 includes a gas spring as previously described. The gas spring may bias the lift assembly 1403 toward the deployed position. The gas spring may enable the lift assembly 1403 to be moved manually such as described with respect to the weight elevation subsystems 1000 and/or 1100.

In some embodiments, the lift mechanism 1408 includes a rotary actuator 1428 that rotates a linear actuator 1470. The linear actuator 1470 is threadedly coupled to a movable element 1472. The movable element 1472 is pivotally coupled to the support 1436 at the joint 1407. The rotary actuator is pivotally coupled to the lift assembly 1403 at the joint 1418-2. In other embodiments, the lift mechanism 1408 may be installed with the rotary actuator coupled to the support 1436 and the movable element 1472 coupled to the lift assembly 1403. As the rotary actuator 1428 rotates the linear actuator 1470, the movable element 1472 may induce a force on the support 1436 and a counteracting force may cause the lift assembly 1403 to move between the retracted and deployed positions. An advantage of the lift assembly 1403 may be that by the selective placement of the supports 1436, 1439, and 1440 relative to one another, the relative moments of the counterweight 1404, exercise weights 1402 and/or lift mechanism 1408 may be selected to reduce cost, weight, and/or power requirements of the lift mechanism 1408, and/or weight of the counterweight. Another benefit may be the ability to tune the reach of the platform 1406 between the retracted and deployed positions. When a gas spring is used as the lift mechanism 1408, an advantage may be non-powered operation of the lift assembly 1403. The counterweight 1404 may also assist to stabilize the lift assembly 1403.

The weight storage subassembly 1400 may include a lock mechanism 1417. The lock mechanism may include a pin 1425, a biasing element 1424, and an actuator 1420. The biasing element 1424 may bias the pin 1425 toward the counterweight 1404. When the pin 1425 and the recess 1423 are aligned, the biasing element may cause the pin to move into the recess. A benefit of the lock mechanism 1417 may be to prevent unwanted movement of the lift assembly 1403, such as when the lift assembly 1403 is in the deployed position. The actuator 1420 may be used to overcome the bias of the biasing element 1424 to retract the pin 1425 from the recess 1423 to allow motion of the lift assembly 1403. Another benefit of the lock mechanism 1417 may be one-handed locking and/or unlocking of the lift assembly 1403.

Figure 21:
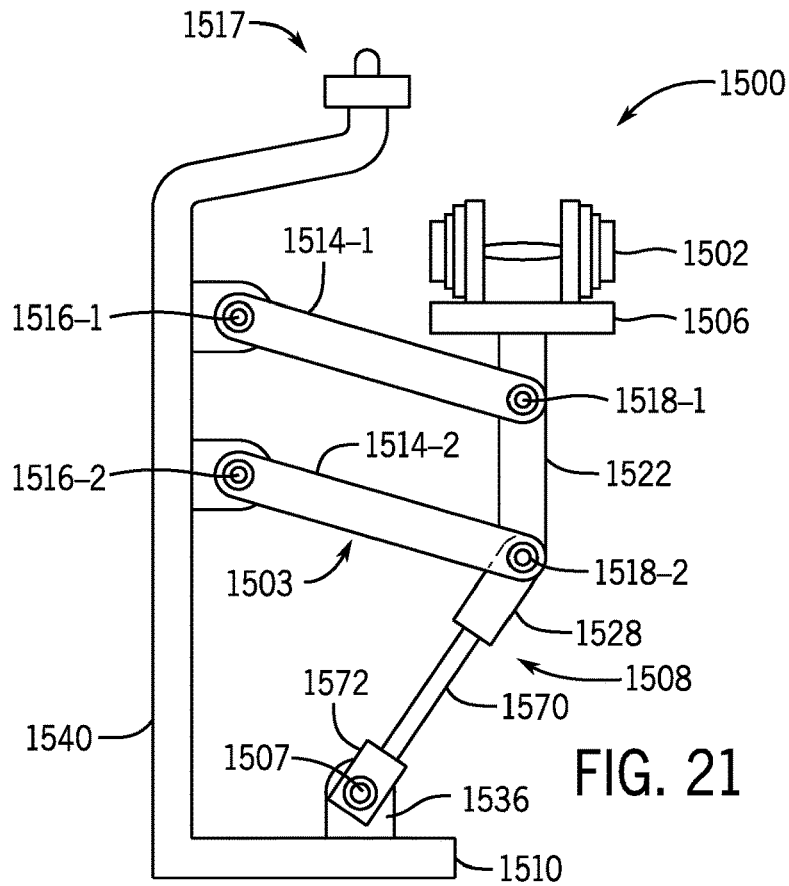
FIG. 21 is a schematic view of an embodiment of a weight elevation subsystem suitable for use with the free-weight exercise system of FIG. 1A.

With reference to FIG. 21, an embodiment of a weight elevation subsystem 1500 suitable for use with the free-weight exercise system of FIG. 1A is disclosed. The weight elevation subsystem 1500 includes a frame 1510. The frame 1510 may have one or more supports 1536 and 1540 that extend upwardly from the frame 1510. The weight elevation subsystem 1500 includes a platform 1506 suitable to support one or more exercise weights 1502 as previously described. The platform 1506 may include a longitudinal member, such as to stiffen the platform 1506. The platform 1506 may include a connector element 1522 extending therefrom, e.g., extending below the platform 1506. The connector element 1522 may be coupled to a lift assembly 1503. The lift assembly 1503 may be suitable to move the platform 1506 between the retracted and deployed positions. The lift assembly 1503 may include four-bar linkage. For example, the lift assembly 1503 may include links 1514-1, 1514-2. A portion of the connector element 1522 may form a portion of the lift assembly 1503. A portion of the support 1540 may form a portion of the lift assembly 1503. The links 1514-1 and 1514-2 may be pivotally coupled to the connector element 1522 such as at respective joints 1518-1 and 1518-2. The link 1514-1 may be disposed above the link 1514-2. The end portions of the links 1514-1 and 1514-2 opposite the end portions coupled to the connector element 1522 may be pivotally coupled to the support 1540 at respective joints 1516-1 and 1516-2. In some embodiments, the links 1514-1 and 1514-2 may be substantially parallel to one another.

In some embodiments, a lift mechanism 1508 is pivotally coupled to the support 1536 at a joint 1507. In some embodiments, the lift mechanism 1508 includes a gas spring as previously described. The gas spring may bias the lift assembly 1503 toward the deployed position. The gas spring may enable the lift assembly 1503 to be moved manually such as described with respect to the weight elevation subsystems 1000 and/or 1100.

In some embodiments, the lift mechanism 1508 includes a rotary actuator 1528 that rotates a linear actuator 1570. The linear actuator 1570 is threadedly coupled to a movable element 1572. The movable element 1572 is pivotally coupled to the support 1536 at the joint 1507. The rotary actuator 1528 is pivotally coupled to the lift assembly 1503 at the joint 1518-2. In other embodiments, the lift mechanism 1508 may be installed with the rotary actuator coupled to the support 1536 and the movable element 1572 coupled to the lift assembly 1503. As the rotary actuator 1528 rotates the linear actuator 1570, the movable element 1572 may induce a force on the support 1536 and a counteracting force may cause the lift assembly 1503 to move between the retracted and deployed positions. An advantage of the lift assembly 1503 may be smooth movement of the platform 1506 between the retracted and deployed configurations. Another benefit may be the ability to tune the reach of the platform 1506 between the retracted and deployed positions. When a gas spring is used as the lift mechanism 1508, an advantage may be non-powered operation of the lift assembly 1503.

The weight storage subassembly 1500 may include a lock mechanism 1517 similar to the lock mechanism 1417 previously described. The lock mechanism 1517 may be operative to limit or prevent unwanted movement of the lift mechanism 1508. The lock mechanism 1517 may be remotely situated from the lift mechanism, so as to provide easy access to the lock mechanism 1517 for a user.

Figure 22:
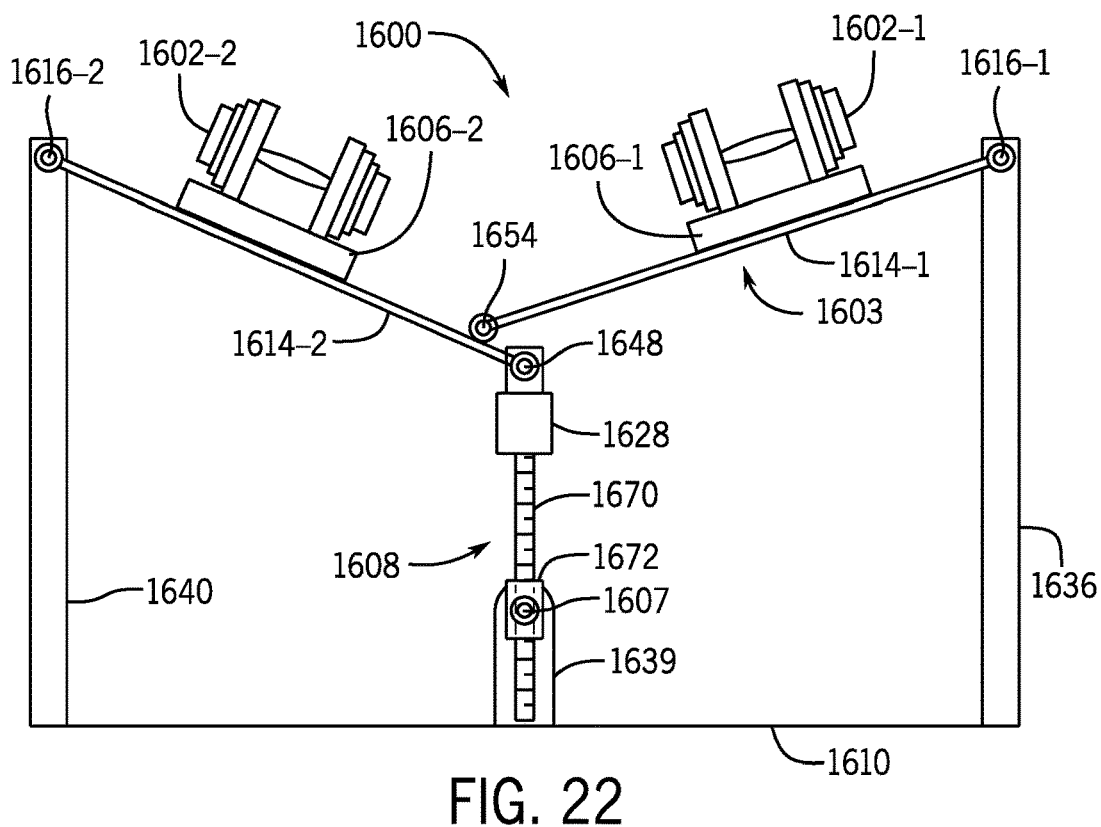
FIG. 22 is a schematic view of an embodiment of a weight elevation subsystem suitable for use with the free-weight exercise system of FIG. 1A.

With reference to FIG. 22, an embodiment of a weight elevation subsystem 1600 suitable for use with the free-weight exercise system of FIG. 1A is disclosed. The weight elevation subsystem 1600 includes a frame 1610. The frame 1610 may have one or more supports 1636, 1639 and/or 1640 that extend upwardly from the frame 1610. The support 1639 may be disposed between the supports 1640 and 1636. The weight elevation subsystem 1600 includes one or more platforms 1606-1, 1606-2 suitable to support one or more exercise weights 1502 as previously described. The platform 1606-1, 1606-2 may include respective longitudinal members, such as to stiffen the platforms. The platforms 1606-1 and 1606-2 may be disposed on respective links 1614-1 and 1614-2. The supports 1636 and 1640 and the links 1614-1 and 1614-2 may form a portion of a lift assembly 1603. An end portion of the link 1614-1 may be pivotally coupled to the support 1636 such as at a joint 1616-1. An end portion of the link 1614-2 may be pivotally coupled to the support 1640 such as at a joint 1616-2. An end portion of the link 1614-2 opposite the end portion coupled to the support 1640 may be pivotally coupled to a lift mechanism 1608 such as at a joint 1648. An end portion of the link 1614-1 opposite the end portion coupled to the support 1636 may include, or have coupled thereto, a guide element 1654. The guide element may be operative to guide the link 1614-1 along the link 1614-2.

In some embodiments, the lift mechanism 1608 includes a rotary actuator 1628 that rotates a linear actuator 1670. The linear actuator 1670 is threadedly coupled to a movable element 1672. The movable element 1672 is pivotally coupled to the support 1639 at a joint 1607. The rotary actuator 1628 is pivotally coupled to the lift assembly 1603 at the joint 1648. In other embodiments, the lift mechanism 1608 may be installed with the rotary actuator 1628 coupled to the support 1639 and the movable element 1672 coupled to the lift assembly 1603. As the rotary actuator 1628 rotates the linear actuator 1670, the movable element 1672 may induce a force on the support 1636 and a counteracting force may cause the lift assembly 1603 to move between the retracted and deployed positions. As the lift assembly 1603 moves from the retracted to the deployed configuration, the guide element 1654 may move along the link 1614-2. An advantage of the lift assembly 1603 may be that by the selective placement of the supports 1636, 1639, and 1640 relative to one another, the relative moments of the exercise weights 1602-1 and/or 1602-2 relative to the lift mechanism 1608 may be selected to reduce cost, weight, and/or power requirements of the lift mechanism 1608. Another benefit may be the ability to tune the reach of the platforms 1606-1 and 1606-2 between the retracted and deployed positions.

Figure 23:
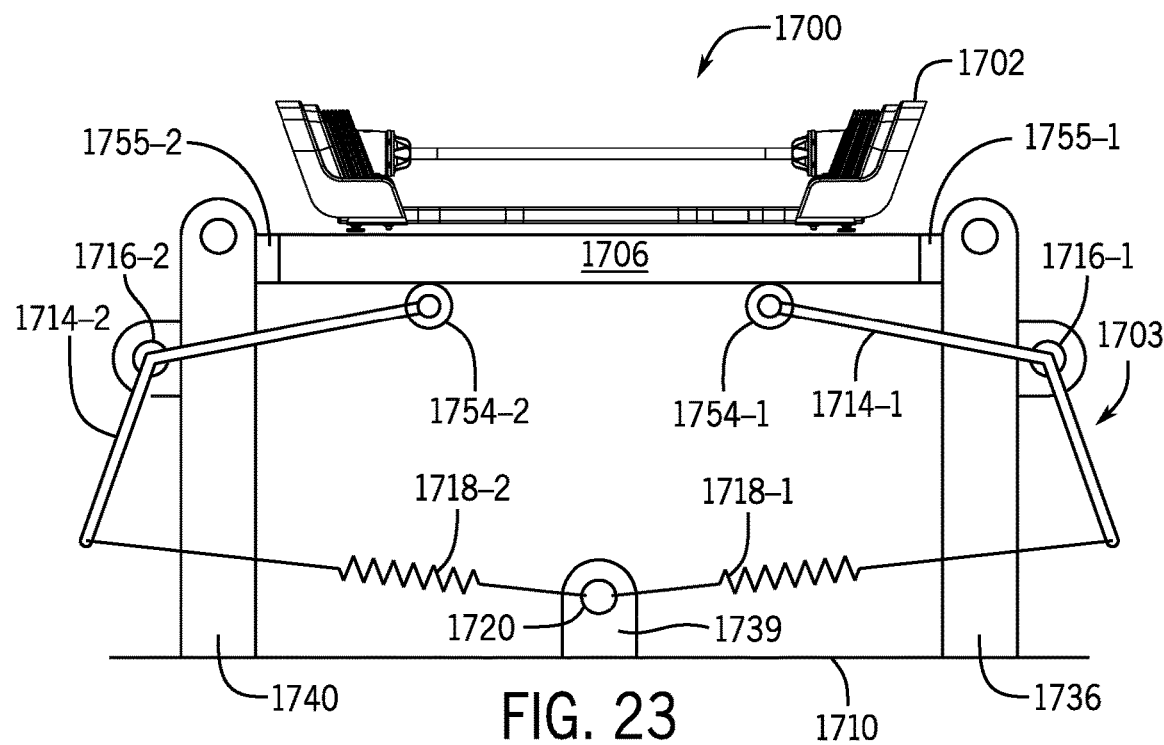
FIG. 23 is a schematic view of an embodiment of a weight elevation subsystem suitable for use with the free-weight exercise system of FIG. 1A.

With reference to FIG. 23, an embodiment of a weight elevation subsystem 1700 suitable for use with the free-weight exercise system of FIG. 1A is disclosed. The weight elevation subsystem 1700 includes a frame 1710. The frame 1710 may have one or more supports 1736, 1739 and/or 1740 that extend upwardly from the frame 1710. The weight elevation subsystem 1700 includes a platform 1706 suitable to support one or more exercise weights 1702 as previously described. The platform 1706 may include a longitudinal member, such as to stiffen the platform. The platform 1706 may include guide elements 1755-1 and 1755-2 disposed at respective end portions thereof. The guide elements 1755-1 and 1755-2 may engage the respective supports 1736 and 1740, so as to support and/or stabilize the platform 1706. The platform 1706 may be movable between the retracted and deployed configurations by a lift assembly 1703.

The lift assembly 1703 may include a link 1714-1 and a link 1714-2. The links 1714 may be bent or angled links. The links 1714-1 and 1714-2 may be pivotally coupled to the respective supports 1736 and 1740 such as at respective joints 1716-1 and 1716-2. In some embodiments, the links 1714-1 and 1714-2 are coupled to the respective joints 1716-1 and 1716-2 at a bend in the respective links. One end portion of each of the links 1714-1 and 1714-2 may include, or have coupled thereto, respective guide elements 1754-1 and 1754-2. The guide elements 1754 may support the platform 1706, such that the guide elements 1754 may roll, slide, or glide along a lower surface of the platform as the lift assembly 1703 moves between the retracted and deployed configurations. An end portion of the links 1714-1 and 1714-2 opposite the end portions with the guide elements may be coupled to respective biasing elements 1718-1 and 1718-2. The biasing elements 1718 may be springs. An end portion of the biasing elements 1718 opposite the end portions coupled to the links 1714 may be coupled to an anchor 1720 formed in the support 1739.

The lift assembly 1703 may be manually movable between retracted and deployed configurations such as described with respect to the weight elevation subsystems 1000 and/or 1100. However with the lift assembly 1703 the force to balance the weight of the platform 1706 and exercise weights 1702 bay be provided by the biasing elements 1718. An advantage of the lift assembly 1708 may be the ability to deploy the exercise weights 1702 without the use of a lift mechanism. The movement of the guide elements 1754 and 1755 relative to the rest of the lift assembly 1703 may provide for smooth, stable movement between the retracted and deployed configurations.

Figure 24:
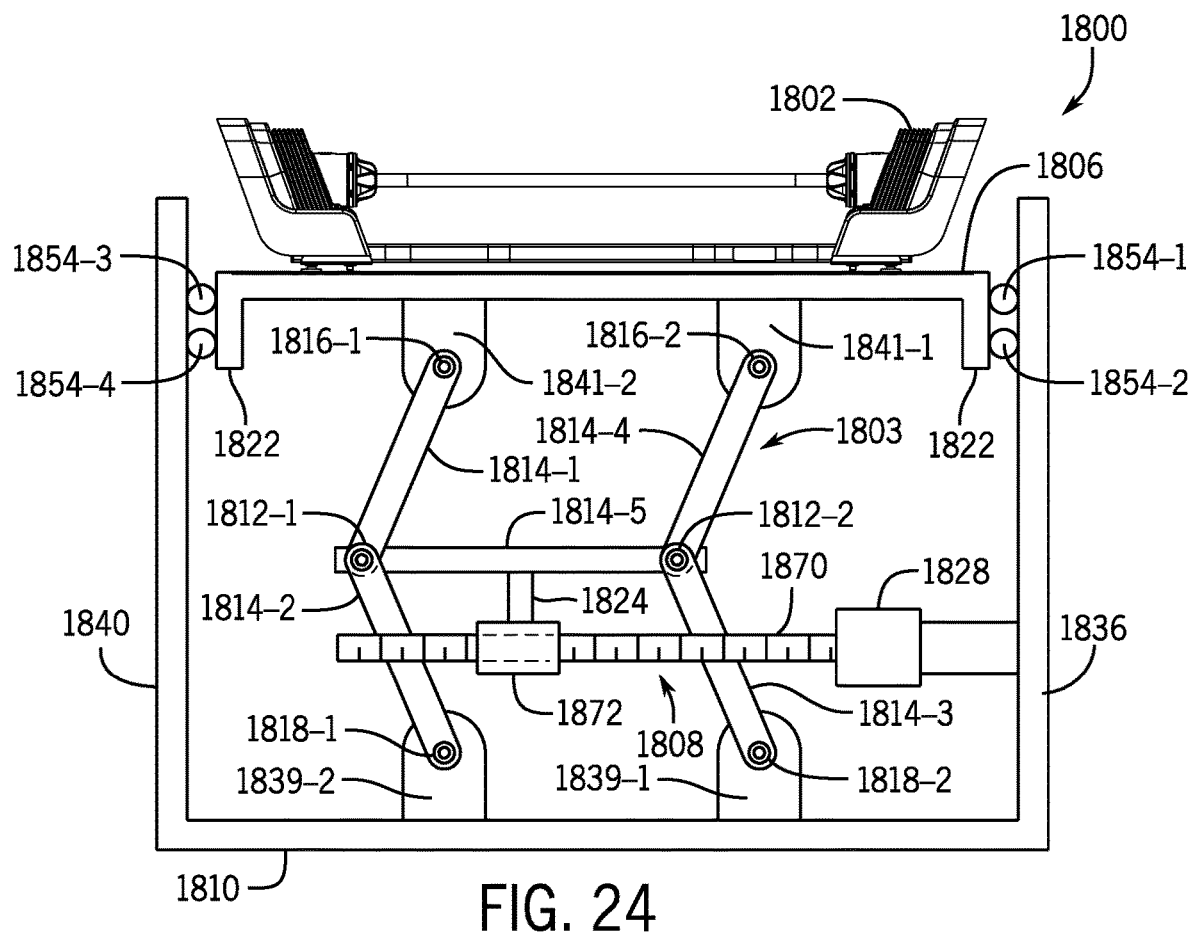
FIG. 24 is a schematic view of an embodiment of a weight elevation subsystem suitable for use with the free-weight exercise system of FIG. 1A.

With reference to FIG. 24, an embodiment of a weight elevation subsystem 1800 suitable for use with the free-weight exercise system of FIG. 1A is disclosed. The weight elevation subsystem 1800 includes a frame 1810. The frame 1810 may have one or more supports 1836, 1839-1, 1839-2 and/or 1840 that extend upwardly from the frame 1810. The supports 1839-1 and 1839-2 may be disposed between the supports 1836 and 1840. The weight elevation subsystem 1800 includes a platform 1806 suitable to support one or more exercise weights 1802 as previously described. The platform 1806 may include a longitudinal member, such as to stiffen the platform. The platform 1806 may include one or connector elements 1822 extending therefrom, e.g., extending below the platform 1806. The connector elements 1822 may be disposed at respective end portions of the platform 1806. One more guide elements 1854-1, 1854-2, 1854-3, 1854-4 may be disposed between connector elements 1822 and the respective supports 1836 and 1840. The guide elements 1854 may enable the platform 1806 to glide, roll, or otherwise move relative to the supports 1836 and 1840 while the supports stabilize and/or support the platform 1806. One or more bosses 1841-1 and 1842-2 may extend below the platform 1806.

The platform 1806 may be movable between the retracted and deployed configurations by a lift assembly 1803. The lift assembly 1803 may be formed by links 1814-1, 1814-2, 1814-3, 1814-4, and 1814-5. Respective upper end portions of the links 1814-1 and 1814-4 may be pivotally coupled to respective bosses 1841-2 and 1841-1 by respective joints 1816-1 and 1816-2. Similarly, respective lower end portions of the links 1814-2 and 1814-3 may be pivotally coupled to respective supports 1839-2 and 1839-1 by respective joints 1818-1 and 1818-2. The end portions of the links 1814-1, 1814-2, 1814-3, 1814-4 opposite their respective couplings with the respective bosses 1841 and supports 1839 may be coupled to another link of the lift assembly 1803. For example, end portions of the links 1814-1 and 1814-2 may be pivotally coupled to one another at a joint 1812-1. Similarly, end portions of the links 1814-3 and 1814-4 may be pivotally coupled to one another at a joint 1812-2. The link 1814-5 may connect the links 1814-1, 1814-2, 1814-3, and 1814-4. For example, one end portion of the link 1814-5 may be pivotally coupled to the link 1814-1 and 1814-2 by the joint 1812-1 and the opposite end portion of the link 1814-5 may be pivotally coupled to the links 1814-3 and 1814-4 by the joint 1812-2.

In some embodiments, the weight storage subassembly 1800 includes a lift mechanism 1808. The lift mechanism 1808 includes a rotary actuator 1828 that rotates a linear actuator 1870. The linear actuator 1870 is threadedly coupled to a movable element 1872. The movable element 1872 is coupled to the lift assembly 1803 via a connector 1824 coupled to the link 1814-5. The rotary actuator 1828 is coupled to the support 1836. In other embodiments, the rotary actuator 1828 is coupled to the support 1840. In other embodiments, the lift mechanism 1808 may be installed with the rotary actuator coupled to the connector 1824 and the movable element 1872 coupled to one of the supports 1836, 1840. As the rotary actuator 1828 rotates the linear actuator 1870, the movable element 1872 may induce a force on the connector 1824 cause the lift assembly 1803 to move between the retracted and deployed positions. An advantage of the lift assembly 1803 may be smooth movement of the platform 1806 between the retracted and deployed configurations. Another benefit may be the ability to tune the reach of the platform 1806 between the retracted and deployed positions. In some embodiments, the lift mechanism is a gas spring. When a gas spring is used as the lift mechanism 1808, an advantage may be non-powered operation of the lift assembly 1803.

Figure 25:
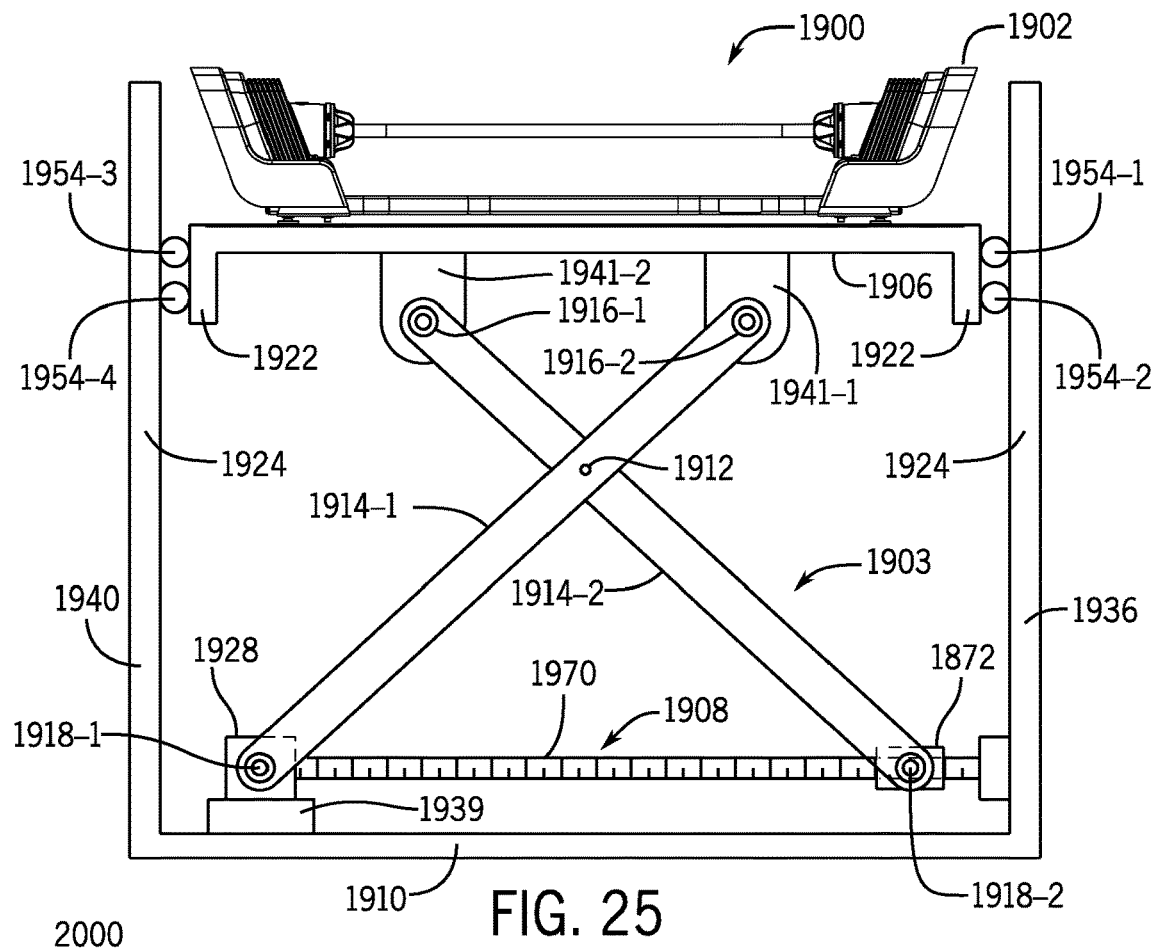
FIG. 25 is a schematic view of an embodiment of a weight elevation subsystem suitable for use with the free-weight exercise system of FIG. 1A.

With reference to FIG. 25, an embodiment of a weight elevation subsystem 1900 suitable for use with the free-weight exercise system of FIG. 1A is disclosed. The weight elevation subsystem 1900 includes a frame 1910. The frame 1910 may have one or more supports 1936, 1939, and/or 1940 that extend upwardly from the frame 1910. The support 1939 may be disposed between the supports 1936 and 1940. The weight elevation subsystem 1900 includes a platform 1906 suitable to support one or more exercise weights 1902 as previously described. The platform 1906 may include a longitudinal member, such as to stiffen the platform. The platform 1906 may include one or connector elements 1922 extending therefrom, e.g., extending below the platform 1906. The connector elements 1922 may be disposed at respective end portions of the platform 1906. One or more guide elements 1954-1, 1954-2, 1954-3, 1954-4 may be disposed between connector elements 1922 and the respective supports 1936 and 1940. The guide elements 1954 may enable the platform 1906 to glide, roll, or otherwise move relative to the supports 1936 and 1940 while the supports stabilize and/or support the platform 1906. One or more bosses 1941-1 and 1942-2 may extend below the platform 1906.

The platform 1906 may be movable between the retracted and deployed configurations by a lift assembly 1903. In some embodiments, the lift assembly 1903 includes a lift mechanism 1908. The lift mechanism 1908 includes a rotary actuator 1928 that rotates a linear actuator 1970. The linear actuator 1970 is threadedly coupled to a movable element 1972. The movable element 1972 is coupled to the lift assembly 1903 via a connector 1924 coupled to the link 1914-5. The rotary actuator 1928 is coupled to the support 1939 at one end portion and to one of the supports 1936 or 1940 at the other end portion.

A portion of the lift assembly 1903 may be formed by links 1914-1 and 1914-2. Respective upper end portions of the links 1914-1 and 1914-2 may be pivotally coupled to respective bosses 1941-2 and 1941-1 by respective joints 1916-1 and 1916-2. The end portions of the links 1914 opposite their respective couplings with the respective bosses 1941 may be pivotally coupled to a lift mechanism 1908. For example, end portions of the link 1914-1 may be pivotally coupled to the boss 1941-1 at the joint 1916-2 and to the rotary actuator 1928 of the lift mechanism at a joint 1918-2. Similarly, the end portions of the link 1914-2 may be pivotally coupled to the boss 1941-2 at the joint 1916-1 and to the movable element 1972 at a joint 1918-2.

As the rotary actuator 1928 rotates the linear actuator 1970, the movable element 1972 may induce a force on the joint 1918-2 and thus on the link 1914-2 to cause the lift assembly 1903 to move between the retracted and deployed positions. An advantage of the lift assembly 1903 may be smooth movement of the platform 1906 between the retracted and deployed configurations. Another benefit may be the ability to tune the reach of the platform 1906 between the retracted and deployed positions.

Figure 26:
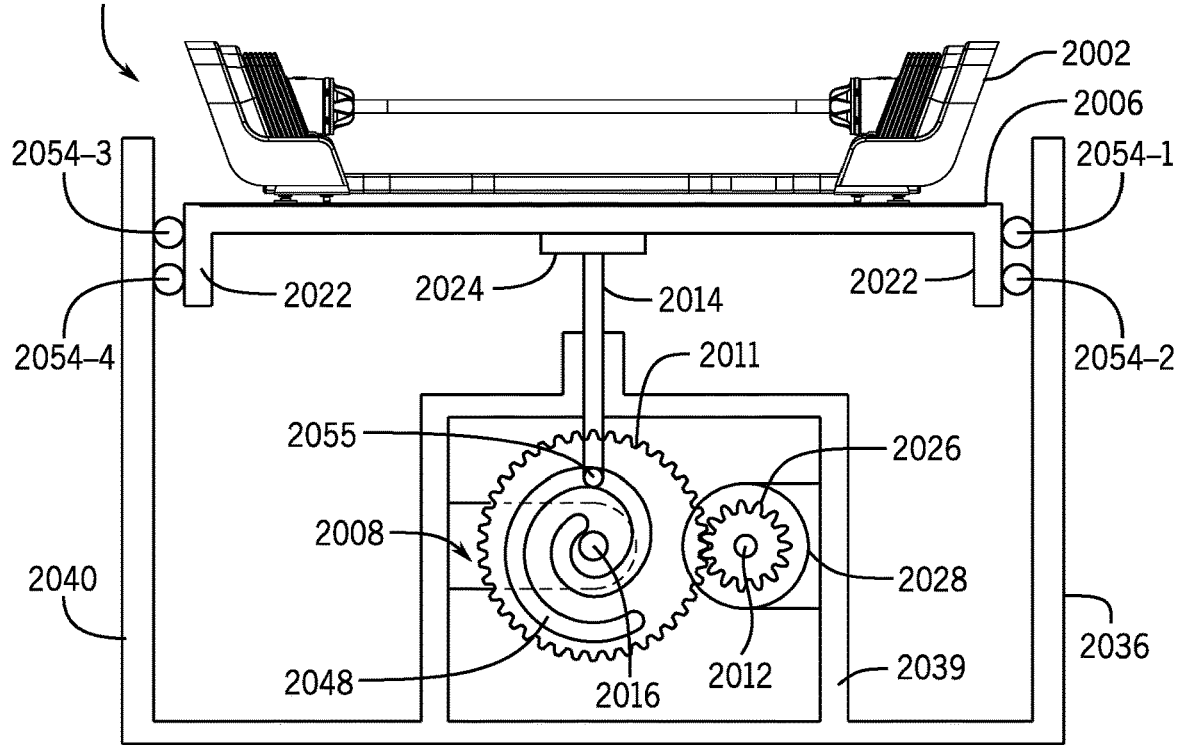
FIG. 26 is a schematic view of an embodiment of a weight elevation subsystem suitable for use with the free-weight exercise system of FIG. 1A.

With reference to FIG. 26, an embodiment of a weight elevation subsystem 2000 suitable for use with the free-weight exercise system of FIG. 1A is disclosed. The weight elevation subsystem 2000 includes a frame 2010. The frame 2010 may have one or more supports 2036, 2039, and/or 2040 that extend upwardly from the frame 2010. The support 2039 may be disposed between the supports 2036 and 2040. The weight elevation subsystem 2000 includes a platform 2006 suitable to support one or more exercise weights 2002 as previously described. The platform 2006 may include a longitudinal member, such as to stiffen the platform. The platform 2006 may include one or connector elements 2022 extending therefrom, e.g., extending below the platform 2006. The connector elements 2022 may be disposed at respective end portions of the platform 2006. One or more guide elements 2054-1, 2054-2, 2054-3, 2054-4 may be disposed between connector elements 2022 and the respective supports 2036 and 2040. The guide elements 2054 may enable the platform 2006 to glide, roll, or otherwise move relative to the supports 2036 and 2040 while the supports stabilize and/or support the platform 2006. One or more bosses 2024 may extend below the platform 2006. A link 2014 may be coupled to the platform 2006 either directly or via the boss 2024. The link 2014 may include, or be coupled to, a guide element 2055.

The weight storage subassembly 2000 includes a lift assembly 2003 including a lift mechanism 2008. The lift mechanism 2008 includes a rotary actuator 2028 such as a motor. The lift assembly 2003 includes a driving disc 2026 is rotatably coupled to an axis 2012 of the rotary actuator 2028. The driving disc 2026 is rotatably coupled to a driven disc 2011. The driven disc 2011 is rotatably coupled to the support 2039 by a joint 2016. In various embodiments, the driving disc 2026 and the driven disc 2011 are gears, pulleys, wheels, sprockets or the like. When appropriate (e.g., when the discs are pulleys or sprockets) the discs may be coupled by a flexible element such as a belt or chain. The driven disc 2011 includes a helical slot 2048 formed therein or therewith. The helical slot 2048 may follow a path around at least a portion of the driven disc 2011 that has a changing distance of the slot 2048 relative to the joint 2016. For example, as the slot extend portions about the driven disc 2011, the distance of the slot 2048 may become further away from the joint 2016. The guide element 2055 is received in the slot 2048.

As the rotary actuator 2028 rotates, the driving disc 2026 rotates and causes rotation of the driven disc 2011. As the driven disc 2011 rotates, the guide element 2055 moves relative to the slot 2048. As the guide element 2055 moves relative to the slot, the guide element 2055 is moved farther from, or closer to, the joint 2016 depending on the direction of rotation of the driven disc 2011. As the guide element 2055 moves, it causes movement of the link 2014 and thus the platform 2006. Thus, the platform 2006 may be moved between the retracted and deployed configurations by actuating the rotary actuator 2028 in one direction or the other. An advantage of the lift mechanism 2008 may be smooth movement of the platform 2006 between the retracted and deployed configurations. Another benefit may be the ability to tune the reach of the platform 2006 between the retracted and deployed positions.

Figure 27:
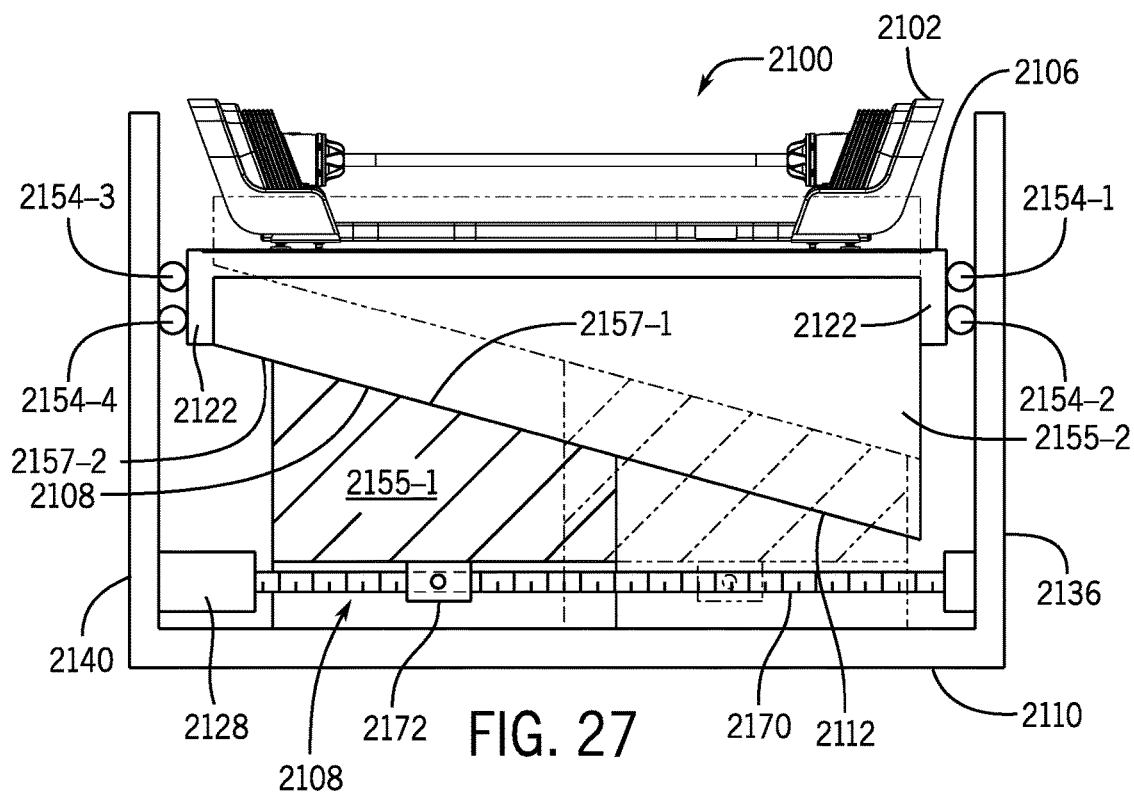
FIG. 27 is a schematic view of an embodiment of a weight elevation subsystem suitable for use with the free-weight exercise system of FIG. 1A.

With reference to FIG. 27, an embodiment of a weight elevation subsystem 2100 suitable for use with the free-weight exercise system of FIG. 1A is disclosed. The weight elevation subsystem 2100 includes a frame 2110. The frame 2110 may have one or more supports 2136, 2140 that extend upwardly from the frame 2110. The weight elevation subsystem 2100 includes a platform 2106 suitable to support one or more exercise weights 2102 as previously described. The platform 2106 may include a longitudinal member, such as to stiffen the platform. The platform 2016 is moveable between retracted and deployed configurations by a lift assembly 2103. The platform 2106 may include one or connector elements 2122 extending therefrom, e.g., extending below the platform 2106. The connector elements 2122 may be disposed at respective end portions of the platform 2106. One more guide elements 2154-1, 2154-2, 2154-3, 2154-4 may be disposed between connector elements 2122 and the respective supports 2136 and 2140. The guide elements 2154 may enable the platform 2106 to glide, roll, or otherwise move relative to the supports 2136 and 2140 while the supports stabilize and/or support the platform 2106. The platform 2106 may have a guide element 2155-2 coupled thereto or formed therewith. The guide element 2155-2 has an angled face 2157-2 formed thereon.

In some embodiments, the lift assembly 2103 includes a lift mechanism 2108. The lift mechanism 2108 includes a rotary actuator 2128 that rotates a linear actuator 2170. The linear actuator 2170 is threadedly coupled to a movable element 2172. The movable element 2172 is coupled to a guide element 2155-1. The guide element 2155-1 has an angled face 2157-1 formed thereon. The angled faces 2157-1 and 2157-2 may be in contact with one another. The rotary actuator 2128 is coupled to one of the supports 2136, 2140. An end portion of the linear actuator 2170 is coupled to the other of the supports 2136, 2140. In other embodiments, the rotary actuator 2128 is coupled to the support 2140. Either or both of the guide elements 2155-1 and/or 2155-2 may be made at least partially of a friction-reducing material such as polyethylene (e.g. ultra high molecular weight polyethylene, polyoxymethylene (i.e., Delrin), or the like. Either or both of the guide elements 2155-1 and/or 2155-2 may include casters, rollers, bearings, or the like. Such features may facilitate the movement of the guide elements 2155-1 and/or 2155-2 with respect to one another.

As the rotary actuator 2128 rotates the linear actuator 2170, the movable element 1872 may induce a lateral force on the guide element 2155-1. As the guide element 2155-1 moves laterally, the interface of the angled faces 2157-1 and 2157-2 may cause the guide element 2155-1 to raise or lower the guide element 2155-2 such as via an inclined plane or ramp action to move the platform 2106 between the retracted and deployed configurations. See, e.g. FIG. 27 showing the platform 2106 in the retracted configuration in solid lines and the deployed configuration in phantom lines. An advantage of the lift assembly 2103 may be smooth movement of the platform 2106 between the retracted and deployed configurations. Another benefit may be the ability to tune the reach of the platform 2106 between the retracted and deployed positions. Additionally, the inclined plane interface of the angled faces 2157-1 and 2157-2 may enable the use of a smaller, lower cost, or less expensive lift mechanism 2108.

Figure 28:
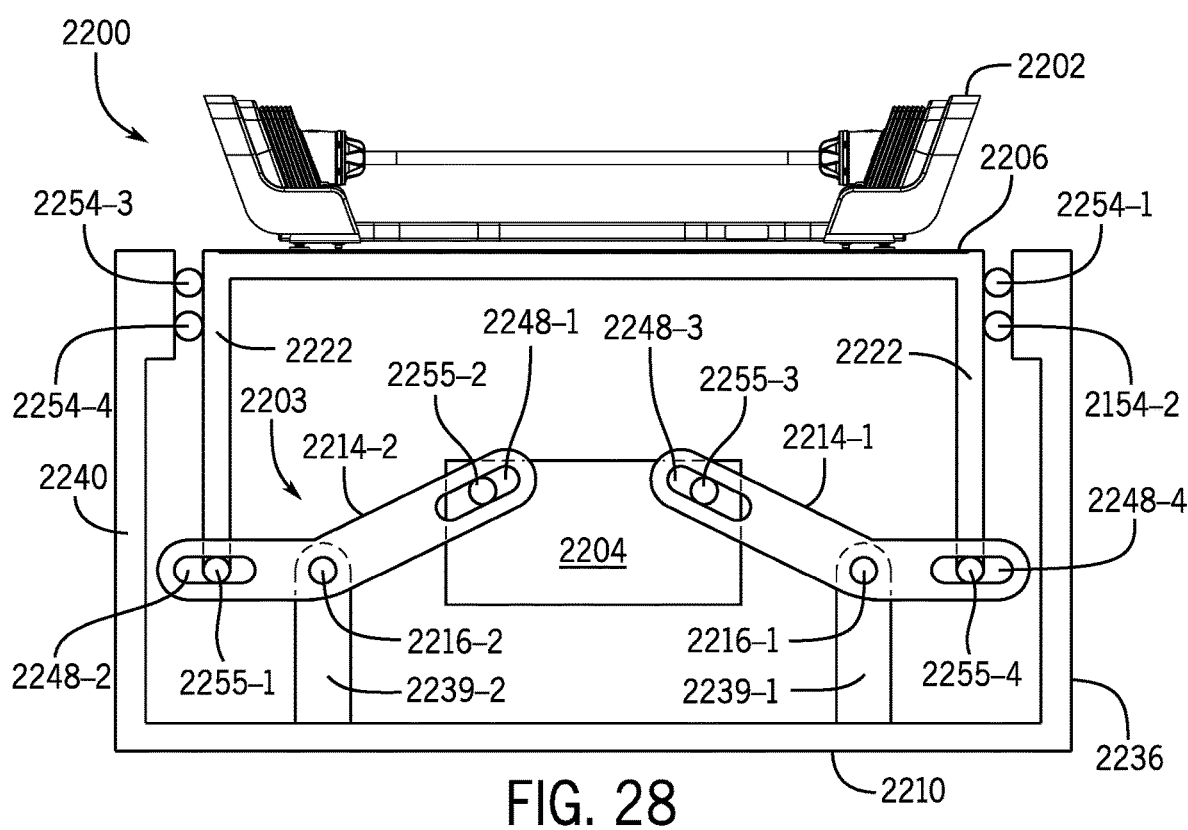
FIG. 28 is a schematic view of an embodiment of a weight elevation subsystem suitable for use with the free-weight exercise system of FIG. 1A.

With reference to FIG. 28, an embodiment of a weight elevation subsystem 2200 suitable for use with the free-weight exercise system of FIG. 1A is disclosed. The weight elevation subsystem 2200 includes a frame 2210. The frame 2210 may have one or more supports 2236, 2239-1, 2239-2, and 2240 that extend upwardly from the frame 2210. The supports 2239-1 and 2239-2 may be disposed between the supports 2236 and 2240. The weight elevation subsystem 2200 includes a platform 2206 suitable to support one or more exercise weights 2202 as previously described. The platform 2206 may include a longitudinal member, such as to stiffen the platform. The platform 2206 may include one or connector elements 2222 extending therefrom, e.g., extending below the platform 2206. The connector elements 2222 may be disposed at respective end portions of the platform 2206. One or more guide elements 2254-1, 2254-2, 2254-3, 2254-4 may be disposed between connector elements 2222 and the respective supports 2236 and 2240. The guide elements 2254 may enable the platform 2206 to glide, roll, or otherwise move relative to the supports 2236 and 2240 while the supports stabilize and/or support the platform 2206. The connector elements 2222 may include or be coupled to guide elements 2255-1, 2255-4 at respective end portions thereof.

The platform 2206 may be movable between the retracted and deployed configurations by a lift assembly 2203. The lift assembly 2203 may include a link 2214-1 and a link 2214-2. The links 2214 may be bent or angled links. The links 2214-1 and 2214-2 may be pivotally coupled to the respective supports 2239-1 and 2239-2 such as at respective joints 2216-1 and 2216-2. In some embodiments, the links 2214-1 and 2214-2 are coupled to the respective joints 2216-1 and 2216-2 at a bend in the respective links. The links 2214-1 and 2214-2 may include slots 2248-1, 2248-2, 2248-3, 2248-4 formed therein.

The lift assembly 2203 may include a counterweight 2204. The counterweight 2204 may be of a suitable mass to counteract or balance the weight of the exercise weights 2202. Guide elements 2255-2 and 2255-3 may be coupled to, or formed with, the counterweight 2204.

The guide elements 2255-1 and 2255-4 may be received in the slots 2248-2 and 2248-4 formed in the respective links 2214-2 and 2214-1. The guide elements 2255-2 and 2255-3 may be received in the respective slots 2248-1 and 2248-3 formed in the links 2214-2 and 2214-1. As the lift assembly 2203 moves between the retracted and deployed configurations the guide elements 2255 may move within the respective slots 2248 within which they are received. The lift assembly 2203 may be manually movable between retracted and deployed configurations such as described with respect to the weight elevation subsystems 1000 and/or 1100. An advantage of the lift assembly 2203 may be smooth movement of the platform 2206 between the retracted and deployed configurations. Another advantage may be the ability to move the lift assembly 2203 manually, without a powered lift mechanism.

Figure 29:
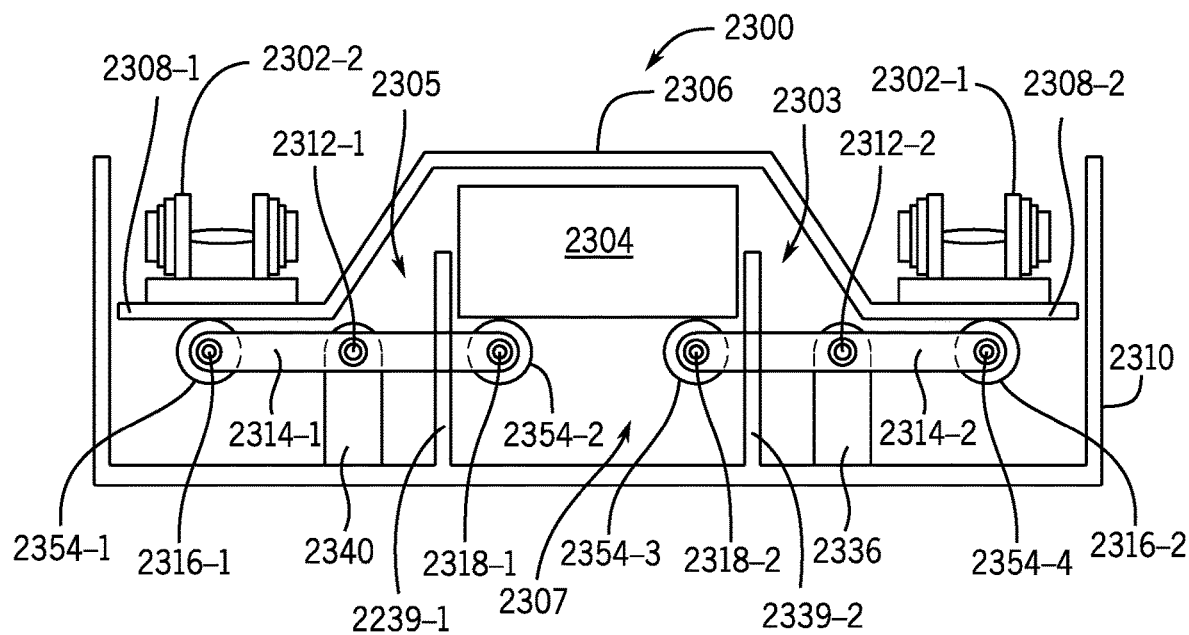
FIG. 29 is a schematic view of an embodiment of a weight elevation subsystem suitable for use with the free-weight exercise system of FIG. 1A.

With reference to FIG. 29, an embodiment of a weight elevation subsystem 2300 suitable for use with the free-weight exercise system of FIG. 1A is disclosed. The weight elevation subsystem 2300 includes a frame 2310. The frame 2310 may have one or more supports 2336 and/or 2340 that extend upwardly from the frame 2310. The platform 2306 may be movable between the retracted and deployed configurations by a lift assembly 2303. The lift assembly 2303 may include links 2314-1 and 2314-2 pivotally coupled to the respective supports 2340 and 2336, such as at respective joints 2312-1 and 2312-2. The links 2314-1 and 2314-2 may include, or have coupled thereto, respective guide elements 2354-1, 2354-2, 2354-3, and 2354-4 at the end portions of the links 2314. For example, the guide elements 2354 may be rollers coupled to the end portions of the links 2314 by respective joints 2316-1, 2316-2, 2316-3, and 2316-4.

The weight elevation subsystem 2300 includes a platform 2306 suitable to support one or more exercise weights 2302-1, 2302-2 as previously described. The platform 2306 may include one or more handles coupled thereto and suitable to be gripped by a hand of a user, such as to move the weight elevation subsystem 2300 between the retracted and deployed configurations. The platform 2306 may include one or more connector elements 2308-1, 2308-2 extending therefrom, e.g., extending below the platform 2306. The connector elements 2308-1, 2308-2 may be supported from below by the respective guide elements 2354-1 and 2354-4, such as rollers.

The weight elevation subsystem 2300 includes a counterweight 2304. The counterweight 2304 may be supported by the respective guide elements 2354-2 and 2354-3. The counterweight 2304 may be received in a recess 2307 formed by supports 2339-1 and 2339-2 disposed between the supports 2336 and 2340 when the lift assembly 2303 is in the deployed configuration. The counterweight 2304 may be received in a recess 2305 formed by the platform 2306 when the lift assembly 2303 is in the retracted configuration. The counterweight 2304 may be of a suitable mass to counteract or balance the weight of the exercise weights 2302-1 and 2302-2. The lift assembly 1703 may be manually movable between retracted and deployed configurations such as described with respect to the weight elevation subsystems 1000 and/or 1100. An advantage of the 2303 may be the ability to deploy and/or stow exercise weights without the use of a powered actuator such as a motor or lift mechanism.

Figure 30:
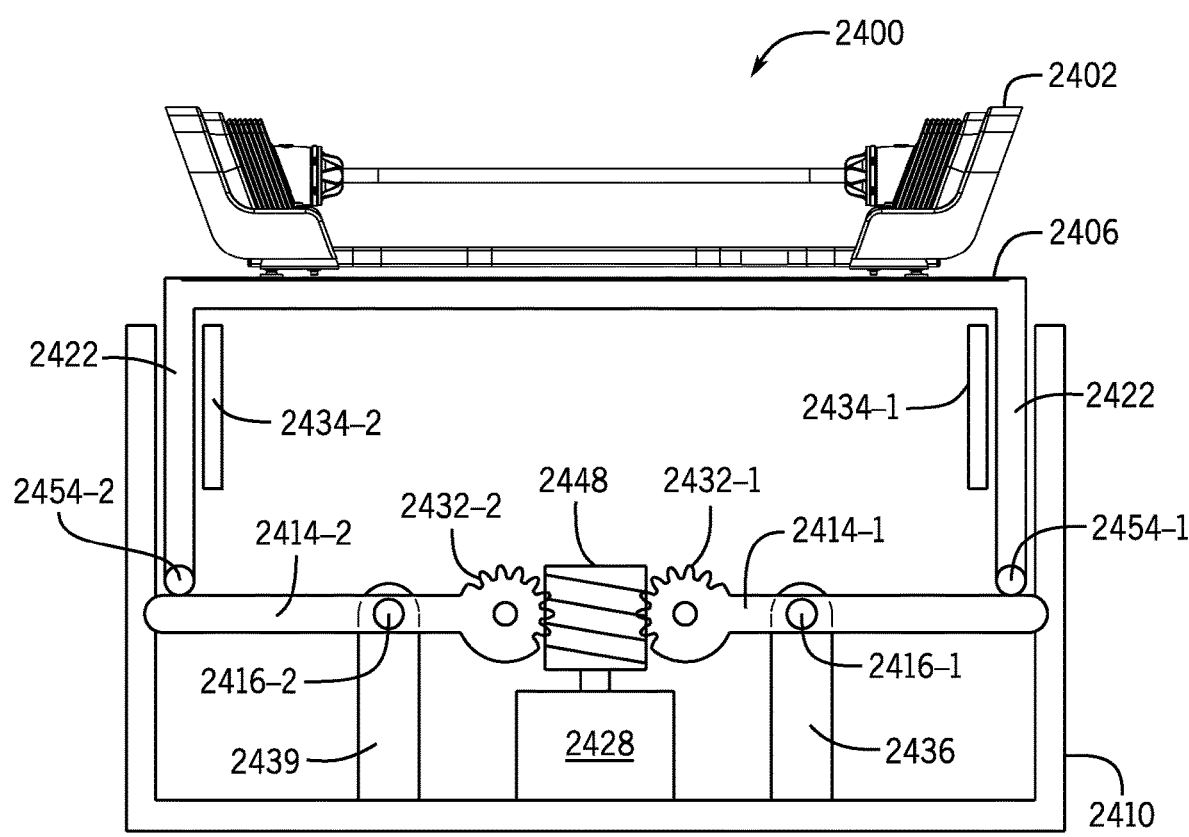
FIG. 30 is a schematic view of an embodiment of a weight elevation subsystem suitable for use with the free-weight exercise system of FIG. 1A.

With reference to FIG. 30, an embodiment of a weight elevation subsystem 2400 suitable for use with the free-weight exercise system of FIG. 1A is disclosed. The weight elevation subsystem 2400 includes a frame 2410. The frame 2410 may have one or more supports 2436 and/or 2439 that extend upwardly from the frame 2410. A rotary actuator 2428 may be disposed between the supports 2436 and 2439. Links 2414-1 and 2424-2 may be pivotally coupled to the respective supports 2436 and 2439 such as at joints 2416-1 and 2416-2. The links 2414-1 and 2424-2 may have discs 2432-1 and 2432-2 formed at the end portions thereof. The discs may be sprockets or gears in many embodiments. The discs may have teeth or tines disposed on an outer edge thereof.

The weight elevation subsystem 2400 includes a platform 2406 suitable to support one or more exercise weights 2402 as previously described. The platform 2406 may include a longitudinal member, such as to stiffen the platform. The platform 2406 may include one or connector elements 2422 extending therefrom, e.g., extending below the platform 2406. The connector elements 2422 may be disposed at respective end portions of the platform 2406. The connector elements 2422 may be received between the frame 2410 and one or more guides 2434-1 and 2434-2. One or more guide elements 2454-1, 2454-2 may be disposed at the end portions of the connector elements 2422. The guide elements 2454-1 and 2454-2 may be supported by end portions of the links 2414-1 and 2414-2. The guide elements 2454 may enable the platform 2406 to glide, roll, or otherwise move relative to the links 2414-1 and 2414-2.

The rotary actuator 2428 have a threaded element 2448 coupled rotationally thereto. The threaded element 2448 engages the discs 2432-1 and 2432-2. As the rotary actuator 2428 rotates, a helical groove in the threaded element 2448 engages the teeth of the discs 2432-1 and 2432-2 and causes the links 2414-1 and 2414-2 to pivot about the respective joints 2416-1 and 2416-2. For example, as the disc-end portions of the links move down, the end portions of the links 2414-1 and 2414-2 that engage the guide elements 2454-1 and 2454-2 move up to move the platform 2406 to the deployed configuration. As the rotary actuator 2428 in the opposite direction, the action may be reversed and the platform 2406 is moved to the retracted configuration.

Figure 31:
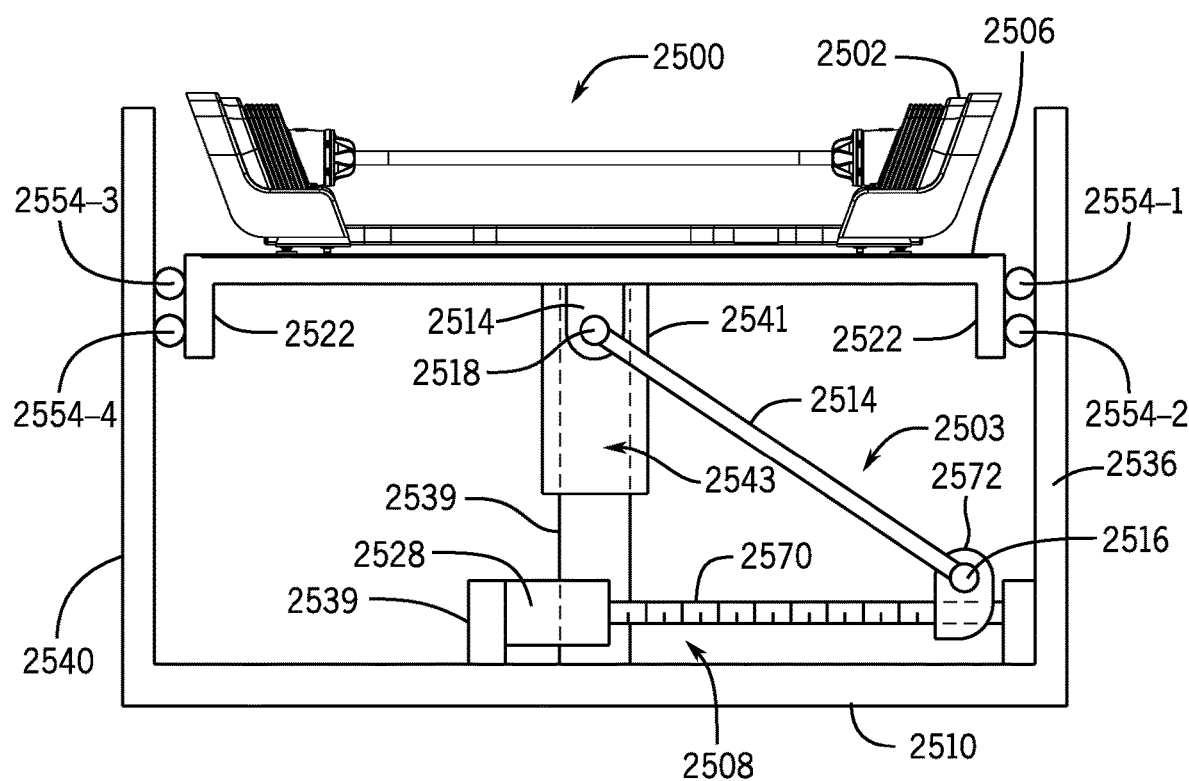
FIG. 31 is a schematic view of an embodiment of a weight elevation subsystem suitable for use with the free-weight exercise system of FIG. 1A.

With reference to FIG. 31, an embodiment of a weight elevation subsystem 2500 suitable for use with the free-weight exercise system of FIG. 1A is disclosed. The weight elevation subsystem 2500 includes a frame 2510. The frame 2510 may have one or more supports 2536, 2539, and/or 2540 that extend upwardly from the frame 2510. The support 2539 may be disposed between the supports 2536 and 2540. The weight elevation subsystem 2500 includes a platform 2506 suitable to support one or more exercise weights 2502 as previously described. The platform 2506 may include a longitudinal member, such as to stiffen the platform. The platform 2506 may include one or connector elements 2522 extending therefrom, e.g., extending below the platform 2506. The connector elements 2522 may be disposed at respective end portions of the platform 2506. One or more guide elements 2554-1, 2554-2, 2554-3, 2554-4 may be disposed between connector elements 2522 and the respective supports 2536 and 2540. The guide elements 2554 may enable the platform 2506 to glide, roll, or otherwise move relative to the supports 2536 and 2540 while the supports stabilize and/or support the platform 2506. One or more bosses 2541 may extend below the platform 2506. The boss 2541 may include a receptacle 2543 formed therein. A boss 2541 may be coupled to or formed with, and extend below, the platform 2506. The boss 2541 may be received in the receptacle 2543. The support 2539 may be selectively received in the receptacle 2543.

The platform 2506 may be movable between the retracted and deployed configurations by a lift assembly 2503. The lift assembly 2503 may be formed by a link 2514, the boss 2541, and a portion of a lift mechanism 2508. The lift mechanism 2508 includes a rotary actuator 2528 that rotates a linear actuator 2570. The linear actuator 2570 is threadedly coupled to a movable element 2572. The rotary actuator 2528 is coupled to the support 2539 at one end portion and to one of the supports 2536 or 2540 at the other end portion. The movable element 2572 is pivotally coupled to the lift assembly 2503 via a joint 2516 between the movable element 2572 and the link 2514. The joint 2516 may be disposed at a first end portion of the link 2514. A guide element 2555 may be disposed at a second end portion of the link opposite the first end portion. The boss 2541 may be pivotally coupled to the link 2514 at a joint 2518.

As the rotary actuator 2528 rotates the linear actuator 2570, the movable element 2572 may induce a force on the joint 2516 and thus on the link 2514 to cause the lift assembly 2503 to move between the retracted and deployed positions. The force may be transmitted by the link 2514 to the boss 2541 and to the platform 2506. An advantage of the lift assembly 2503 may be smooth movement of the platform 2506 between the retracted and deployed configurations. Another benefit may be the ability to tune the reach of the platform 2506 between the retracted and deployed positions. The link 2514 may provide a leverage to raise the platform, thereby enabling the use of a smaller, lighter, or less expensive lift mechanism.

FIGS. 32-39 shows a display subsystem 2600 for a coaching platform according to the present disclosure. The display subsystem 2600 includes a display 202 movably supported by a mast 2606 extending upward from the frame of a weight elevation subsystem, such as the base frame 410 or 510. The display subsystem includes a display mount 2700 movably coupling the display 202 to the mast 2606, for example to a cross beam 2608 extending between upward beams 2606-1 and 2606-2 of the mast 2606. In the present example, the display mount 2700 pivotally couples the display 202 to the mast 2606, by having a portion of the display mount 2700 being selectively rotatably received in a receptacle 2610 of the mast (e.g., in a receptacle formed in the cross beam 2608).

With reference to FIG. 33, the display mount 2700 includes a mounting bracket 2704. A shaft 2702 is fixed to extend from the mounting bracket 2704. In some embodiments, the mounting bracket 2704 may be a plate. The mounting bracket 2704 is configured to be rigidly coupled to the rear side of the display 202, e.g., via one or more fasteners 2706, such that the shaft 2702 extends away from the rear side of the display. When the display is then coupled to the frame of the exercise system, the shaft 2702 is coupled to the mast 2606 to support the weight of the display 202. In many embodiments, the shaft 2702 is pivotally joined to the mast 2606 such as to enable the display 202 to be moved (e.g., rotated between landscape and portrait orientations). The shaft 2702 may be rotatably received in the receptacle 2610, which is rigidly coupled to (e.g., fixed or integrally formed with) the cross beam 2608. The receptacle 2610 may include a bearing, bushing, or other suitable structure to allow relative movement (e.g., rotational and/or translational movement) of the shaft 2702 and the receptacle 2610.

One or more bumpers 2708-1 and 2708-2 may be operatively positioned (e.g., coupled to the mounting bracket 2704 or to the mast, more specifically cross beam 2608) to limit the rotational movement of the display 202 relative to the mast 2606 as will be further described. In some embodiments, the bumpers 2708-1, 2708-2 may include resilient element(s) (e.g., an elastomeric member or coating) to dampen or soften impacts when the display 202 is rotated between different (e.g., portrait and landscape) orientations.

Figure 35:
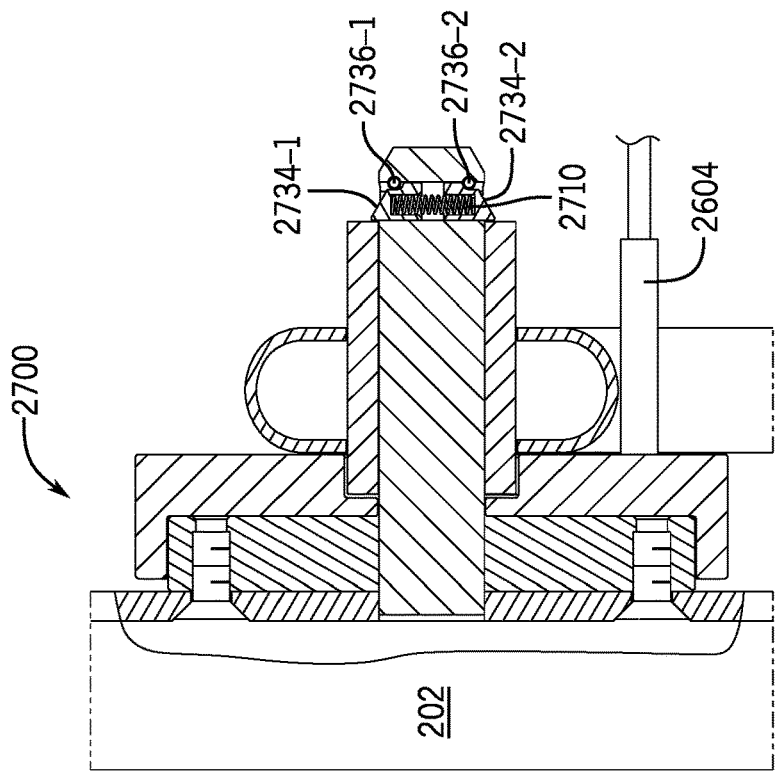
FIG. 35 is a simplified section view of a portion of the display subsystem of FIG. 32 in a second configuration.
Figure 34:
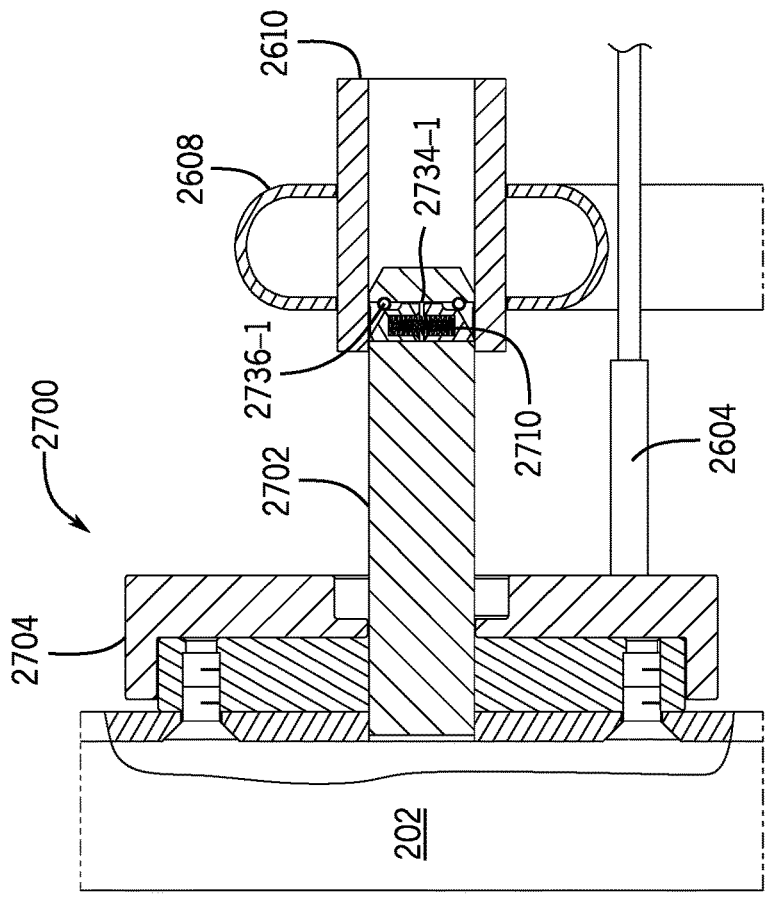
FIG. 34 is a simplified section view of a portion of the display subsystem of FIG. 32 in a first configuration.
Figure 36:
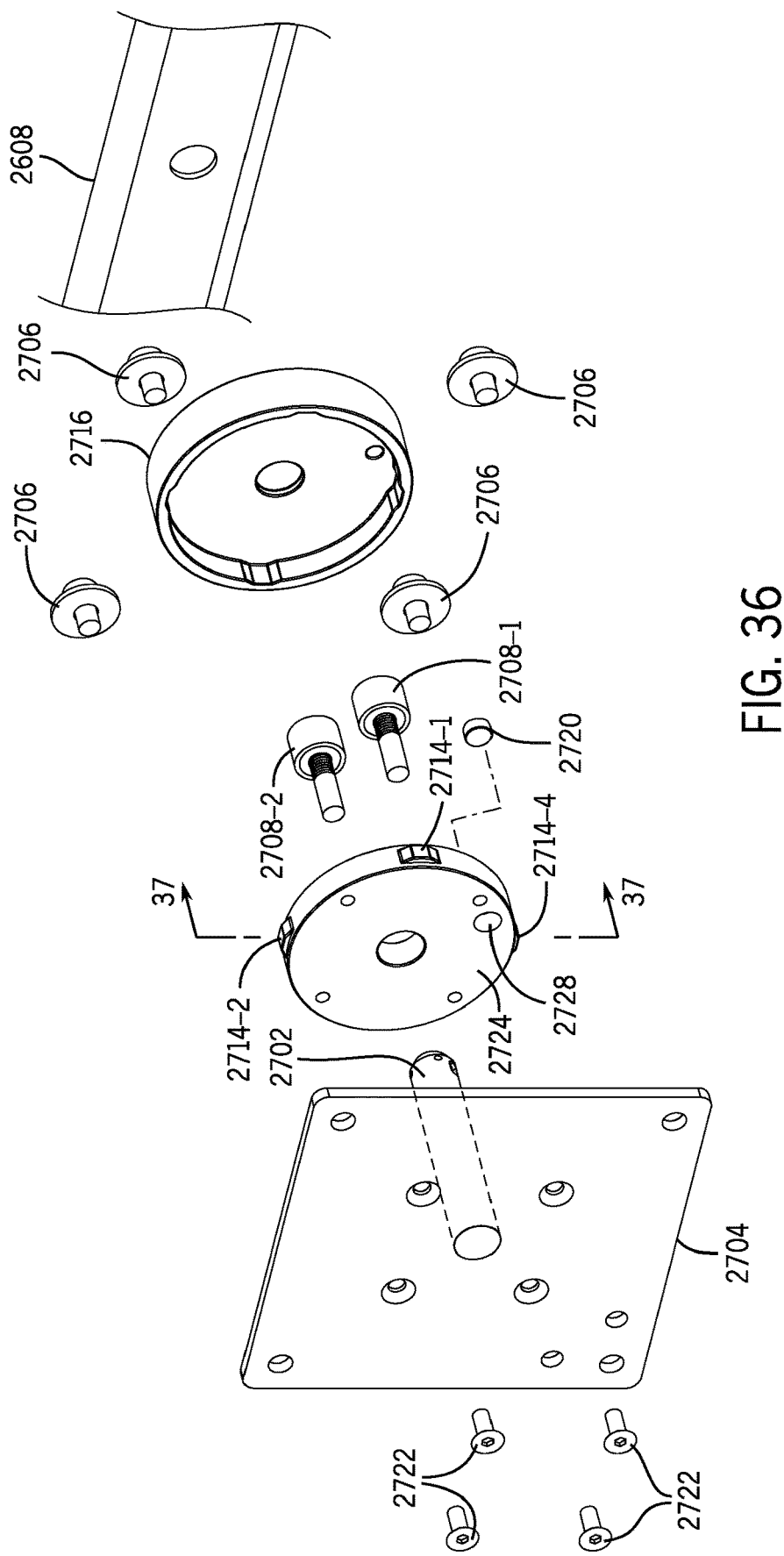
FIG. 36 is a simplified exploded isometric view of a portion of the display subsystem of FIG. 32.
Figure 37:
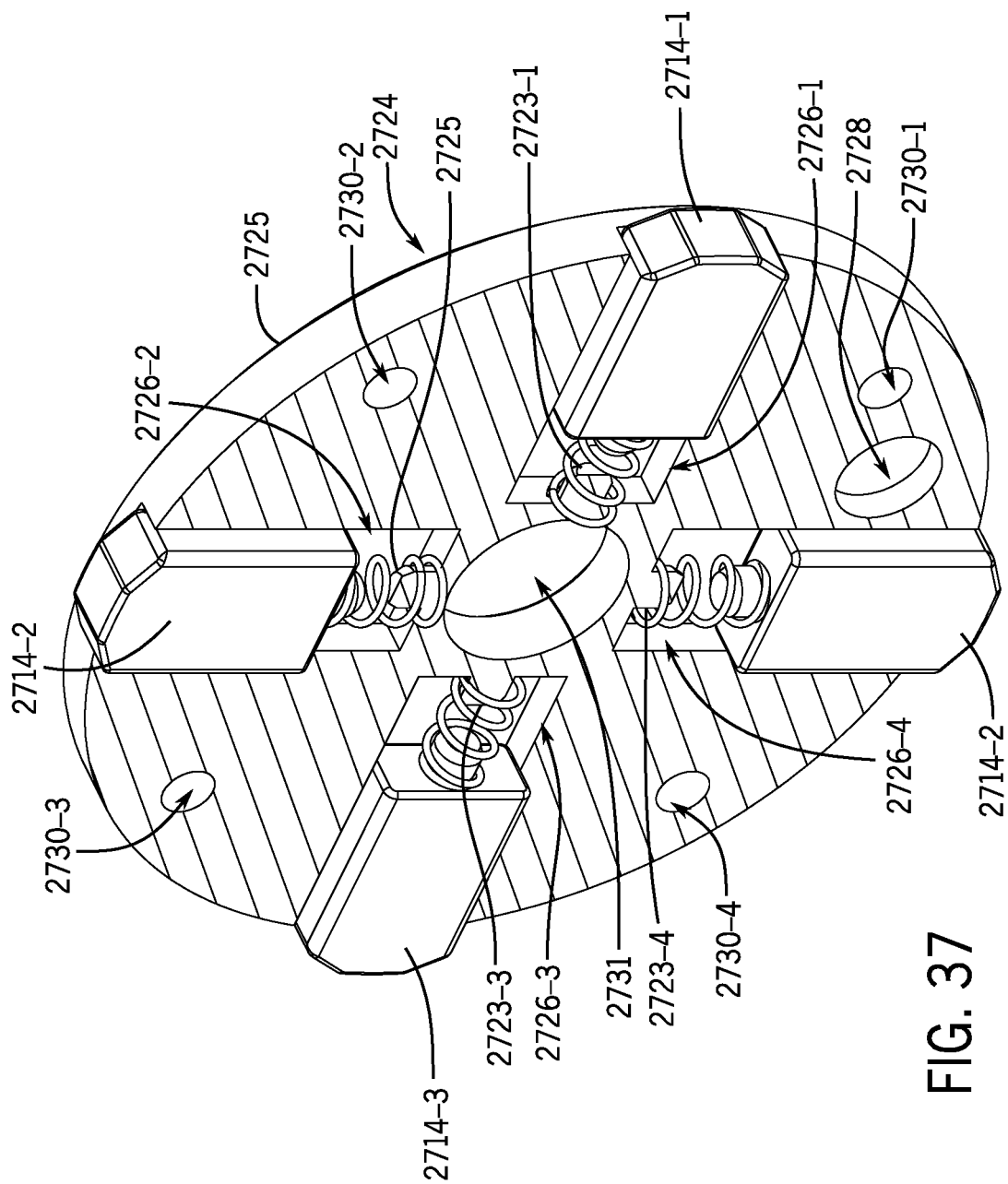
FIG. 37 is an isometric section view of a retainer plate of the display subsystem of FIG. 32 taken along line 37-37 of FIG. 36.

FIGS. 34 and 35 show two stages of assembly of the display mount 2700 to the mast 2606, specifically the cross beam 2608. FIG. 34 shows the shaft 2702 as it is being inserted into the receptacle 2610 and FIG. 35 shows the shaft 2702 fully inserted in the receptacle 2610 with the free-end of shaft secured to the end of the receptacle 2610 opposite the display 202. One or more pawls 2734-1, 2734-2 may be slidably coupled to the free end of the shaft 2702, which is distal from the end of the shaft fixed to the mounting bracket 2704. The pawls 2734-1, 2734-2 may be biased outward from the shaft 2702 by one or more biasing elements 2710, such as one or more coil springs or other suitable biasing elements. The pawls 2734-1, 2734-2 may be retained to the shaft 2702 by respective fasteners 2736-1, 2736-2. In many implementations, the one or more fasteners 2736-1, 2736-2 may be pins, roll pins, cotter pins, screws, rivets, bolts, or the like.

The pawls 2734-1, 2734-2 may have respective tapered faces such that when the pawls 2734-1, 2734-2 are introduced to the inner surface of the receptacle, the sliding motion of the shaft 2702 into the receptacle induces a contracting force of the pawls 2734-1, 2734-2 toward the shaft 2702, such as the middle of the shaft 2702. The contracting force may overcome the outward force of the biasing element 2710 such that the pawls 2734-1, 2734-2 contract toward one another. The shaft 2702 may thus be inserted into the receptacle 2610. When the pawls 2734-1, 2734-2 reach a far end portion of the receptacle 2610 from the display mount 2700, the pawls 2734-1, 2734-2 may clear the receptacle 2610 and the biasing element 2710 may cause the pawls 2734-1, 2734-2 to move away from one another into a locked position. In the locked position, the pawls 2734-1, 2734-2 may extend outward beyond the inner surface of the receptacle such that the display mount 2700 may be secured to the frame 204. The display mount 2700 may be removed by pressing the pawls 2734-1, 2734-2 toward one another against the force of the biasing element 2710 and the mounting procedure may be reversed. For example, a user may press the pawls 2734-1, 2734-2 toward one another with their fingers and slide the shaft 2702 out of the receptacle 2610. This configuration of the display mount 2700 may enable mounting of the display 202 to the mast of the free-weight exercise system by a single user. For example, a user may attach (e.g., fasten) the mounting bracket 2704 to the display 202 and slide the shaft 2702 into the receptacle 2610 until the pawls 2734-1, 2734-2 click into the locked position.

With reference to FIGS. 36-39, features of the display mount 2700 that enable the display mount to rotate relative to the mast 2606 are disclosed. The display mount 2700 includes a ring 2716. In some embodiments, the ring 2716 is coupled to the retainer plate 2724 to form part of the display mount 2700. The shaft 2702 may protrude through the rear side of the ring 2716 and/or the retainer plate 2724. In some embodiments, the ring 2716 may be coupled to the mast 2606 such as at the cross beam 2608. The ring 2716 includes one or more detents 2718 formed on an inner surface thereof. For example, the ring 2716 may include four detents 2718-1, 2718-2, 2718-3, and 2718-4. The one or more detents 2718 may have tapered edges such as to facilitate the receipt and/or release of one or more corresponding cams 2714.

The display mount 2700 may include one or more cams 2714 that are selectively received in the respective one or more detents 2718. For example, the display mount 2700 may include four cams 2714-1, 2714-2, 2714-3, and 2714-4. The cams 2714 may include tapered faces suitable to be received in respective detents 2718. The cams 2714 may be received in a retainer plate 2724. The retainer plate 2724 may include a plate body 2725. One or more slots 2726 may be formed in the plate body 2725. For example, the plate body 2725 may include four slots 2726-1, 2726-2, 2726-3, and 2726-4 that correspond to respective cams 2714. More or fewer cams, detents, and/or slots may be used as desired.

The slots 2726 may include respective protrusions 2723 therein suitable to retain respective biasing elements 2712. The biasing elements 2712 may be suitable to bias the respective cams 2714 outward toward the ring 2716. For example, the biasing elements 2712 may be springs or the like. One end portion of a biasing element 2712 may be received on a respective protrusion 2723 and an opposite end portion of the respective biasing element 2712 may be received on a protrusion formed with a respective cam 2714. In other embodiments, the plate body 2725 and/or the cams 2714 may include apertures or recesses therein suitable to receive the biasing elements 2712, rather than protrusions 2723.

The plate body 2725 may include one or more apertures 2730, such as the apertures 2730-1, 2730-2, 2730-3, 2730-4 formed therethrough and suitable to receive respective fasteners 2722 to fasten the mounting bracket 2704 to the plate body 2725. The fasteners 2722 may be any suitable fastener such as screws, pins, bolts, rivets, or the like. The plate body 2725 may have an aperture 2728 formed therein and suitable to receive a magnet 2720. The plate body 2725 may have a central aperture 2731 formed therein and suitable to receive the shaft 2702.

Figure 39:
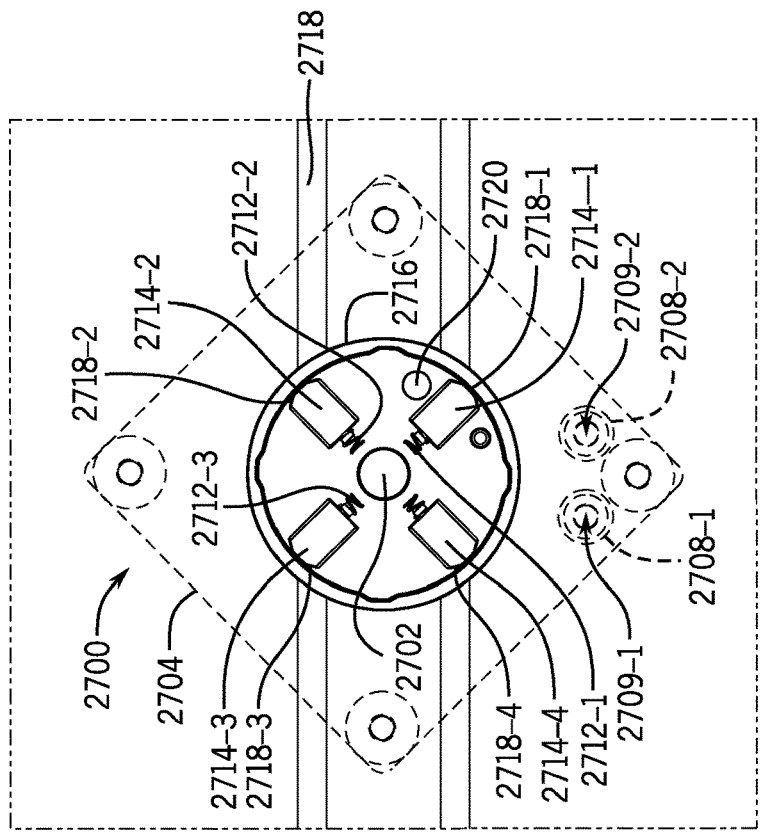
FIG. 39 is a simplified rear elevation view of a portion of the display subsystem of FIG. 32 in a second configuration.
Figure 38:
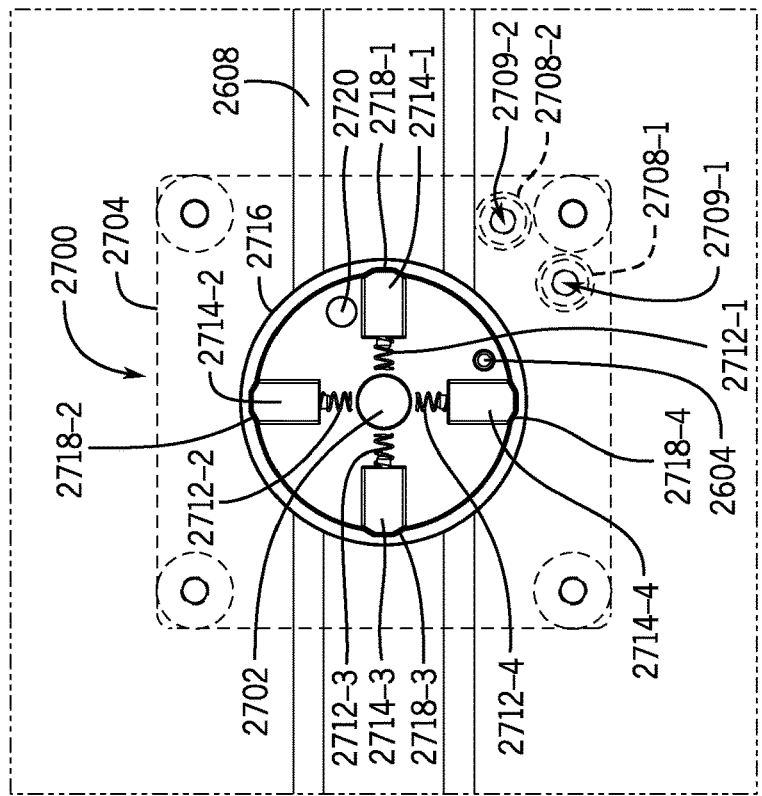
FIG. 38 is a simplified rear elevation view of a portion of the display subsystem of FIG. 32 in a first configuration.
Figure 40:
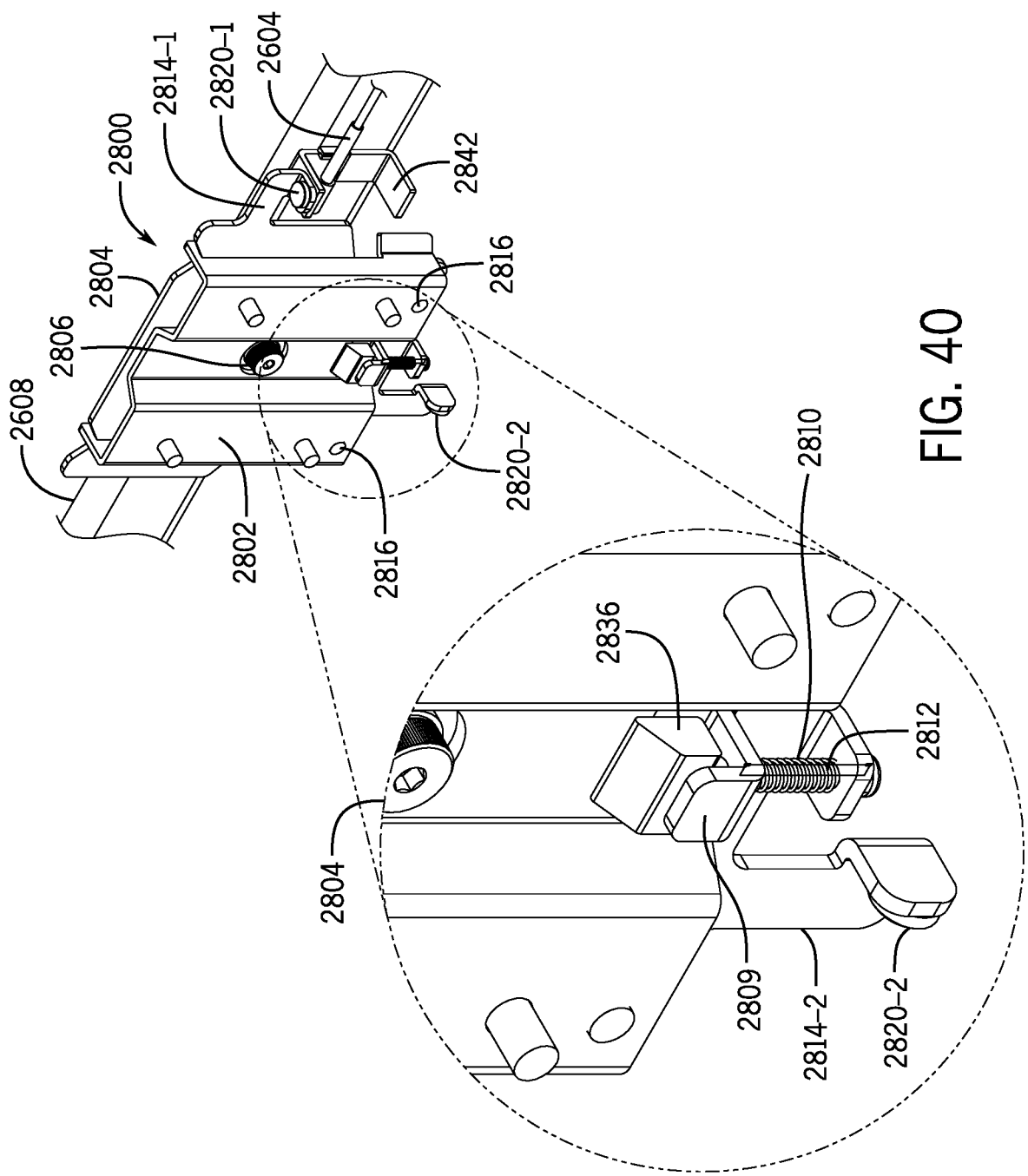
FIG. 40 is an isometric view of an embodiment of a display subsystem suitable for use with the free-weight exercise system of FIG. 1A.
Figure 41:
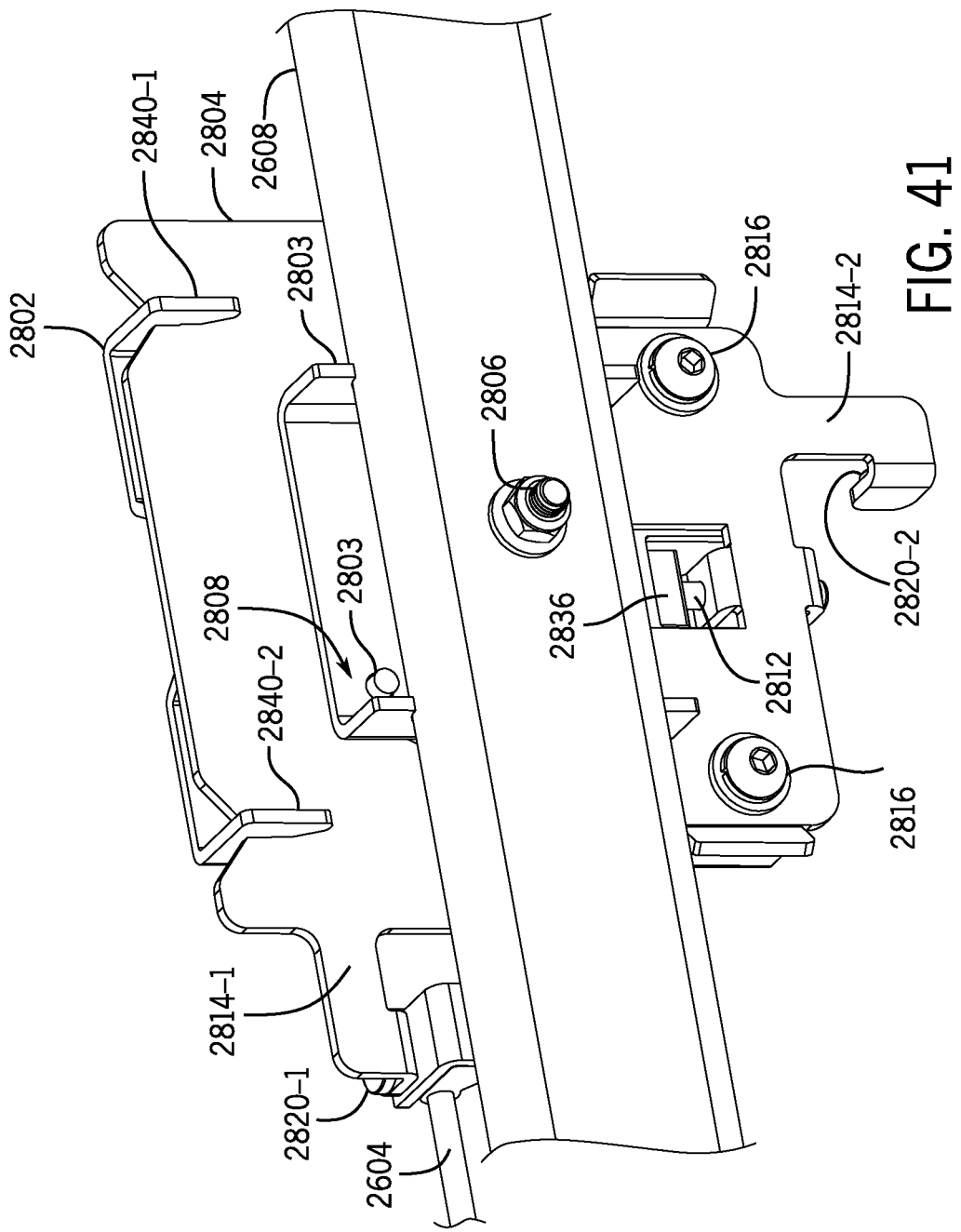
FIG. 41 is a rear isometric view the display subsystem of FIG. 40.
Figure 42:
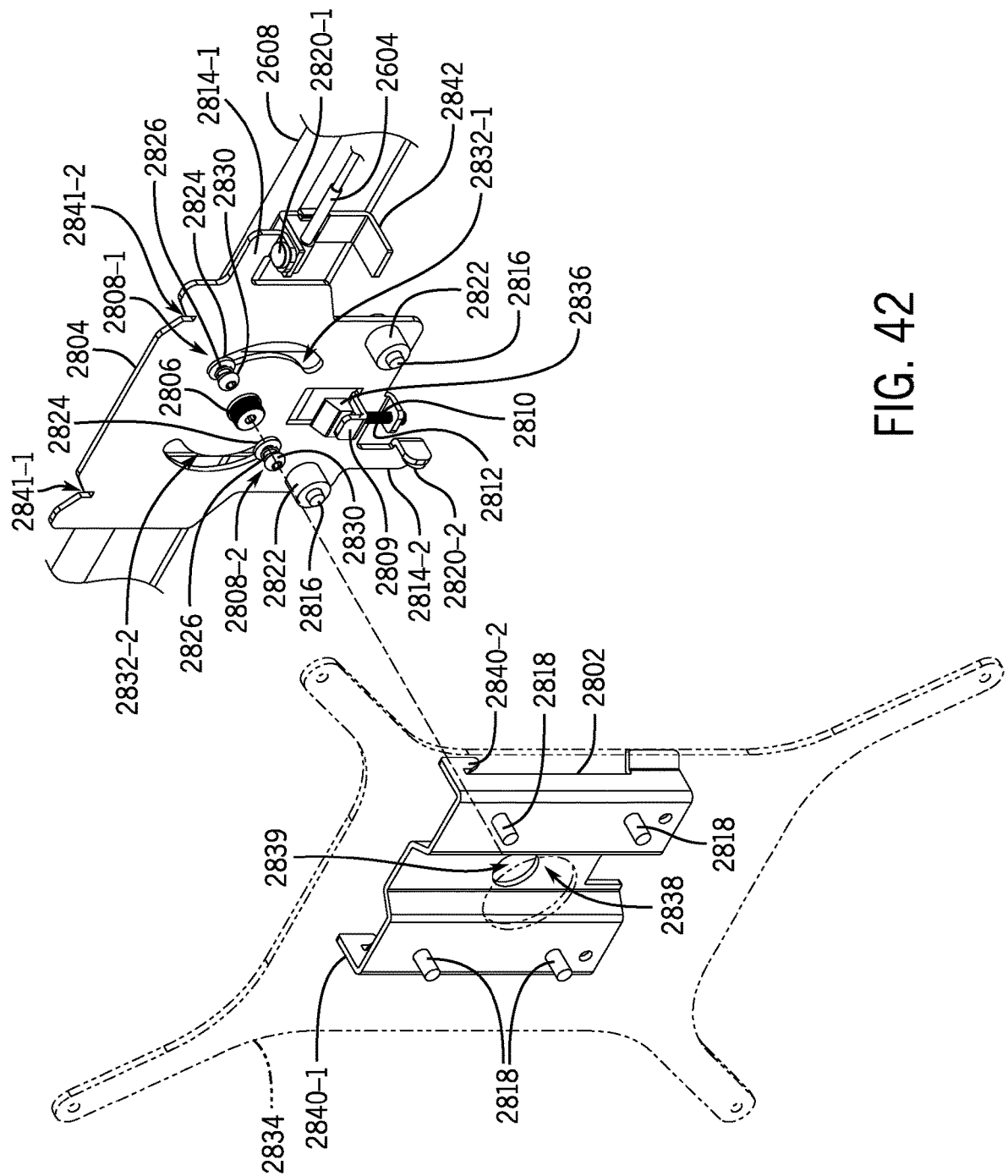
FIG. 42 is a simplified exploded isometric view of a portion of the display subsystem of FIG. 40.

In the assembled display mount 2700, as shown for example in FIGS. 38 and 39, the respective one or more biasing elements 2712 and cams 2714 may be received in the respective slots 2726 formed in the plate body 2725. The magnet 2720 may be received in the aperture 2728 formed in the plate body 2725. The retainer plate 2724 may be received in the ring 2716. The plate body 2725 may be coupled to the mounting bracket 2704 via the fasteners 2722. The mounting bracket 2704 may be coupled to the display 202 via the one or more fasteners 2706. When the display 202 is in one of the portrait or landscape orientations, the respective cams 2714-1, 2714-2, 2714-3, and 2714-4, may be received in respective detents 2718-1, 2718-2, 2718-3, and 2718-4. The tapered faces of the cams 2714 may interact with the tapered faces of the detents 2718 to bias the display 202 to one of the portrait or landscape orientations. For example, the biasing elements 2712 may bias the cams 2714 into the detents 2718 such that the display 202 preferentially settles into one of the portrait or landscape orientations. An advantage of such biasing may be that the display 202 "snaps" into place into one of the portrait or landscape orientations. As the display 202 is rotated out of the portrait or landscape orientations (shown for example in FIG. 39), the tapered faces of the cams 2714 and detents 2718 may cooperate to overcome the outward bias of the biasing elements 2712 on the cams 2714 such that the cams disengage the respective detents and retract toward the shaft 2702 and the faces of the cams slide along the inner face of the ring 2716.

One of the bumpers may be in contact with the cross beam 2608. For example, in one of the portrait or landscape orientations, the bumper 2708-2 may be in contact with the cross beam 2608 and in the other of the portrait or landscape orientation, the bumper 2708-1 may be in contact with the cross beam 2608, thereby limiting the rotational movement of the display mount 2700.

As shown for example in FIGS. 33-35, the display subsystem 2600 may include a sensor 2604 suitable to detect a position of the display 202 relative to the mast 2606. The sensor 2604 may be a reed switch, such as a magnetic reed switch including electrical contacts that close in proximity to a magnetic field, such as generated by a magnet 2720. In other examples, the sensor 2604 may be a proximity sensor, a light sensor, a switch that interacts with a protrusion, detent, or similar feature of the display mount 2700 to detect a position of the display 202, or other suitable sensor. For example, the sensor 2604 may detect whether the display 202 is in a landscape or portrait orientation, and/or whether the display is in a position between the landscape and portrait orientations.

The magnet 2720 may be disposed proximate or distal to the sensor 2604 when the display 202 is in one of the portrait or landscape positions. Thus the sensor 2604 may detect the position of the display 202. For example, as shown in FIG. 38, the magnet 2720 may be disposed distal to the sensor 2604, which may indicate to a processing element 4702 that the display is in a portrait or landscape orientation, or between those orientations. For example, see FIG. 39 where the display is between the portrait and landscape orientations and the magnet 2720, while closer to the sensor may not be close enough to activate the sensor 2640. In some embodiments, two or more sensors may be used such that a processing element 4702 may detect whether the display 202 is in the portrait mode, the landscape mode, or therebetween.

With reference to FIGS. 40-46, a display mount 2800 is disclosed Like the display mount 2700, the display mount 2800 is suitable for use with any coaching platform disclosed herein. The display mount 2800 is suitable to support a display 202. The display mount 2800 may enable the display 202 to be moved (e.g., rotated between landscape and portrait orientations). For example, the display mount 2800 may couple to a pivot 2806, where a portion of the pivot is fixedly attached to the cross beam 2608. One or more portions of the display mount 2800 may pivot relative to the cross beam 2608 at the pivot 2806. The pivot 2806 may include a bushing, bearing, or other suitable rotational structure to facilitate the rotation of the display 202. The display mount 2800 is similarly adapted to enable a single user to mount the display 202 to the mast 2606, more specifically to the cross beam 2608.

In one embodiment, the display mount 2800 includes a display plate 2802, a bracket 2803, and a frame plate 2804. The frame plate 2804 may be rotatably coupled to the mast 2606, such as at the cross beam, 2608. For example, the frame plate 2804 may be rotatably coupled to the cross beam 2608. The display plate 2802 is adapted to fixedly fasten to the display 202 (either directly, or via a display bracket 2834) such as with one or more suitable fasteners 2818. The fasteners 2818 may be received directly in the display 202 or may be received in and fasten the display plate 2802 to the display bracket 2834 (see, e.g., FIG. 42) which is coupled to the display 202. The display bracket 2834 may have an aperture 2838 formed therein and adapted to provide a clearance between the display bracket 2834 and the pivot 2806. The display plate 2802 may include one or more hooks 2840 formed therein, or fixedly attached thereto. For example, the display plate 2802 may include hooks 2840-1 and 2840-2 formed in an upper portion thereof. The display plate 2802 may include a central aperture 2839 formed therein which may provide a clearance of the display plate 2802 with the pivot 2806.

The bracket 2803 may couple the frame plate 2804 to a portion of the mast 2606, such as the cross beam 2608. The bracket 2803 may be formed with the cross beam 2608, or may be fixed thereto. For example, the bracket 2803 may be fixedly joined with the cross beam 2608 such as by welding, soldering, brazing or the like. In some examples, the bracket 2803 may be removably coupled to the cross beam 2608 by the pivot 2806.

The frame plate 2804 may include one or more slots 2841 formed in an upper portion thereof. For example, the frame plate 2804 may include slots 2841-1 and 2842-2 formed in an upper portion thereof.

The frame plate 2804 includes a latch 2809 suitable to secure the display plate 2802 to the frame plate 2804, and thus the display 202 to the free-weight exercise system. The latch 2809 includes a pawl 2836. The pawl may be received on a shaft 2812. The pawl 2836 may be biased upward by a biasing element 2810 such as a spring received on the shaft 2812. The shaft 2812 may be removably coupled to the frame plate 2804 by a fastener such as the nut 2813. The pawl 2836 may have a tapered upper face to facilitate the assembly of the display plate 2802 with the frame plate 2804.

Figure 44:
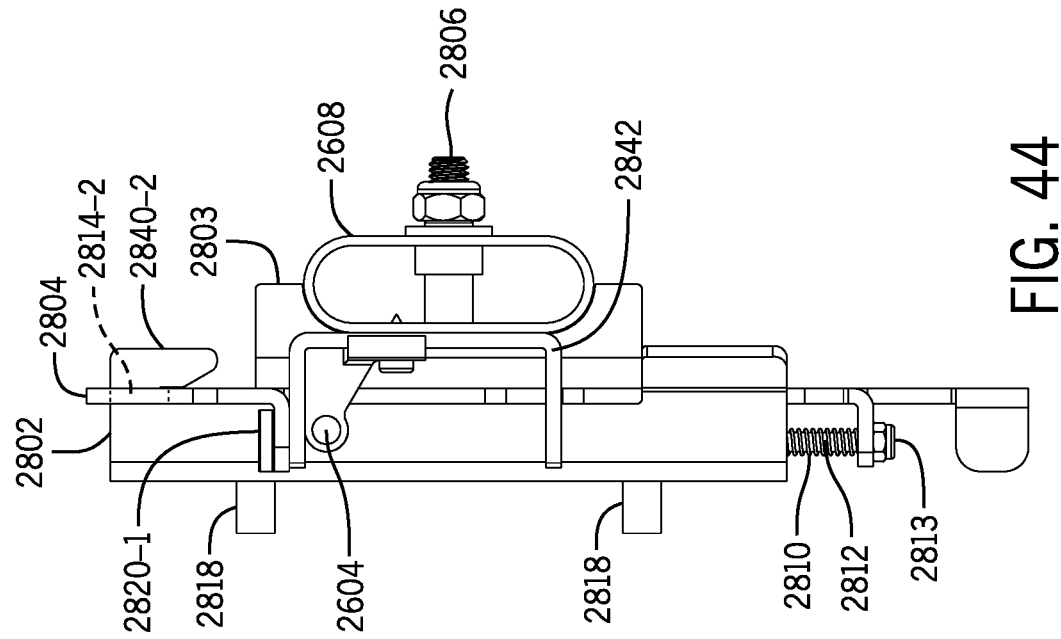
FIG. 44 is a simplified section view of a portion of the display subsystem of FIG. 40 in a second configuration.
Figure 43:
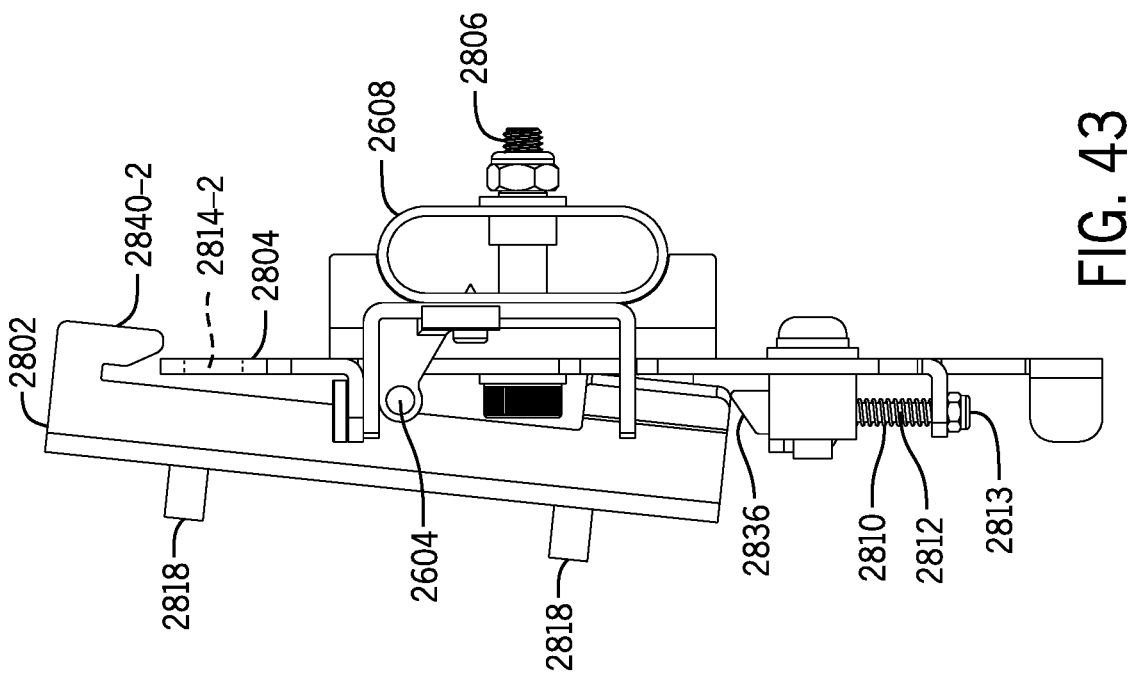
FIG. 43 is a simplified section view of a portion of the display subsystem of FIG. 40 in a first configuration.

With reference to FIGS. 43 and 44, an assembly method of coupling the display plate 2802 (and the display 202) to the frame plate 2804. The display plate 2802 may be tilted with an upper portion thereof above and behind the upper portion of the frame plate 2804. A lower portion of the display plate 2802 maybe disposed above the tapered face of the pawl 2836 (see, e.g., FIG. 43). The display plate 2802 may be lowered onto the frame plate 2804 such that the respective hooks 2840-1 and 2840-2 in the display plate 2802 may engage the respective slots 2841-1 and 2842-2 in the frame plate 2804. The lower portion of the display plate 2802 may be move toward the frame plate 2804, such as by pivoting the display plate about the interface between the hooks 2840 and the slots 2841. The lower portion of the display plate 2802 may push the pawl 2836 downward by overcoming the bias of the biasing element 2810. When the lower portion of the display plate 2802 is moved sufficiently past the tapered face of the pawl 2836, the pawl 2836 may move up (such as by the bias of the biasing element 2810)

to engage the lower portion of the display plate 2802. The display plate 2802 may rest against the bumpers 2822. The fasteners 2816 may be received in respective apertures formed in the display plate 2802. The frame plate 2804 may include, or have coupled thereto, one or more bumpers 2822. The bumpers 2822 may be secured to the frame plate 2804 by respective fasteners 2816. The bumpers 2822 may dampen movements between the display plate 2802 and the frame plate 2804. Thus, the display 202 may be installed with the free-weight exercise system by a single user.

Figure 46:
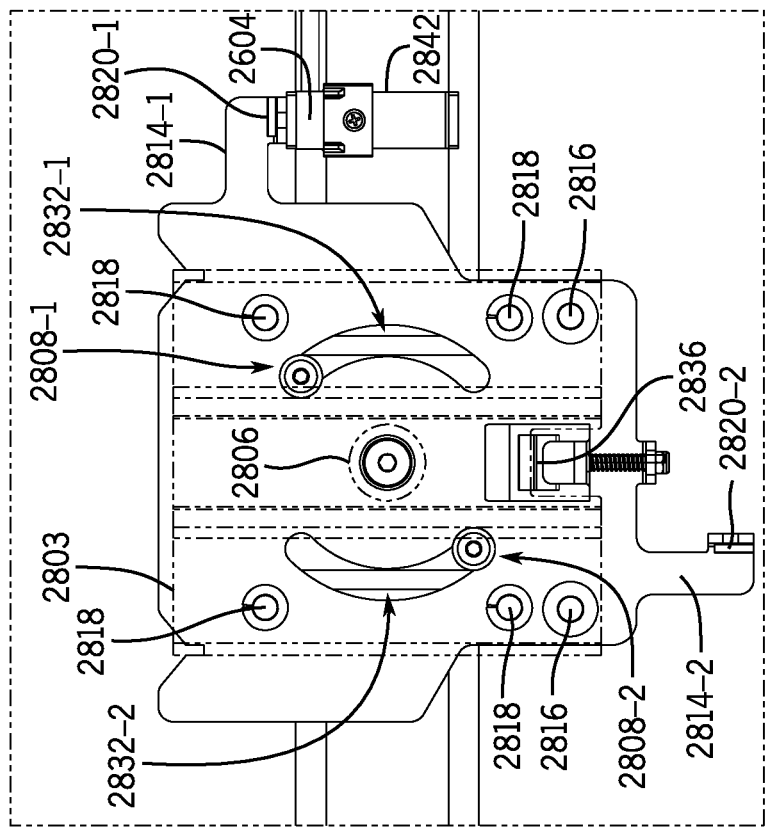
FIG. 46 is a simplified rear elevation view of a portion of the display subsystem of FIG. 40 in a second configuration.
Figure 45:
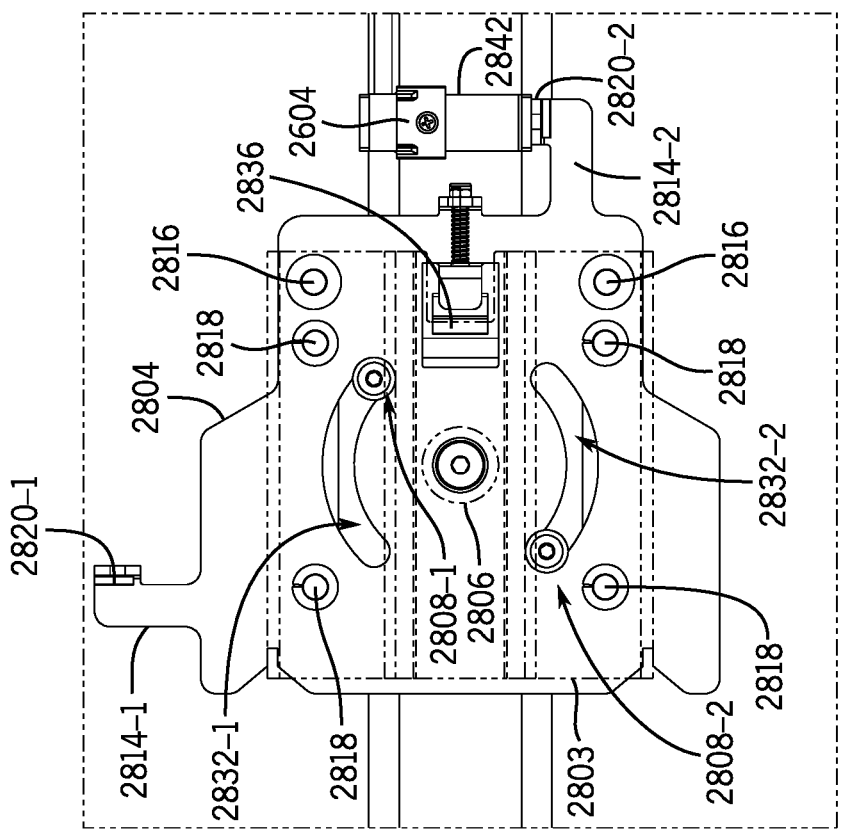
FIG. 45 is a simplified rear elevation view of a portion of the display subsystem of FIG. 40 in a first configuration.

As shown in FIGS. 45 and 46, the display mount may be moved between rotational positions. For example, FIG. 45 shows the display mount 2800 with the display plate 2804 in a first position and FIG. 46 shows the display mount 2800 with the display plate 2804 in a second position. Either of the positions in FIGS. 45 and 46 may be associated with a landscape or portrait orientation of the display 202. The frame plate 2804 may include one or more slots 2832. For example, the frame plate 2804 includes two slots 2832-1 and 2832-2. The slots 2832-1 and 2832-2 form respective arcuate tracks suitable to enable the rotational movement of the display 202 relative to the mast 2606 (e.g., between the positions shown in FIGS. 45 and 46). The friction adjusters 2808-1 and 2808-2 may be received in the respective slots 2832-1 and 2832-2. The friction adjusters 2808 may be suitable to adjust the level of force that will cause the display 202 to rotate about the pivot 2806. For example, a friction adjuster 2808 may include a fastener 2830 received in the slot 2832 and coupled (e.g., threadedly coupled to an aperture) to the bracket 2803. A friction member 2824 may be received on a shaft of the fastener 2830. The friction member 2824 may have a dimension (e.g., diameter) greater than a dimension (e.g., width) of the slot 2832, such that the friction member rides on a face of the frame plate 2804. The friction member 2824 may be a washer formed of any suitable material such as steel, brass, bronze, aluminum, plastic, an elastomer, or a suitable frictional coating disposed on any such material. The friction member 2824 may be biased toward the frame plate 2804 by a suitable biasing element 2826 such as a spring received on the shaft of the fastener 2830. The friction force between the frame plate 2804 and the friction member 2824 may be adjusted by increasing or decreasing the insertion of the fastener into the bracket 2803. For example, the friction force may be increased by increasing the normal force between the friction member 2824 and the frame plate 2804 by moving the fastener 2830 further into the bracket 2803 (e.g., by threading). Likewise, the friction force may be decreased by decreasing the normal force between the friction member 2824 and the frame plate 2804 by moving the fastener further away from the bracket 2803. Being able to adjust the friction via the one or more friction adjusters 2808 may have the advantage of being able to tune the force to rotate the display 202. For example with a relatively larger display 202, more friction may be desired as a larger display has a larger moment arm about the pivot 2806 than a smaller display (e.g. due to larger dimension away from the pivot 2806 where a user grasps the display) that may make the display too easy to rotate. Likewise with a smaller display 202 with smaller dimensions, less friction may be desired to enable a user to more easily rotate the display.

Additionally or alternately, the one or more friction adjusters 2808 may serve to limit rotation of the display. For example, when the display 202 is in one of the portrait or landscape positions, the respective friction adjuster 2808-1 and 2802-2 may be disposed at respective end portions of the slots 2832-1 and 2832-2 as shown for example, in FIGS. 45 and 46.

The frame plate 2804 may include one or more arms 2814-1 and 2814-2 suitable to receive respective magnets 2820-1 and 2820-2. The respective magnets 2820 may be suitable to activate one or more sensors 2604 as discussed previously. The one or more sensors 2604 may be coupled to a sensor bracket 2842. One sensor 2604 is shown with the display mount 2800 but a second sensor 2604 may be mounted to the sensor bracket 2842, such as at a lower portion of the bracket 2842. A first or second sensor 2604 may be mounted elsewhere in the display mount 2700 as desired. As shown in for example in FIG. 45, the arm 2814-2 and the magnet 2820-2 may be disposed proximate to the sensor bracket 2842. When a sensor 2604 is coupled to the lower portion of the bracket 2842, the proximity of the magnet 2820-2 may activate the sensor 2604 and indicate to a processing element 4702 that the display 202 is in one of the portrait or landscape orientations. As shown for example in FIG. 46, the arm 2814-1 and magnet 2820-1 may be disposed proximate to the sensor 2604. The proximity of the magnet 2820-1 may activate the sensor 2604 and indicate to a processing element 4702 that the display 202 is in the other of the portrait or landscape orientations with respect to FIG. 45.

With either of the display mounts 2700 or 2800, the display 202 may be movable between the portrait and landscape positions manually by a user moving the display 202. In some embodiments, the display 202 may be coupled to an appropriate actuator such as a motor operative to rotate the display between orientations. Being able to rotate the display 202 has many advantages. For example, when the free-weight exercise system is not in use, it may be more aesthetically pleasing to place the display in the portrait orientation. Additionally, some exercise media may be formatted or more amenable to display when the display 202 is in the portrait or landscape orientation. For example, when an exercise medium shows a full body image of an exercise in a standing position, the portrait orientation may be beneficial. Likewise when an exercise routine shows an exercise where a user is prone, the landscape position may be preferred. Additionally, entertainment media such as movies, video games, or the like may be formatted for display in the landscape orientation and the display 202 may be placed in such an orientation.

Figure 47:
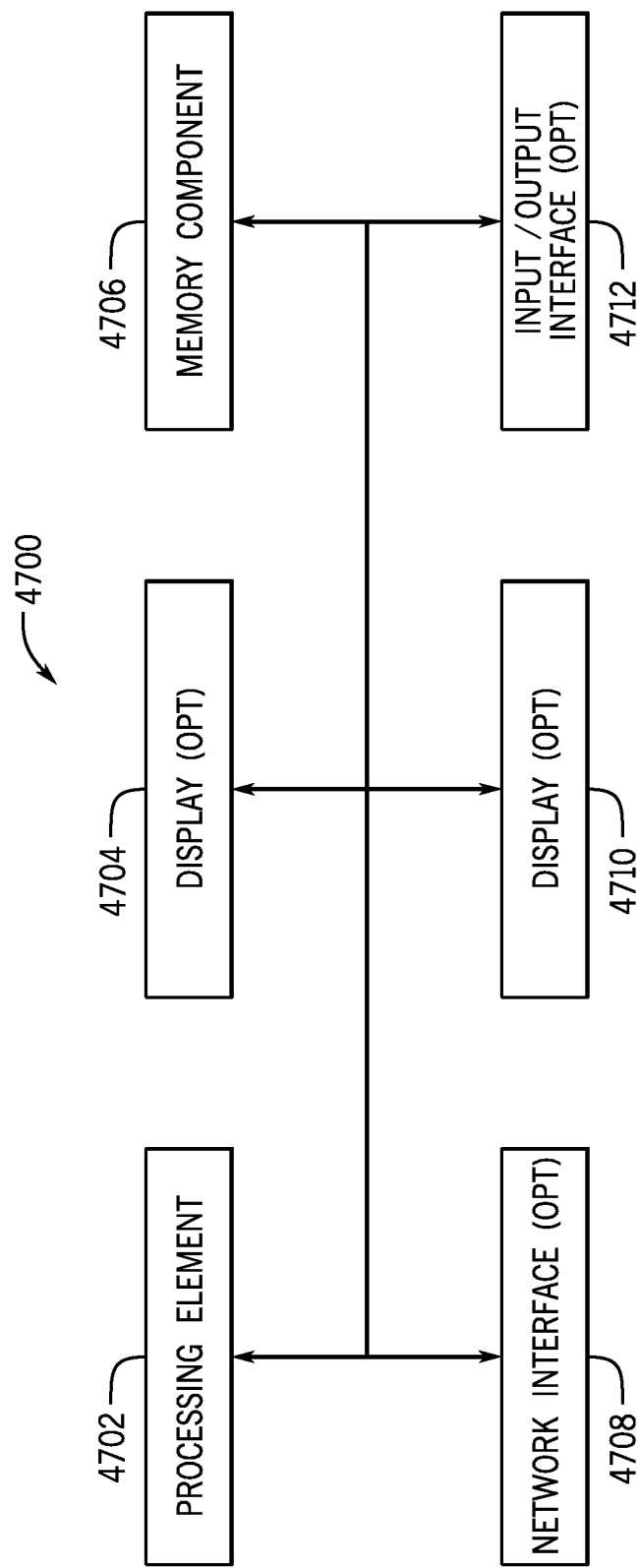
FIG. 47 is a simplified schematic view of a control system 4700 suitable to control any free-weight exercise system disclosed herein.

FIG. 47 illustrates a simplified block diagram for a control system 4700 for any of the free-weight exercise systems herein. As shown, the control system 4700 may include one or more processing elements 4702, an optional display 4704, one or more memory components 4706, a network interface 4708, optional power supply 4710, and an optional input/output (I/O) interface 4712, where the various components may be in direct or indirect communication with one another, such as via one or more system buses, contract traces, wiring, or via wireless mechanisms.

The one or more processing elements 4702 may be substantially any electronic device capable of processing, receiving, and/or transmitting instructions. For example, the processing elements 4702 may be a microprocessor, microcomputer, graphics processing unit, or the like. It also should be noted that the processing elements 4702 may include one or more processing elements or modules that may or may not be in communication with one another. For example, a first processing element 4702 may control a first set of components of the free-weight exercise system and a second processing element 4702 may control a second set of components of the free-weight exercise system where the first and second processing elements 4702 may or may not be in communication with each other. Relatedly, the processing elements 4702 may be configured to execute one or more instructions in parallel locally, and/or across a network, such as through cloud computing resources.

The display 4704 of the control system 4700 is optional and provides an input/output mechanism for devices of the free-weight exercise system 100, such as to display visual information (e.g., images, graphical user interfaces, videos, notifications, and the like) to a user, and in certain instances may also act to receive user input (e.g., via a touch screen or the like). In some embodiments, the display 4704 may be the same as the display 24 or the display 202. In some embodiments, the display 4704 may be a different display than the displays 24 or 202. Any display disclosed herein may be an LCD screen, plasma screen, LED screen, an organic LED screen, or the like. The type and number of displays may vary.

The memory components 4706 store electronic data that may be utilized by the processing element(s) 4702, such as audio files, video files, workout media, document files, programming instructions, and the like. The memory components 4706 may be, for example, non-volatile storage, a magnetic storage medium, optical storage medium, magneto-optical storage medium, read only memory, random access memory, erasable programmable memory, flash memory, or a combination of one or more types of memory components.

The optional network interface 4708 receives and transmits data to and from a network to the free-weight exercise system 100. The network/communication interface 4708 may transmit and send data to the network directly or indirectly. For example, the networking/communication interface 4708 may transmit data to and from other computing devices through the network. In some embodiments, the network interface 4708 may also include various modules, such as an application program interface (API) that interfaces and translates requests across the network to a specific server or remote computing device such as a phone, tablet, or the like. The network interface 4708 may be a wider or wireless interface. For example, the network interface 4708 may be an Ethernet, Wi-Fi, Bluetooth, Wi-max, Zigbee, or other suitable interface.

The free-weight exercise system 100 may also include a power supply 4710. The power supply 4710 provides power to various components of the control system 4700 and may supply power to a lift mechanism, switches, sensors, or the like. The power supply 4710 may include one or more rechargeable, disposable, or hardwire sources, e.g., batteries, power cord, AC/DC inverter, DC/DC converter, or the like. Additionally, the power supply 4710 may include one or more types of connectors or components that provide different types of power. In some embodiments, the power supply 4710 may include a connector (such as a universal serial bus) that provides power to another device such as a phone or tablet and also transmits data to and from the free-weight exercise system 100 to the other devices.

The input/output interface 4712 allows the free-weight exercise system 100 to receive input from a user and provide output to a user. For example, the input/output interface 4712 may include a capacitive touch screen, keyboard, mouse, stylus, or the like. The type of devices that interact via the input/output interface 4712 may be varied as desired.

The description of certain embodiments included herein is merely exemplary in nature and is in no way intended to limit the scope of the disclosure or its applications or uses.

In the included detailed description of embodiments of the present systems and methods, reference is made to the accompanying drawings which form a part hereof, and which are shown by way of illustration specific to embodiments in which the described systems and methods may be practiced. These embodiments are described in sufficient detail to enable those skilled in the art to practice presently disclosed systems and methods, and it is to be understood that other embodiments may be utilized, and that structural and logical changes may be made without departing from the spirit and scope of the disclosure. Moreover, for the purpose of clarity, detailed descriptions of certain features will not be discussed when they would be apparent to those with skill in the art so as not to obscure the description of embodiments of the disclosure. The included detailed description is therefore not to be taken in a limiting sense, and the scope of the disclosure is defined only by the appended claims.

From the foregoing it will be appreciated that, although specific embodiments of the invention have been described herein for purposes of illustration, various modifications may be made without deviating from the spirit and scope of the invention.

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show structural details of the invention in more detail than is necessary for the fundamental understanding of the invention, the description taken with the drawings and/or examples making apparent to those skilled in the art how the several forms of the invention may be embodied in practice.

As used herein and unless otherwise indicated, the terms "a" and "an" are taken to mean "one", "at least one" or "one or more". Unless otherwise required by context, singular terms used herein shall include pluralities and plural terms shall include the singular.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "above," and "below" and words of similar import, when used in this application, shall refer to this application as a whole and not to any particular portions of the application.

Of course, it is to be appreciated that any one of the examples, embodiments or processes described herein may be combined with one or more other examples, embodiments and/or processes or be separated and/or performed amongst separate devices or device portions in accordance with the present systems, devices and methods.

Finally, the above discussion is intended to be merely illustrative of the present system and should not be construed as limiting the appended claims to any particular embodiment or group of embodiments. Thus, while the present system has been described in particular detail with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims.

What is claimed is:

1. A free-weight exercise system comprising:
a storage compartment configured to enclose free-weight exercise equipment, wherein the storage compartment comprises a platform configured to support the free-weight exercise equipment;
a lift assembly configured to raise and lower the platform relative to a base of the storage compartment; and
a display mast extending upward from the storage compartment, wherein the display mast is configured to mount and accommodate at least a 12 inch display at a position above the storage compartment.

2. The free-weight exercise system of claim 1, wherein the storage compartment fully encloses the free-weight exercise equipment such that the free-weight exercise equipment is concealed from view when the platform is in a lowered position.

3. The free-weight exercise system of claim 1, further comprising an exercise bench reconfigurable between a first configuration in which the exercise bench operatively engages an opening of the storage compartment to provide a removable cover for the storage compartment and a second configuration in which the exercise bench can support a user in a seated position.

4. The free-weight exercise system of claim 1, further comprising a display rotatably coupled to the display mast by a display mount.

5. The free-weight exercise system of claim 4, wherein the display mount includes a shaft rotatably coupled to the display mast.

6. The free-weight exercise system of claim 5, further comprising a pawl slidably coupled to an end portion of the shaft and operative to be received in a receptacle coupled to the display mast.

7. The free-weight exercise system of claim 5, further comprising:
a ring coupled to the display mast, wherein the ring includes a detent formed on an inner surface thereof;
a retainer plate received in the ring;
a cam received in a slot formed in the retainer plate, wherein the cam is selectively biased by a biasing element into the detent.

8. The free-weight exercise system of claim 7, wherein the cam disengages from the detent when the display is rotated between a landscape orientation and a portrait orientation.

9. The free-weight exercise system of claim 4, wherein the display mount includes:
a display plate coupled to the display; and
a frame plate rotatably coupled to the display mast.

10. The free-weight exercise system of claim 9, wherein the frame plate includes an arcuate slot and a friction adjuster is received in the arcuate slot and adapted to adjust a level of force that causes the display to rotate.

11. The free-weight exercise system of claim 9, wherein:
the display plate includes a plurality of hooks;
the frame plate includes a plurality of slots adapted to receive the respective plurality of hooks to couple the display plate to the frame plate.

12. The free-weight exercise system of claim 9, wherein the frame plate is coupled to a biased pawl that selectively engages the display plate to couple the display plate to the frame plate.

13. The free-weight exercise system of claim 1, wherein the lift assembly comprises a lift mechanism configured to remain fully enclosed within the storage compartment when the platform is in either the raised or lowered position.

14. The free-weight exercise system of claim 1, wherein the lift assembly includes scissor linkage and a lift mechanism operative to raise and lower the lift assembly.

15. A free-weight exercise system comprising:
a storage compartment comprising a base and configured to enclose a free-weight exercise equipment;
a platform movably coupled to the storage compartment and configured to securely support the free-weight exercise equipment; and
a lift assembly configured to lower and raise the platform relative to the base with the free-weight exercise equipment on the platform.

16. The free-weight exercise system of claim 15, wherein the lift assembly comprises a lift mechanism configured to remain fully enclosed within the storage compartment when the platform is in either the raised or lowered position.

17. The free-weight exercise system of claim 15, wherein the lift assembly includes scissor linkage and a lift mechanism operative to raise and lower the lift assembly.

18. The free-weight exercise system of claim 15, further comprising a display mast extending upward from the storage compartment, wherein the display mast is configured to mount and accommodate a display.

19. The free-weight exercise system of claim 18, further comprising a display rotatably coupled to the display mast.

20. A free-weight exercise system comprising:
a storage compartment comprising a base and configured to enclose a free-weight exercise equipment;
a display mast extending upward from the base;
a platform movably coupled to the base and adapted to support the free-weight exercise equipment at a first height;
a display mounted to the display mast by a display mount at a second height above the first height and rotatably coupled to the display mast.

* * * * *